United States Patent [19]
Johnson et al.

[11] Patent Number: 5,243,673
[45] Date of Patent: Sep. 7, 1993

[54] OPTO-ELECTRONIC COMPONENT HAVING POSITIONED OPTICAL FIBER ASSOCIATED THEREWITH

[75] Inventors: Melvin H. Johnson, Chadds Ford; Jerald D. Lee, Mendenhall, both of Pa.; Frank M. Willis, Wenonah, N.J.

[73] Assignee: E. I. Du Pont de Nemours and Company, Wilmington, Del.

[21] Appl. No.: 989,961

[22] Filed: Dec. 11, 1992

Related U.S. Application Data

[63] Continuation of Ser. No. 753,283, Aug. 30, 1991, abandoned, which is a continuation-in-part of Ser. No. 388,548, Aug. 2, 1989, abandoned.

[51] Int. Cl.$^5$ .............................................. G02B 6/36
[52] U.S. Cl. ................................. 385/90; 385/55; 385/92
[58] Field of Search ................ 385/88, 89, 90, 91, 385/92, 93, 94, 50, 55, 98, 99, 135

[56] References Cited

U.S. PATENT DOCUMENTS

| | | | |
|---|---|---|---|
| 3,840,889 | 10/1974 | O'Brien | 357/81 |
| 3,864,018 | 2/1975 | Miller | 350/96 C |
| 3,919,037 | 11/1975 | Miller | 156/502 |
| 3,938,895 | 2/1976 | Bridger et al. | 356/152 |
| 4,030,811 | 6/1977 | Khoe et al. | 350/96 C |
| 4,102,561 | 7/1978 | Hawk et al. | 350/96.21 |
| 4,186,994 | 2/1980 | Denkin et al. | 350/96.17 |
| 4,193,665 | 3/1980 | Arnold | 350/96.22 |
| 4,210,923 | 7/1980 | North et al. | 357/60 |
| 4,217,032 | 8/1980 | Sheem | 350/96.21 |
| 4,289,374 | 9/1981 | Franken et al. | 350/96.20 |
| 4,327,964 | 5/1982 | Haesly et al. | 350/96.21 |
| 4,398,797 | 8/1983 | Wedertz et al. | 350/96.21 |
| 4,452,507 | 6/1984 | Winzer | 350/96.20 |
| 4,466,696 | 8/1984 | Carney | 350/96.20 |
| 4,475,790 | 10/1984 | Little | 350/96.21 |
| 4,489,830 | 12/1984 | Charlebois et al. | 206/316 |
| 4,565,558 | 1/1986 | Keil et al. | 65/1 |
| 4,567,650 | 2/1986 | Balyasny | 29/822 |
| 4,602,845 | 7/1986 | Anderton | 350/96.21 |
| 4,615,031 | 9/1986 | Eales et al. | 372/36 |
| 4,629,284 | 12/1986 | Malavieille | 350/96.21 |
| 4,634,214 | 1/1987 | Cannon, Jr. et al. | 350/96.20 |
| 4,639,074 | 1/1987 | Murphy | 350/96.15 |
| 4,650,276 | 3/1987 | Lanzisera et al. | 350/96.20 |
| 4,657,341 | 4/1987 | Sammueller | 350/96.22 |
| 4,659,175 | 4/1987 | Wilde | 350/96.20 |
| 4,707,072 | 11/1987 | Kraakman | 350/96.21 |
| 4,714,316 | 12/1987 | Moore et al. | 385/99 |
| 4,730,892 | 3/1988 | Anderson et al. | 350/96.21 |
| 4,735,477 | 4/1988 | Bowen | 385/50 |
| 4,746,194 | 5/1988 | Rasmussen | 350/320 |

(List continued on next page.)

FOREIGN PATENT DOCUMENTS

| | | | |
|---|---|---|---|
| 0188392 | 7/1986 | European Pat. Off. | |
| 5230447 | 9/1975 | Japan | 350/96.21 |
| 53-119059 | 10/1978 | Japan | 350/96.21 |
| 55-103513 | 8/1980 | Japan | 350/96.21 |
| 57-68809 | 4/1982 | Japan | |
| 57-115512 | 7/1982 | Japan | |
| 617813 | 6/1984 | Japan | 350/96.21 |
| 61-7813 | 1/1986 | Japan | |

Primary Examiner—John D. Lee
Assistant Examiner—Phan T. Heartney

[57] ABSTRACT

An opto-electronic component includes an opto-electronic device of either the edge or the surface active type mounted on a pedestal. A fiber is positionied by a positioning device apparatus. The positioning apparatus includes a superimposed first and a second arm. Each arm may be subdivided into a first and a second finger. The arms (and fingers) are fabricated from a crystalline material. The arms (and fingers) are biased toward a closed position. An optical fiber introduced into a channel defined by the superimposed arms is initially deflected so that a point on the end face of the fiber is placed into alignment with a reference axis. Further axial movement of the fiber through the channel causes the arms to move against the bias force to hold the point on the axis, regardless of the diameter of the fiber.

45 Claims, 43 Drawing Sheets

U.S. PATENT DOCUMENTS

| | | | |
|---|---|---|---|
| 4,750,804 | 6/1988 | Osaka et al. | 350/96.21 |
| 4,752,109 | 6/1988 | Gordon et al. | 385/93 |
| 4,753,515 | 6/1988 | Sato et al. | 350/320 |
| 4,756,591 | 7/1988 | Fischer et al. | 350/96.20 |
| 4,762,390 | 8/1988 | Finzel | 350/96.21 |
| 4,767,174 | 8/1988 | Carenco et al. | 350/96.20 |
| 4,784,454 | 11/1988 | Dyott | 350/96.20 |
| 4,784,456 | 11/1988 | Smith | 385/55 |
| 4,784,457 | 11/1988 | Finzel | 350/96.21 |
| 4,784,458 | 11/1988 | Horowitz et al. | 350/96.21 |
| 4,787,695 | 11/1988 | Laor | 350/96.20 |
| 4,796,975 | 1/1989 | Lukas et al. | 385/50 |
| 4,799,757 | 1/1989 | Goetter | 385/135 |
| 4,802,727 | 2/1989 | Stanley | 350/96.20 |
| 4,818,055 | 4/1989 | Patterson | 385/98 |
| 4,818,059 | 4/1989 | Kakii et al. | 350/96.21 |
| 4,822,129 | 4/1989 | Webb | 350/96.18 |
| 4,826,272 | 5/1989 | Pimpinella et al. | 350/96.20 |
| 4,830,450 | 5/1989 | Connell et al. | 350/96.2 |
| 4,830,456 | 5/1989 | Kakii et al. | 350/96.20 |
| 4,836,638 | 6/1989 | Finzel | 350/96.21 |
| 4,848,870 | 7/1989 | Wisecarver et al. | 350/96.21 |
| 5,125,057 | 6/1992 | Aberson, Jr. et al. | 385/65 |

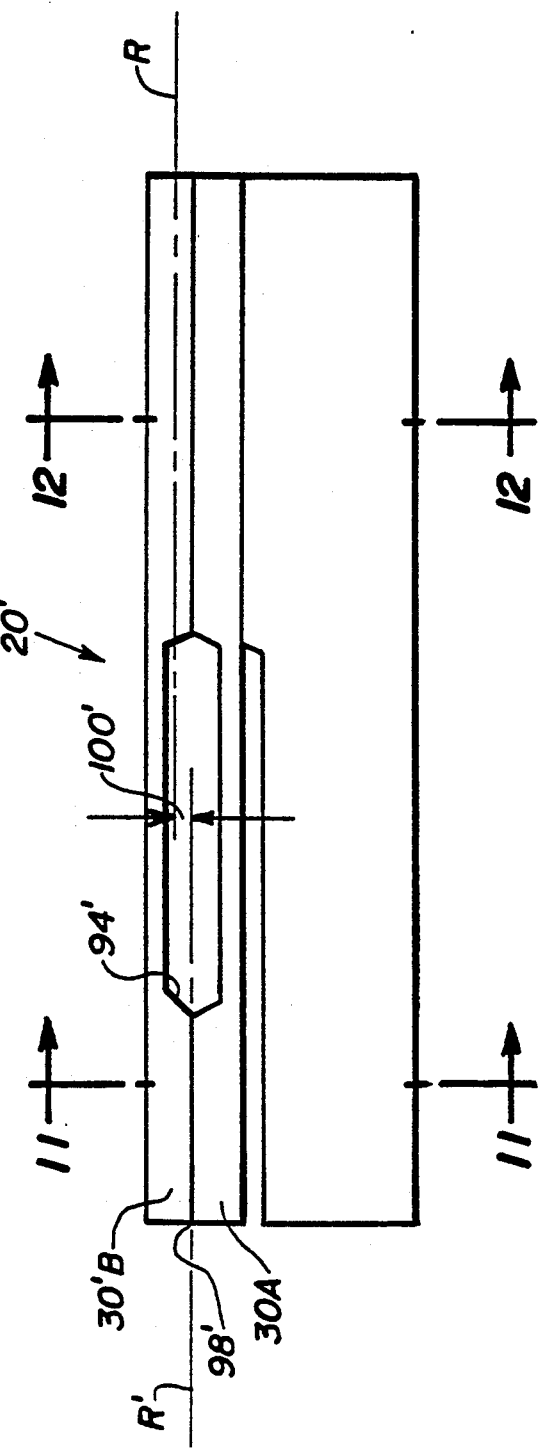

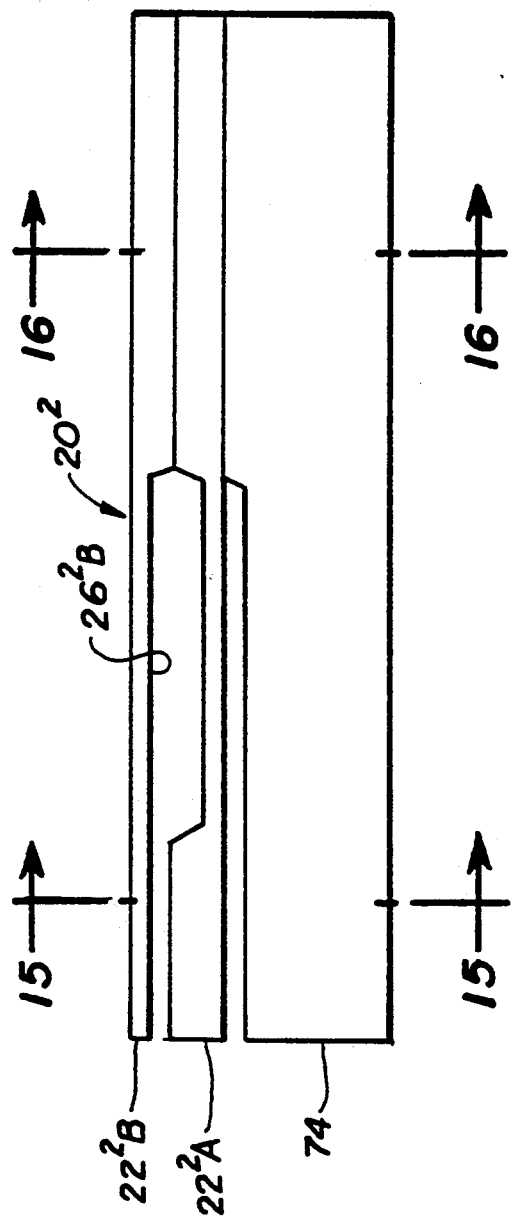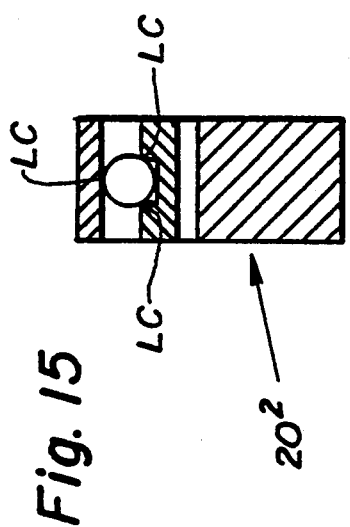

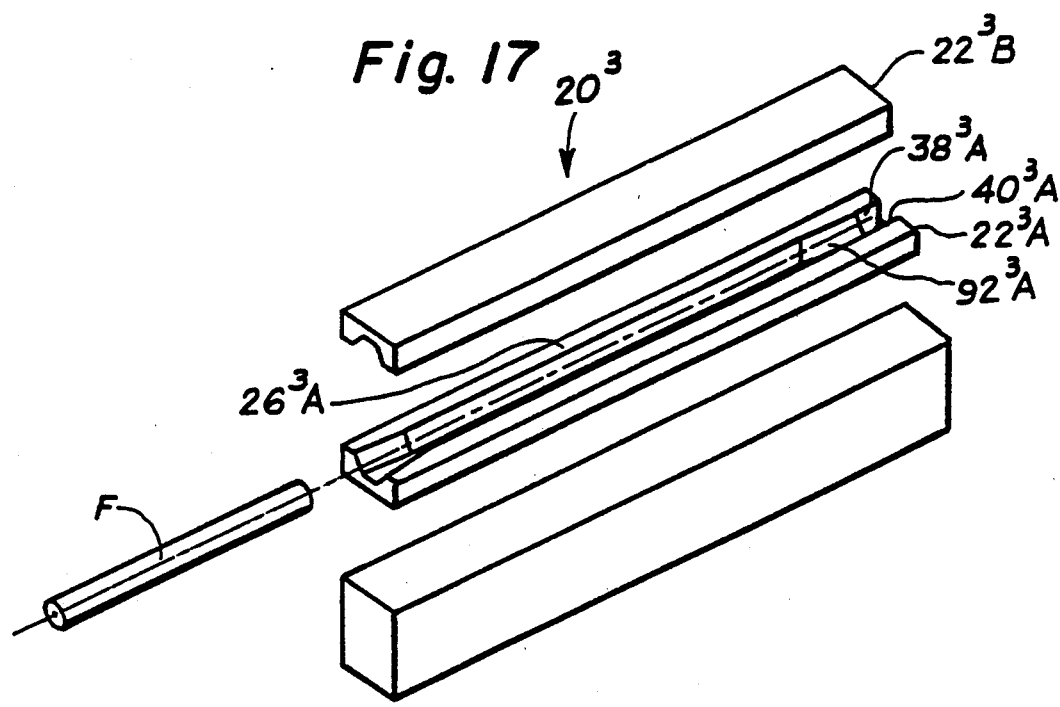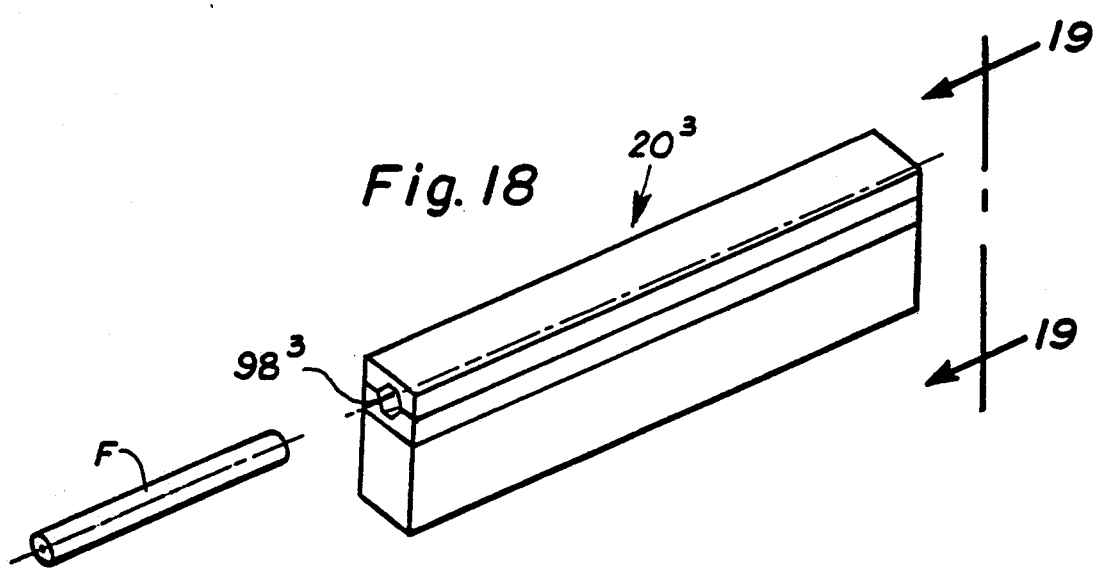

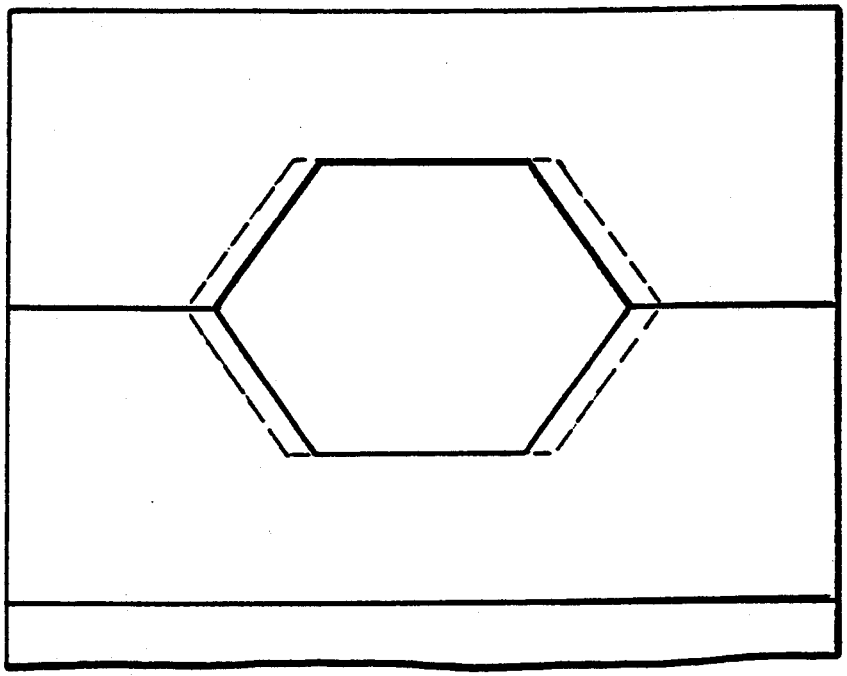
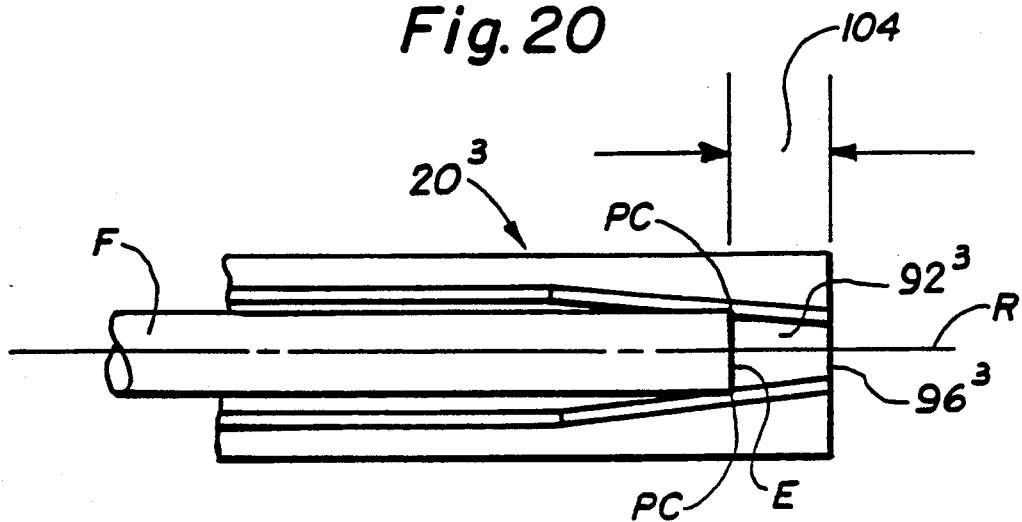

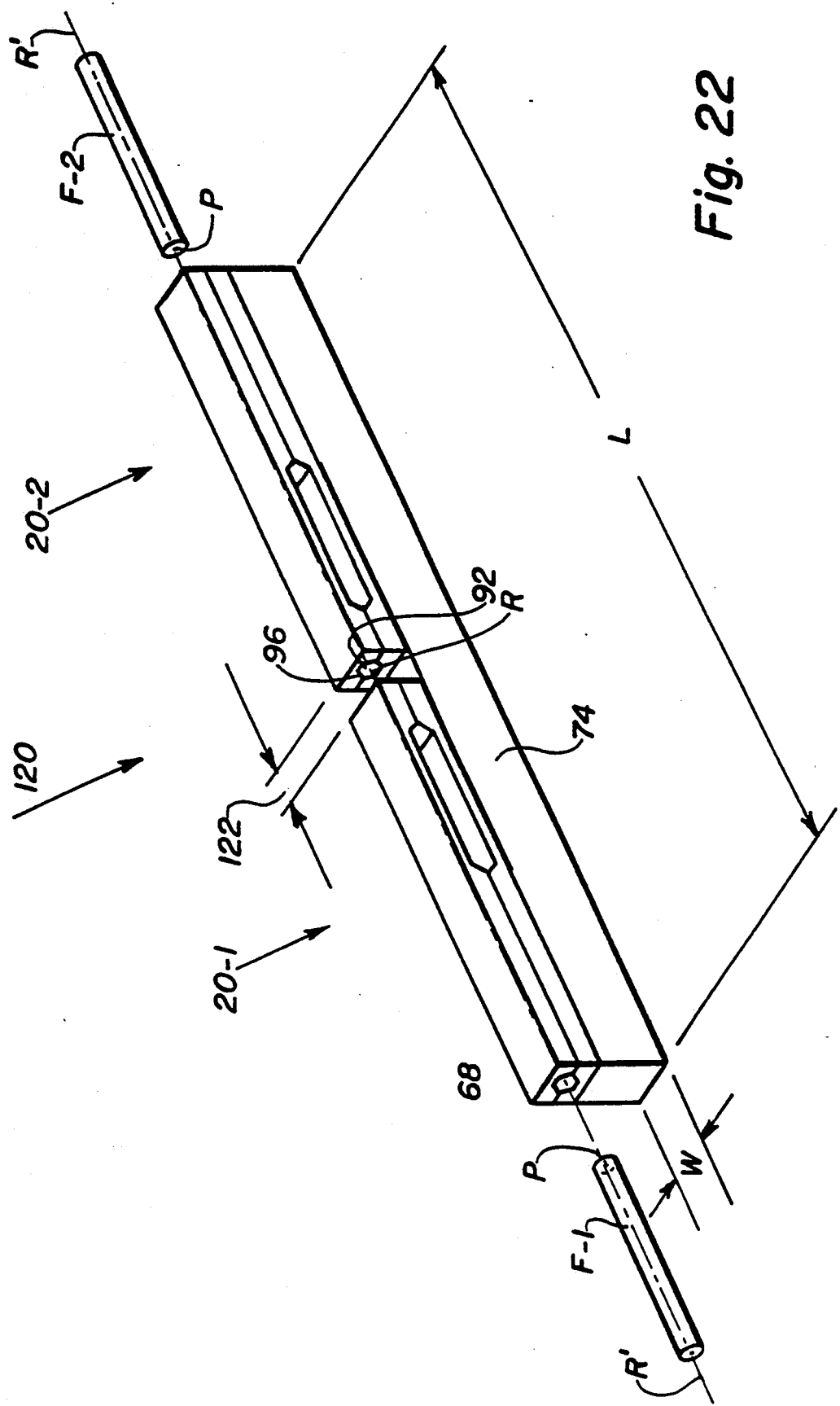

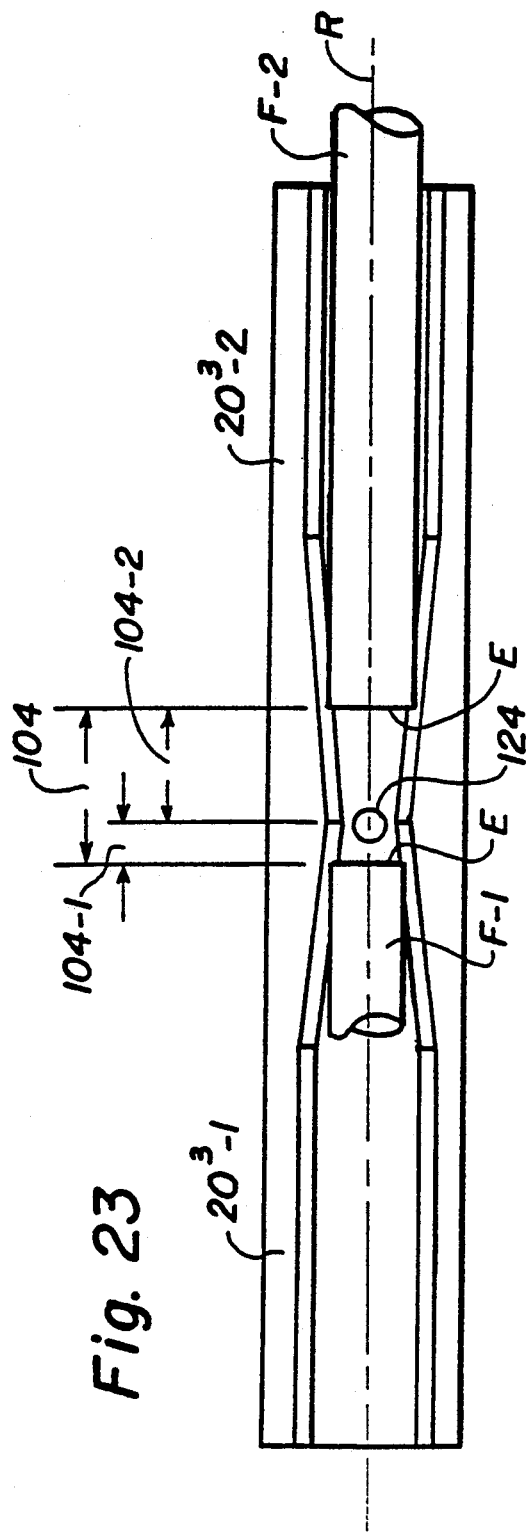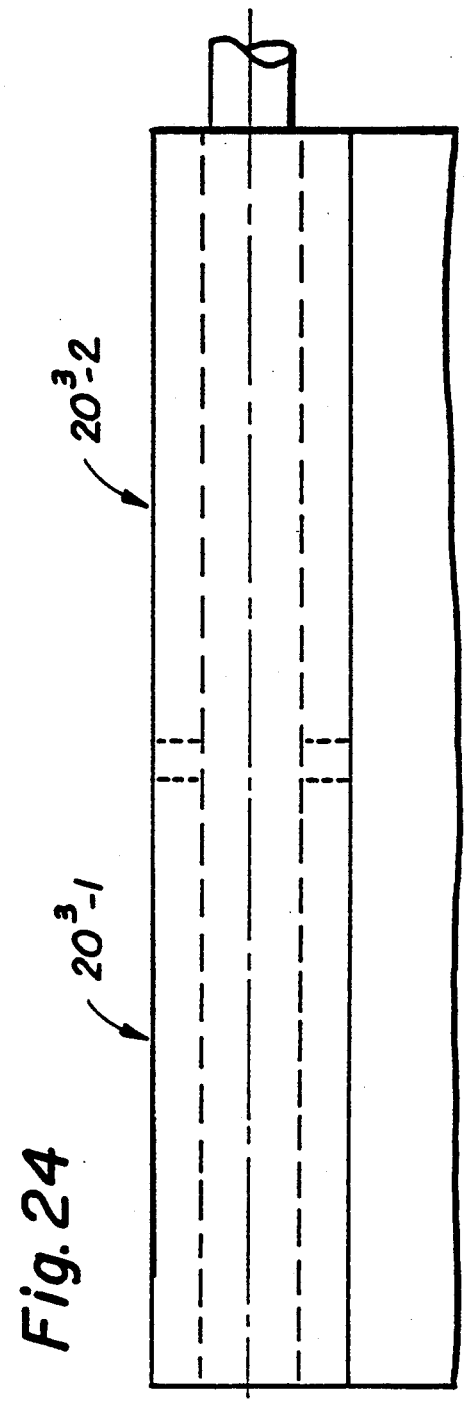

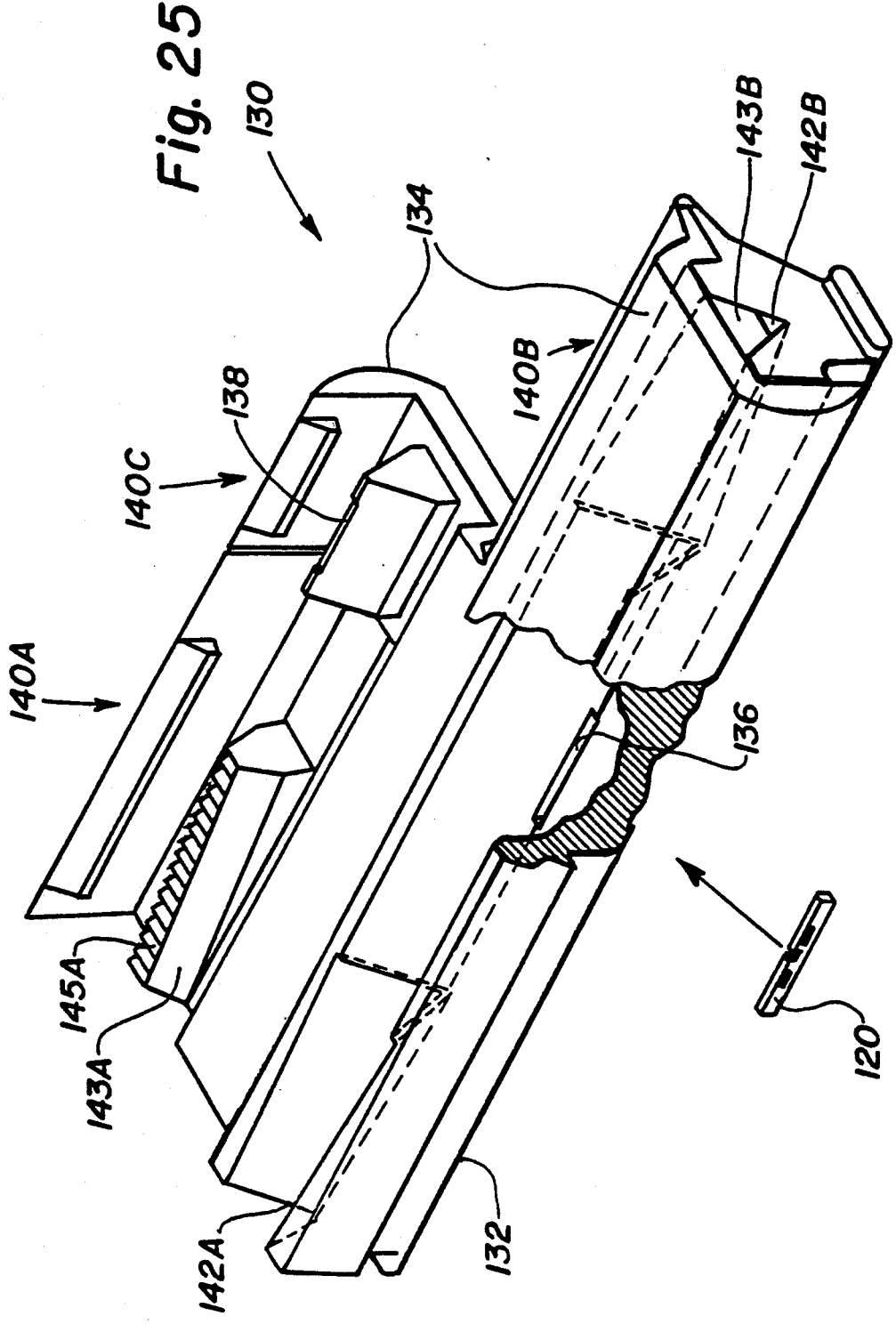

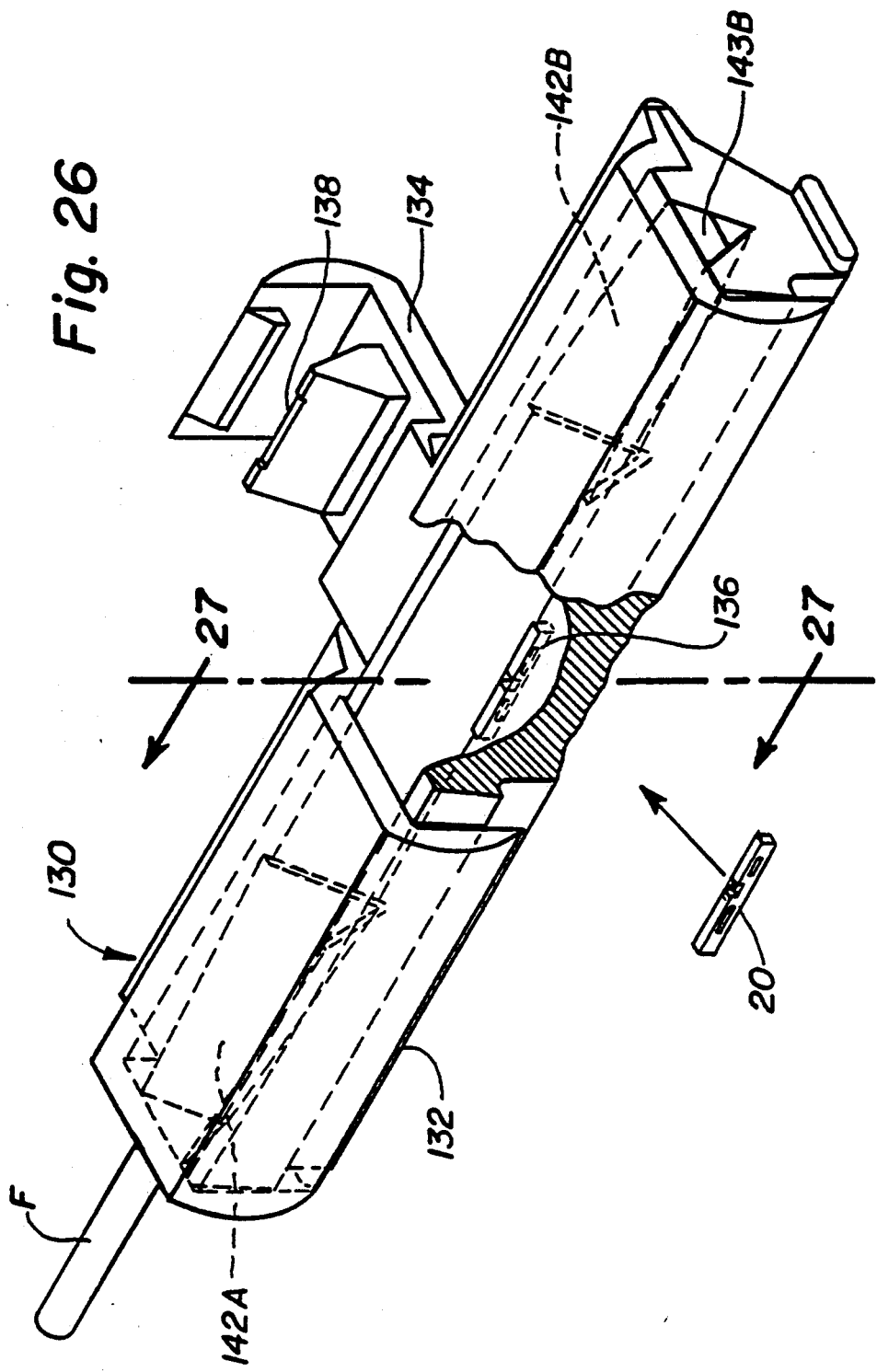

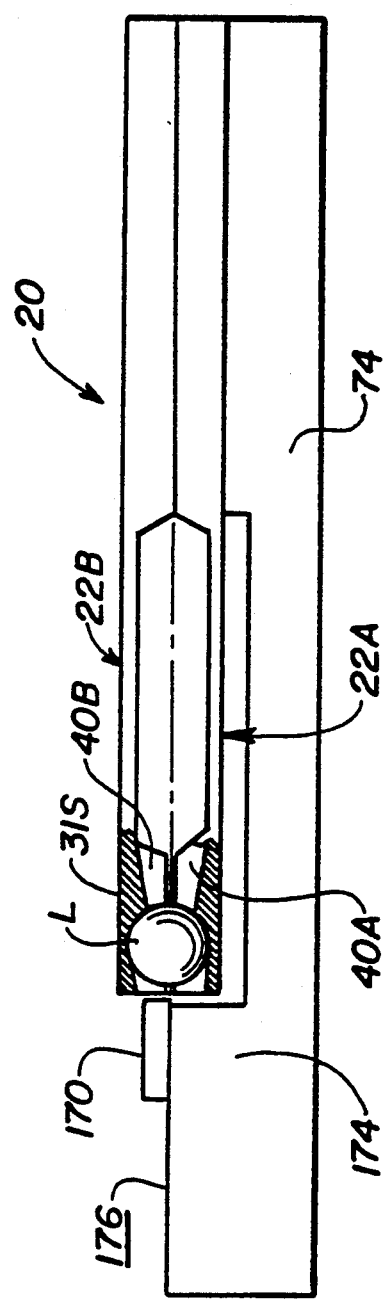

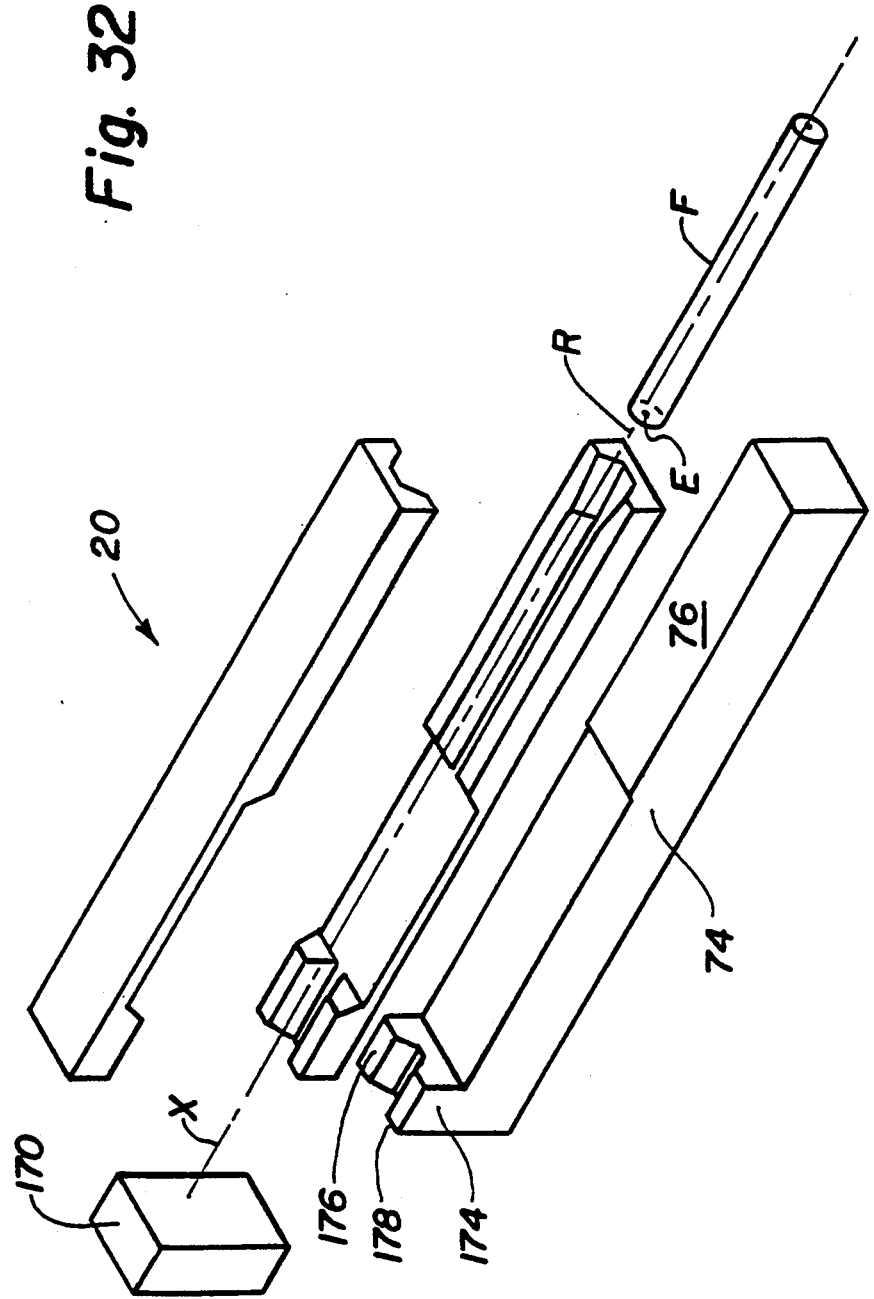

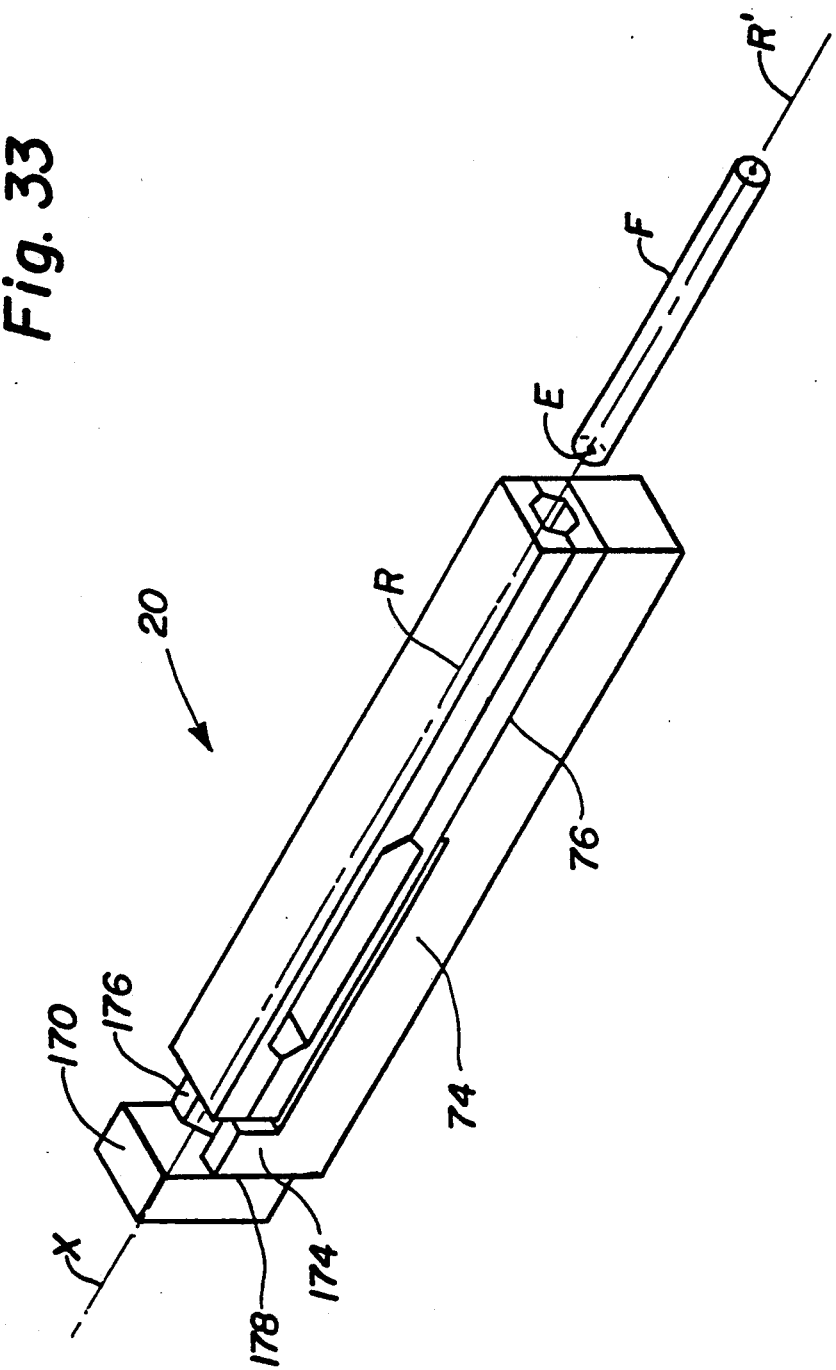

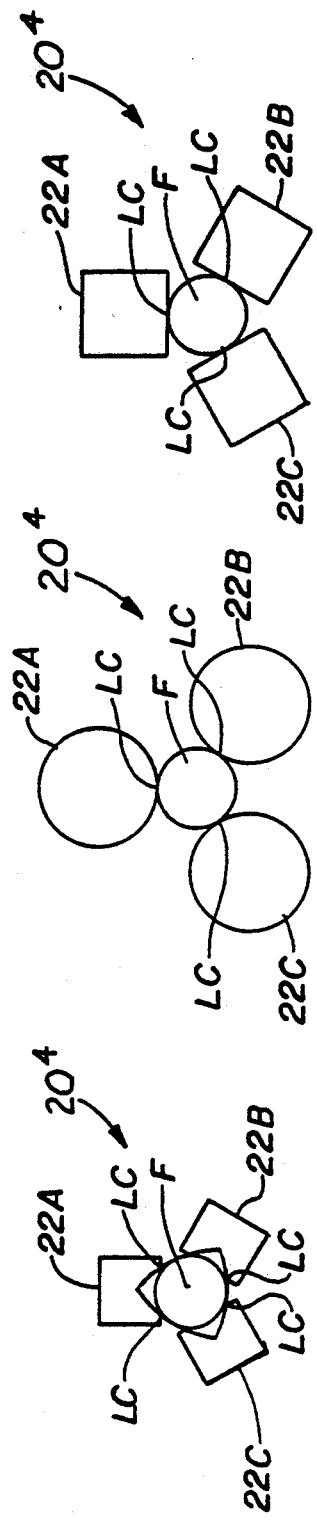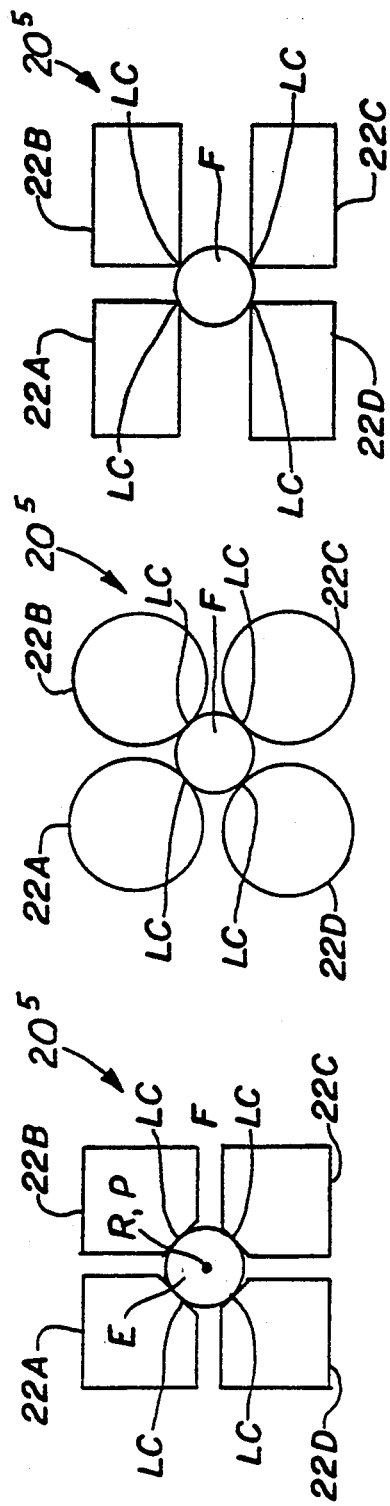

OPTO-ELECTRONIC COMPONENT HAVING POSITIONED OPTICAL FIBER ASSOCIATED THEREWITH

CROSS REFERENCE TO RELATED APPLICATIONS

This is a continuation, of application Ser. No. 07/753,283 filed Aug. 30, 1991, now abandoned which is itself a continuation-in-part of application Ser. No. 07/388,548 filed Aug. 2, 1989, also abandoned.

Subject matter disclosed herein is disclosed and claimed in copending application Ser. No. 07/753,277, filed contemporaneously herewith, titled "Apparatus For Positioning The Center Of An Optical Fiber Along A Predetermined Reference Axis", that application being a continuation-in-part of copending application Ser. No. 07/631,262, filed Dec. 20, 1990 (now abandoned), which is itself a file wrapper continuation of application Ser. No. 07/388,546, filed Aug. 2, 1989 (now abandoned).

Subject matter disclosed herein is disclosed and claimed in copending application Ser. No. 07/753,255, filed contemporaneously herewith, titled "An Optical Fiber Connector Having An Apparatus For Positioning The Center Of An Optical Fiber Along A Predetermined Reference Axis" (now abandoned), that application being a continuation-in-part of copending application Ser. No. 07/628,001, filed Dec. 17, 1990 (now abandoned), which is itself a division of application Ser. No. 07/388,546, filed Aug. 2, 1989 (now abandoned).

BACKGROUND OF THE INVENTION

1. Field Of The Invention

The present invention relates to a positioning apparatus for positioning the center of an optical fiber or other small dimensioned cylindrical member, such as capillary tubing, along a predetermined reference axis independently of variations in the outside diameter of the member.

2. Description Of The Prior Art

Devices are known for positioning an optical fiber so that the axis of the fiber is positioned with respect to a reference axis. A typical expedient used in such devices is a generally V-shaped groove that is formed in a substrate material and which serves as a cradle to accept the fiber being positioned. Representative of such devices is that shown in U.S. Pat. No. 4,756,591 (Fischer et al.), wherein a V-groove is formed in a silicon substrate and an elastomeric member is biased against the fiber to hold it in the groove. The groove may be stepped to provide a deeper groove segment to hold the jacket of the fiber within the device.

U.S. Pat. No. 4,756,591 (Sheem) discloses a grooved silicon substrate having a pair of intersecting V-grooves therein. A fiber to be positioned is disposed in one of the grooves while a shim is disposed in the other of the grooves. The shim may take the form of a tapered or an eccentric fiber, which when respectively slid or rotated under the first fiber serves to lift the same to bring the axis thereof into alignment with a reference axis. A cover may be positioned above the substrate to assist in clamping the first fiber into position.

U.S. Pat. No. 4,802,727 (Stanley) also discloses a positioning arrangement for optical components and waveguides which utilizes a V-grooved structure. U.S. Pat. No. 4,826,272 (Pimpinella et al.) and U.S. Pat. No. 4,830,450 (Connell et al.) discloses arrangements for positioning an optical fiber that utilize members having frustoconical apertures therethrough.

It is believed that single crystalline silicon is the material of choice of the devices above mentioned because of the proclivity of crystalline silicon to be etched along precise crystallographic planes, thus forming precise grooves or structural features by photolithographic microfabrication techniques. Etchants exist that act upon a selected crystallographic plane to a differential degree than upon an adjacent plane, permitting the needed precise control. V-grooves, in particular, can be etched to a controlled width and truncated depth. Under some conditions V-grooves may be etched in a self-limiting operation. The photolithographic microfabrication process is generally described by Brodie and Muray, "The Physics of Microfabrication", Plenum Publishing, New York (1982).

Optical fibers include an inner core having a predetermined index of refraction surrounded by a cladding layer of a lower index. The inner core is the medium in which the optical energy is guided, while the cladding layer defines the index boundary with the core. The outer diameter of the fiber may vary in dimension about a predetermined nominal dimension. It has been seen, for example, that two nominally identical fibers from the same manufacturer may vary in outside diametrical dimension by as much as plus or minus four (4) micrometers. This fiber to fiber variation in outer diameter makes difficult the accurate positioning of the axis of the core of a fiber with respect to a predetermined reference axis using a positioning apparatus having a V-grooved structure.

In view of the foregoing it is believed advantageous to make use of the ability of microfabrication techniques to form accurate structures, channels and/or surfaces in a crystalline material to construct a positioning apparatus that will accurately position the center of the fiber, or of any other elongated generally cylindrical member having small dimensions (such as capillary tubing), with respect to a predetermined reference axis. Moreover, it is believed advantageous to provide a positioning apparatus that consistently aligns the predetermined point on the fiber or other cylindrical member with the reference axis without requiring great technical skill, expensive apparatus, and extensive alignment procedures.

SUMMARY OF THE INVENTION

The present invention relates to a positioning apparatus for positioning a predetermined point, such as the geometric center, on the end face of a cylindrical member, such as an optical fiber, along a predetermined reference axis. In a preferred case the positioning apparatus includes a first and a second arm, each of which has at least a first and a second sidewall that cooperate to define a groove therein. The groove in each arm is preferably a converging groove so that when the arms are arranged in superimposed relationship the converging grooves cooperate to define a funnel-like channel over at least a predetermined portion of its length. The channel has an inlet end and an outlet end and a reference axis extending therethrough. A fiber introduced into the inlet end of the channel with its axis spaced from the reference axis is displaceable by contact with at least one of the sidewalls on one of the arms to place a predetermined point on an end face of the member into alignment with the reference axis where it is there held by contact with the first and second arms. To guide the fiber toward the inlet end of the channel each of the first and the second arms includes a trough therein, each trough being disposed on an arm a predetermined distance behind the groove in that arm, so that in the closed position the troughs cooperate to define a guideway.

The arms having the converging grooves therein may, as is preferred, be movable from a first, closed, position to a second, centering, position. The superimposed arms are, in this instance, mounted cantilevered fashion, to a foundation. Means is provided for biasing each of the arms with a substantially equal and oppositely directed biasing force toward the first position. In the preferred implementation the biasing means comprises a reduced thickness portion in each of the first and the second arms, the reduced thickness portion defining a flexure in each arm which, when each arm is deflected by contact with the cylindrical member, generates a force on each arm to bias each arm toward the closed position.

It should be understood that so long as the arms are movable and biased toward the closed position, it is not required that the grooves formed therein are converging grooves. Accordingly, other positioning apparatus in which the arms are movable but in which the grooves in each of the arms have a form other than a converging groove are to be construed as lying within the contemplation of the invention. Succinctly stated, the present invention encompasses any positioning apparatus having arms that are movable whether the groove in each arm take the form of a converging groove or a groove of an alternate form. Alternately, the present invention also encompasses any positioning apparatus in which the groove in each arm is converging in form, whether the arms are movable or fixed with respect to each other.

In another aspect, the present invention relates to a fiber-to-fiber connector formed from confronting pairs of positioning apparatus. Such a connector is, in the preferred instance, disposed in a housing.

In whatever embodiment realized, it is preferred that the positioning apparatus be fabricated from a crystalline material, such as single crystal silicon, using microfabrication techniques. Each structural element of the positioning apparatus (viz., each of the arms and each foundation) is fabricated in mass on a wafer of silicon. The finished wafers are aligned, superimposed, and bonded, and each of the resulting positioning apparatus severed from the finished assembly of bonded wafers. Alignment between superimposed wafers is assured using selected ones of a plurality of alignment grooves on each of the wafers and associated precise diameter fibers.

In a most preferred embodiment each of the two arms are divided into two arm segments, or fingers, to compensate for slight misalignments of the grooves.

BRIEF DESCRIPTION OF THE DRAWINGS

The invention will be more fully understood from the following detailed description thereof, taken in connection with the accompanying drawings, which form a part of this application, and in which:

FIG. 4A is a view generally similar to FIG. 4 in which a full V-groove is formed in the positioning apparatus while

FIGS. 9 and 10 are exploded and assembled perspective views, generally similar to FIGS. 1 and 2, of another alternate embodiment of a positioning device in accordance with the present invention in which the arms have nonconverging grooves therein and in which the arms are articulably movable with respect to each other along one axis only;

FIGS. 11 are 12 are sectional views taken along section lines 11—11 and 12—12 in FIG. 10;

FIGS. 13 and 14 are exploded and assembled perspective views, generally similar to FIGS. 1 and 2, of another alternate embodiment of a positioning device in accordance with the present invention in which only one of the arms has a nonconverging groove therein and in which both of the arms are articulably movable with respect to each other;

FIGS. 15 and 16 are sectional views taken along section lines 15—15 and 16—16 in FIG. 14;

FIGS. 17 and 18 are exploded and assembled perspective views, generally similar to FIGS. 1 and 2, of an alternate embodiment of a positioning device in accordance with the present invention in which the arms have converging grooves therein and in which the arms are fixed in position with respect to each other;

FIG. 19 is an end view taken along view lines 19—19 in FIG. 18;

FIG. 20 is a side sectional view, taken along view lines 20—20 in FIG. 18, illustrating the position of the fiber within the channel of the a positioning apparatus in accordance with the alternate embodiment of the invention shown therein;

FIG. 21 is an exploded isometric view of a pair of positioning apparatus as shown in FIG. 1 used to form a fiber-to-fiber connector in accordance with the present invention while FIG. 22 is an isometric view of the fully assembled connector of FIG. 21;

FIGS. 23 and 24 are, respectively, a top view in section and a side elevation section view of a pair of positioning apparatus in accordance the embodiment of the invention as shown in FIG. 17 used to form a fiber-to-fiber connector in accordance with the present invention;

FIGS. 25 and 26 are isometric views of a housing used for the fiber-to-fiber connector shown in FIGS. 21 and 22 in the open and in the partially closed positions, respectively, while

FIG. 31A is a side elevational view generally similar to FIG. 31 showing a positioning apparatus in accordance with the present invention positioning a lens with respect to an opto-electronic component;

FIGS. 32 and 33 are isometric exploded and assembled views, respectively, generally similar to FIGS. 30 and 31, illustrating the use of a positioning apparatus in accordance with the present invention to position an optical fiber with respect to the axis of a device having active surface device, in which the device is mounted to the end of a positioning apparatus;

FIGS. 34A through 34F are end views showing alternate arrangements of movable arms each holding a cylindrical member along at least three contact points in accordance with the present invention;

FIG. 43 is a front elevational view, similar to FIG. 42 illustrating the situation extant when the finger pairs are misaligned, while

DETAILED DESCRIPTION OF THE INVENTION

Figure 1:
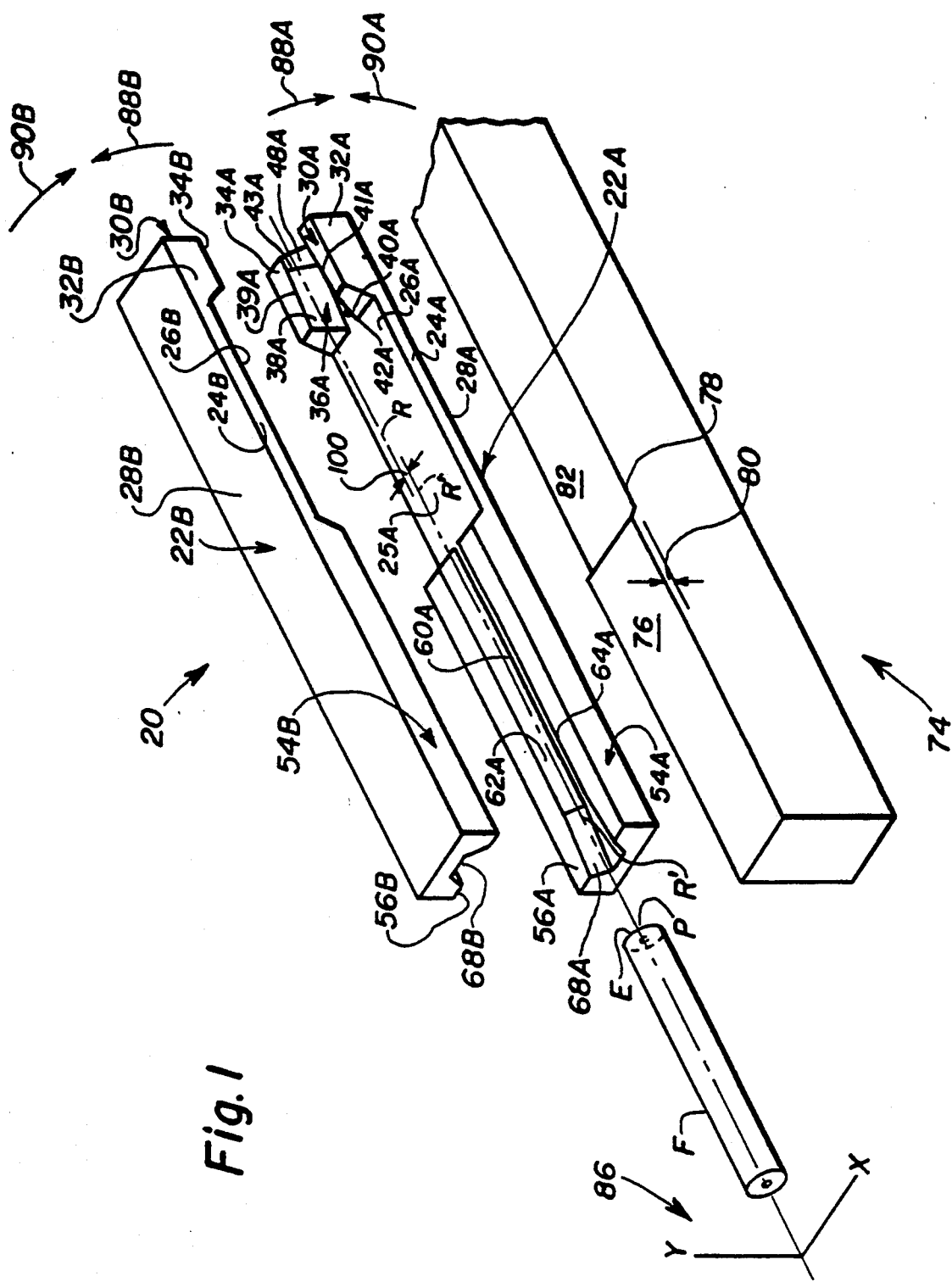
FIG. 1 is a perspective, exploded view of a positioning apparatus in accordance with one embodiment of the present invention for positioning the center point on the end face of an optical fiber with respect to a predetermined reference axis.

Throughout the following detailed description similar reference numerals refer to similar elements in all Figures of the drawings.

Figure 2:
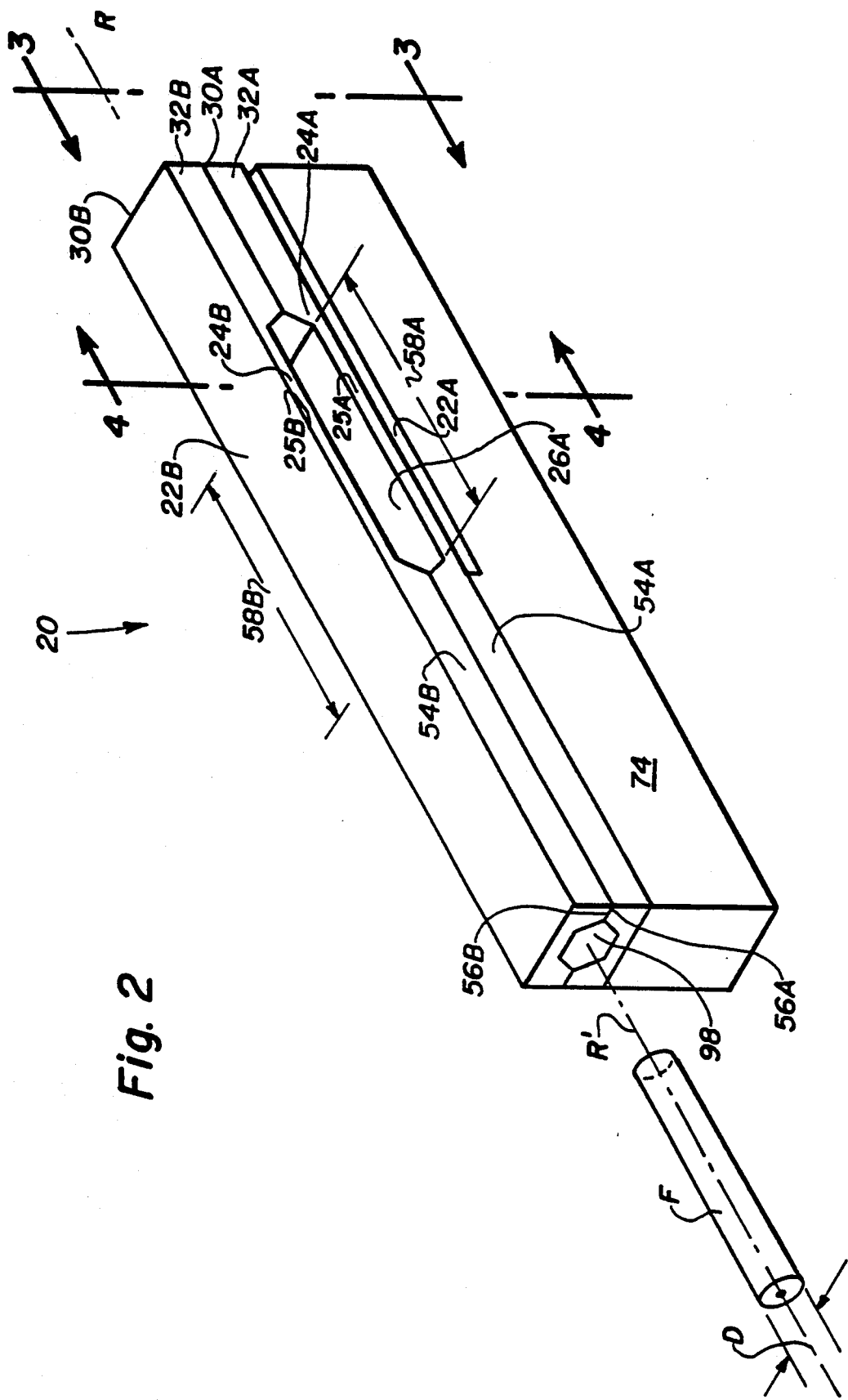
FIG. 2 is a perspective view of the positioning apparatus of FIG. 1 in the fully assembled condition.

For purposes of a general overview FIGS. 1 and 2 show a positioning apparatus generally by reference character 20 in accordance with one embodiment of the present invention in an exploded and in a fully assembled condition. FIGS. 9 through 12 illustrate a positioning apparatus generally indicated by reference character $20^1$ in accordance with another embodiment, while FIGS. 13 through 16 and FIGS. 17 through 20 illustrate still alternate embodiments $20^2$, $20^3$, respectively, of the positioning apparatus in accordance with the invention. FIG. 34A through 34C illustrate yet another alternate embodiment of a positioning apparatus $20^4$ (having three arms). FIGS. 34D through 45 illustrate yet another alternate embodiment of a positioning apparatus $20^5$ in accordance with the invention in which the upper and lower arms have been subdivided into upper and lower pairs of arm segments, or fingers.

Although throughout this application the positioning apparatus is cast in terms of positioning an optical fiber, it is to be understood that the present invention may be effectively utilized with any other member having the form of a small diameter cylindrical object. By way of example and not limitation, the positioning apparatus in accordance with the present invention may be used to position a point disposed, for example, on the end face of a length of microtubing or capillary tubing. By small diameter it is generally meant less than 0.04 inch (one (1) millimeter), but usually less than 0.020 inch. Moreover, it should be further understood that the term cylindrical is not to be strictly limited to an object having a completely circular outer configuration, but would apply to any object whose outer contour is symmetrical to its central axis. Thus, again by way of further example and not limitation, the positioning apparatus of the present invention may be used to position a point disposed, for example, on the end face of a polygonal shaped member or an elliptical member.

As will be developed herein, in the preferred instance each positioning apparatus in accordance with this invention is microfabricated from signal crystal silicon or another differentially etchable single crystalline material. Crystalline materials are preferred because they permit the accurate formation of the structural features of the positioning apparatus in accordance with the present invention using the process of differential etching.

Any of the positioning apparatus herein disclosed is useful in accurately placing or accurately positioning a center point on a fiber, typically a central axial point on the end face of the fiber, into alignment with a predetermined reference axis and for maintaining the center point in alignment with the reference axis. As will be developed this reference axis itself may be collinearly aligned with respect to another axis.

By accurately placing or accurately positioning a center point into alignment with a predetermined reference axis it is meant that a point, such as a point on the end face, of the fiber is brought to within a predetermined distance of the reference axis. This distance is, in general, on the order of a few micrometers (i.e., less than about five micrometers) for multimode fibers. In the case of a single mode optical fiber, a positioning apparatus in accordance with the present invention is especially adapted for positioning a point of the fiber, such as a point on its end face, to within the precise distance required to couple effectively light from the single mode fiber into another fiber or into an opto-electronic device or to couple effectively light from a source, as a solid state laser, into the fiber. This precise distance is even less than for multi-mode fibers for comparable coupling loss.

The positioning apparatus in accordance with the invention is also adapted for positioning a point on the end face of a multi-mode fiber with respect to a reference axis.

It should understood that the fiber need not be held by the positioning apparatus at the end face of the fiber in order to obtain the accurate positioning of the point on the end face into alignment with the reference axis. In practice, the positioning apparatus contacts the fiber a predetermined close distance (on the order of two hundred micrometers) from the end face. Contacting the fiber at a location rearwardly from its end face imparts the capability to abut the end face of a fiber with the end face of a confronting fiber (as in a connector), or to abut the end face of a fiber with a confronting surface of a device (as in an electro-optical component).

Figure 45:
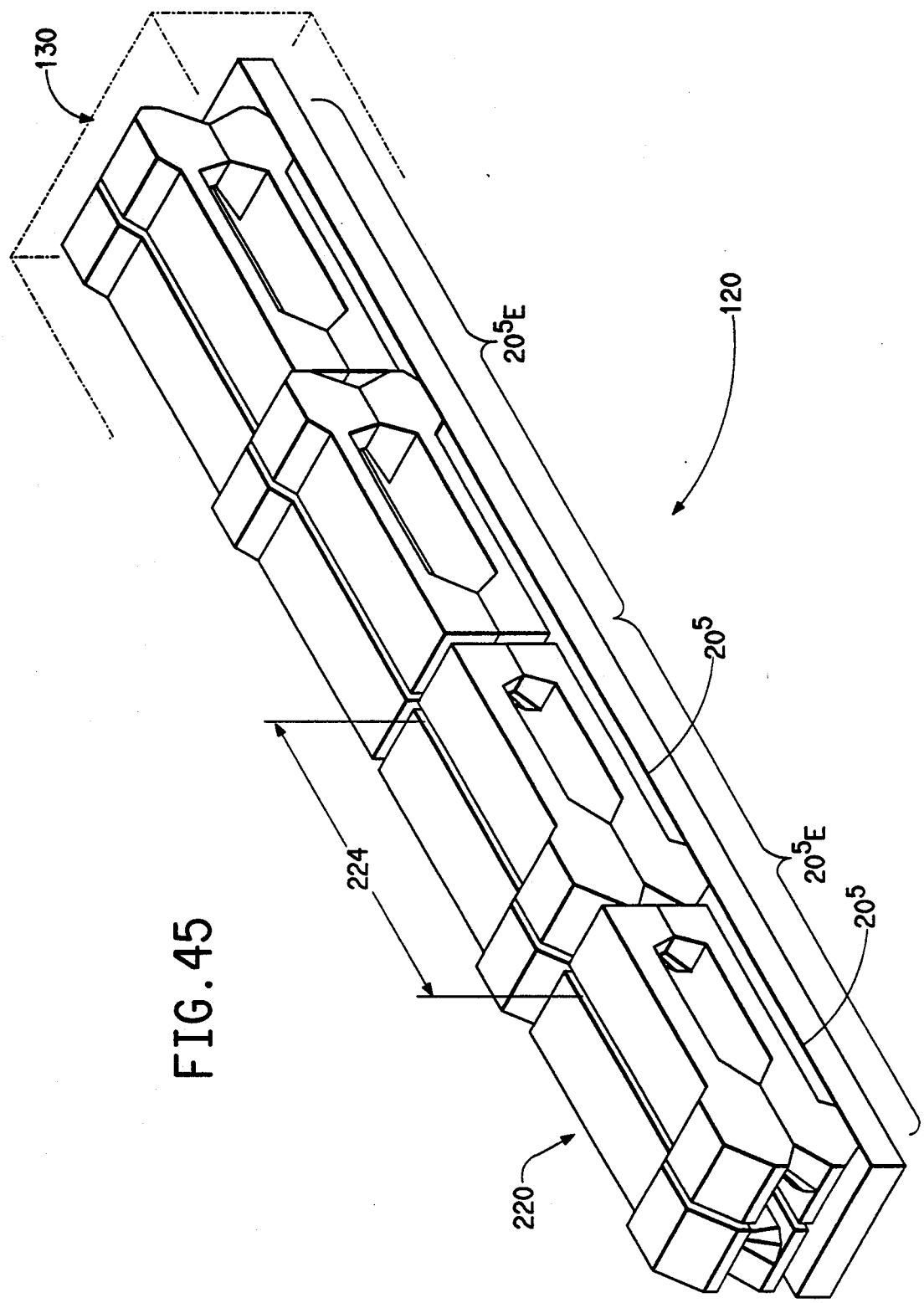
FIG. 45 is a perspective view of an enhanced positioning apparatus that includes the positioning apparatus of FIG. 35 and further includes a clamp rearwardly disposed therefrom, the mounting foundation of the positioning apparatus being omitted.

In some instances an enhanced positioning apparatus may be provided in order to permit more accurate placing or more accurate positioning of the point on the end face of the fiber into alignment with respect to the predetermined axis. To this end, a second positioning apparatus, spaced rearwardly from the first positioning apparatus, may be used to function as an alignment clamp for the fiber. This arrangement is seen in FIG. 45. Using an enhanced positioning apparatus, the center point on the end face of the fiber may be accurately positioned into alignment with a predetermined reference axis such that the center point lies within a distance of less than one micrometer of the reference axis.

If not apparent from the foregoing, it should also be understood that a positioning apparatus in accordance with the present invention may be used to accurately place or accurately position any other point on the center axis of the fiber into alignment with the predetermined axis.

As noted, the cylindrical member preferably takes the form of an optical fiber. The positioning apparatus of the present invention is particularly adapted to place a predetermined point P on the end face E of an optical fiber F along a predetermined reference axis R. In practice the point P is the geometric center and lies on the axis A of the core C (e.g., FIGS. 6A and 6B and FIGS. 41 and 42) of the fiber F. The core C is itself surrounded by an outer cladding layer L. A jacket J is provided about the cladding layer L but is stripped from the fiber F prior to the insertion of the fiber into the positioning apparatus 20. The jacket may comprise more than one layer. As discussed previously, the dimension of the outer diameter D of the cladding layer L of the fiber F may vary from fiber to fiber. Typically this diametrical variation from fiber to fiber is on the order to three (3) micrometers. This situation makes difficult the positioning of the point P along the reference axis R using the positioning devices of the prior art.

With reference to FIGS. 1 and 2 it is seen that the embodiment of the positioning apparatus 20 there shown includes a first and a second arm 22A, 22B, respectively. Preferably, each of the arms 22A, 22B is identically formed in a manner to be discussed, so the structural details of only one of the arms, e.g., the arm 22A, will be discussed. It should be apparent, however, that each structural detail of the arm 22A finds a counterpart in the other arm 22B. Accordingly, corresponding reference numerals with the appropriate alphabet suffix will denote corresponding structural details on the arm 22B. If the arms are not substantially identical (as, for example, in the embodiments of FIGS. 13 through 16 and FIG. 42) adjustments must be made to provide the requisite biasing forces to maintain the point P on the reference axis R.

The arm 22A includes a base portion 24A having a first major surface 26A and a second, opposed, major surface 28A. The base portion 24A extends along the full length of the arm 22A and the dimension of the central region 25A of the base portion 24A defines the basic dimension of the arm 22A. A clip generally indicated by the reference character 30A is defined at a first end of the arm 22A. The clip 30A is formed in a relatively thicker abutment portion 32A that lies on the first surface 26A of the arm 22A. The abutment 32A has a planar surface 34A thereon that preferably lies parallel to the first major surface 26A. To provide some feeling for the physical dimensions involved, the arm 22A has an overall length dimension on the order of twenty eight hundred (2800) micrometers and a width on the order of three hundred fifty (350) micrometers. In the central region 25A the arm 22A has a thickness dimension on the order of fifty (50) micrometers, while the remaining portion of the arm 22A has a thickness dimension on the order of one hundred twenty five (125) micrometers.

Figure 3:
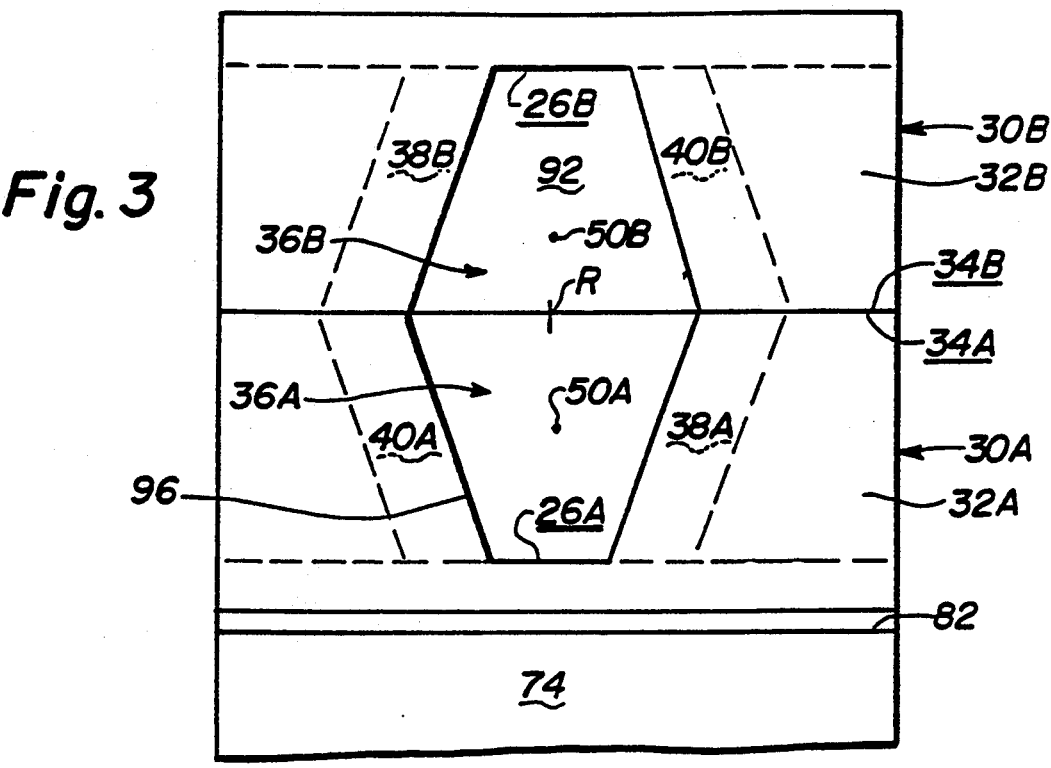
FIG. 3 is a front elevation view of the assembled positioning apparatus of FIGS. 1 and 2, taken along view lines 3—3 in FIG. 2.
Figure 4:
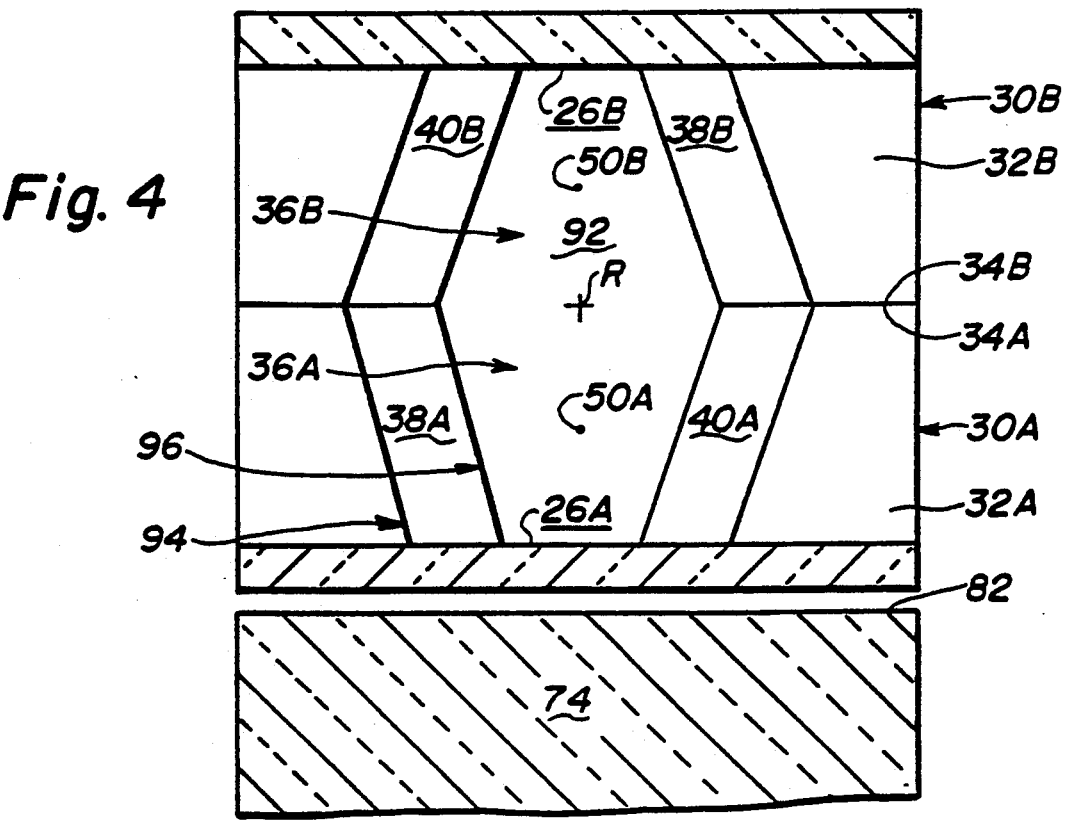
FIG. 4 is a sectional view, in elevation, of the assembled positioning apparatus of FIG. 2, taken along section lines 4—4 in that Figure illustrating the truncated V-groove therein.

As may be better seen with reference to FIGS. 3 and 4 a generally converging V-shaped groove 36A is defined in the abutment 32A of the clip 30A by generally planar first and second sidewalls 38A, 40A, respectively, and the forward end region of the first surface 26A of the base 24A. The sidewall 38A has an upper edge 39A (FIG. 1) thereon while the sidewall 40A has an upper edge 41A thereon. It should be understood that the term "planar" is meant to encompass a surface formed in a single crystal material by etching in which microscopic steps are of necessity produced owing to the lattice structure of the crystal.

Figure 1A:
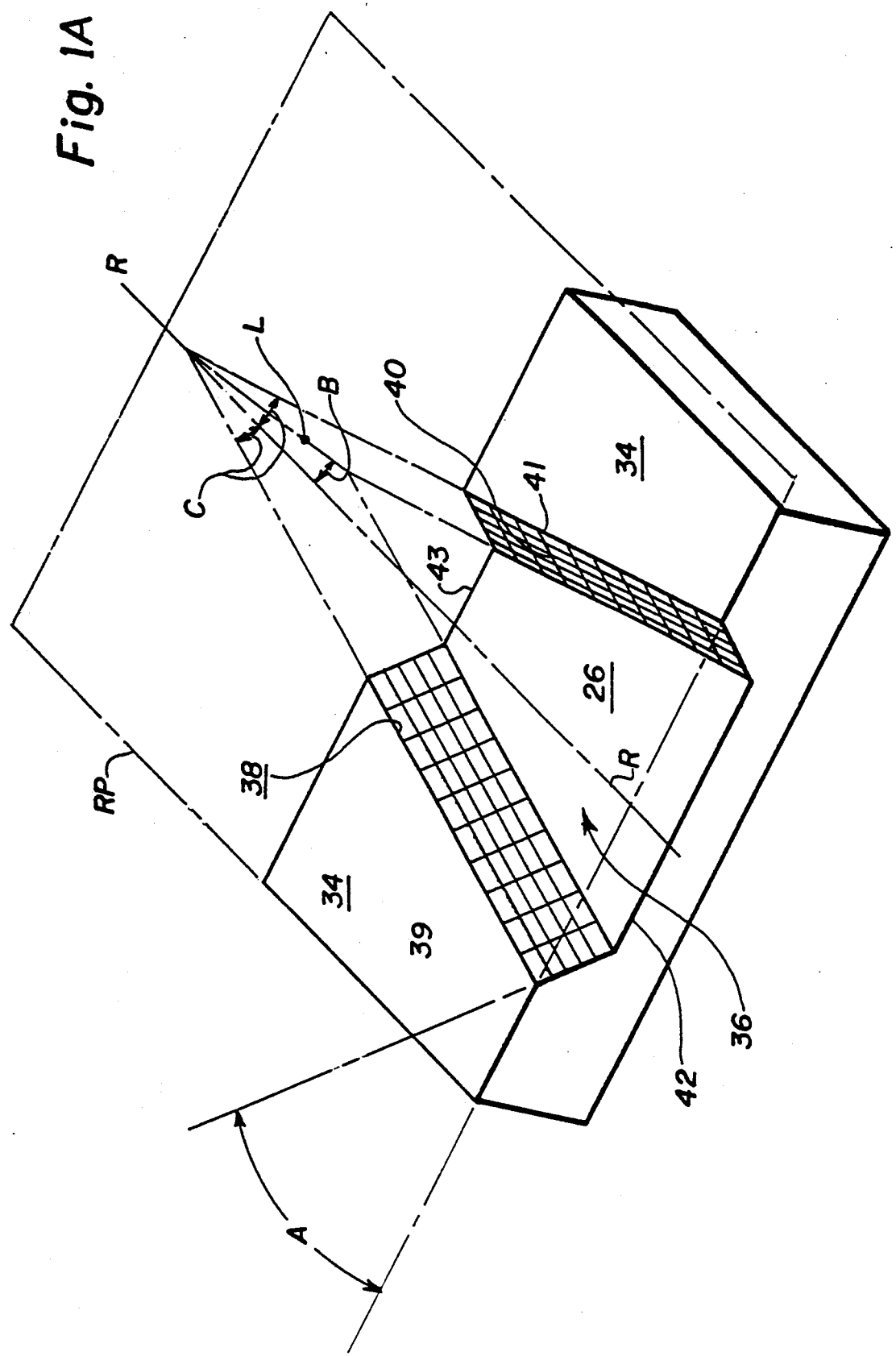
FIG. 1A is a definitional drawing illustrating the characteristics of a converging groove as that term is used in this application.

With reference now to the definitional drawing of FIG. 1A, the meaning of the term "converging" when applied to a groove in any embodiment of the invention herein disclosed (using the reference characters of FIGS. 1 and 2) may be made more clear. As used herein, a "converging" groove is a groove 36 defined from at least two planar sidewalls 38, 40 and has an enlarged inlet end 42 and a narrower outlet end 43. The respective upper edges 39, 41 of the sidewalls 38, 40 of the groove 36 lie in a reference plane RP having a reference axis R lying therein. The planar surfaces 34 also lie in the reference plane RP. The reference axis R extends in the reference plane RP from the inlet end 42 to the outlet end 43 of the groove 36. Each point on the reference axis R is spaced in the reference plane RP an equal perpendicular distance from the respective upper edges 39, 41 of the sidewalls 38, 40. The distance between the upper edges of the sidewalls and the axis R decreases from the inlet end 42 to the outlet end 43 of the groove 36.

The surfaces of the sidewalls 38, 40 are equally and oppositely inclined with respect to the reference plane at an angle A greater than zero and less than ninety degrees. The angle of inclination A is determined by the lattice structure of the crystal, and in the case of (100) silicon, is 54.74 degrees. The projections of the sidewalls 38, 40 intersect in a line L that itself intersects the reference axis R forwardly past the outlet end 43 of the groove 36. The line L is inclined with respect to the reference plane RP at an angle B that is greater than zero degrees but less than ninety degrees. In the reference plane RP the upper edges 39, 41 of the sidewalls 38, 40 each converge toward the reference axis R at an angle C that is on the order of two and one-half to five degrees (2.5 to 5) degrees, and most preferably at about three (3) degrees. The angle B is dependent upon the values of the angles A and C and typically the angle B lies in the range from about four (4) to five (5) degrees. As used herein a "fully funnel-like" channel is a channel that is defined by the cooperative association of at least two converging grooves. A "partially funnel-like" channel is a channel that is defined by one converging groove and a surface.

From the foregoing it may be readily understood that a "uniform width" groove is one in which each point on the reference axis R is spaced in the reference plane RP a uniform distance from the edges 39, 41 of the sidewalls 38, 40 as one progresses from the inlet end 42 to the outlet end 43 of the groove 36. The sidewalls of a uniform width groove may be inclined with respect to reference plane RP, or they may extend perpendicularly to it, as desired. A channel formed from one or two uniform width groove(s) is termed a "uniform width" channel. Such a channel may have a rectangular cross section in a plane perpendicular both to the reference plane and to the reference axis, assuming no inclination of the sidewalls of the groove.

A tapering groove is one in which the planar sidewalls are perpendicular to the reference plane but the distance in the reference plane between the reference axis and the edges of the sidewalls decreases as one progresses from the inlet to the outlet of the groove such that the extensions of the planar sidewalls intersect in a line that itself intersects perpendicularly with the reference axis.

In the embodiment seen in FIGS. 3 and 4 the groove 36 is a converging groove, and more preferably, is a V-groove truncated by the presence of a third sidewall defined by a portion of the major surface 26 of the arm 22 in which it is disposed. The truncated V-groove has the same depth throughout its length, when measured along a dimension line erected perpendicular to the surface 34A of the abutment 32A in a direction extending toward the major surface 26A.

Figure 4A:
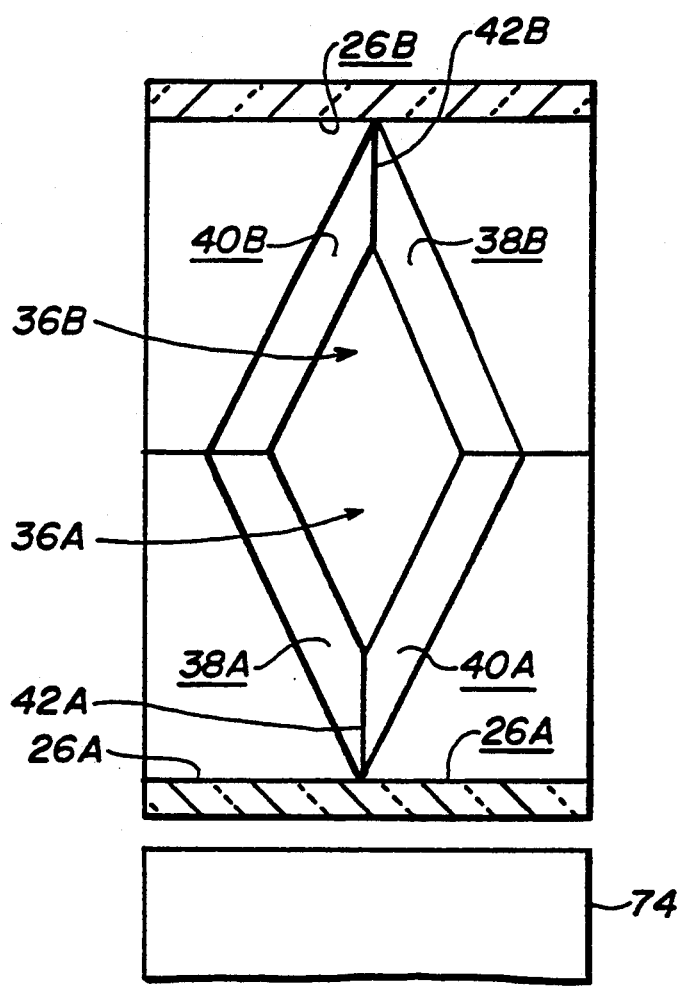

It should be understood that the V-shape of the groove 36A may take alternate forms and remain within the contemplation of the invention. For example, as seen in FIG. 4A, the groove 36A may be defined by only the first and second sidewalls 38A, 40A, respectively, in which event the groove 36A appears as a full V-shape throughout its length. The apex 42A of the groove 36A thus appears throughout the full length of the groove 36A.

Figure 4B:
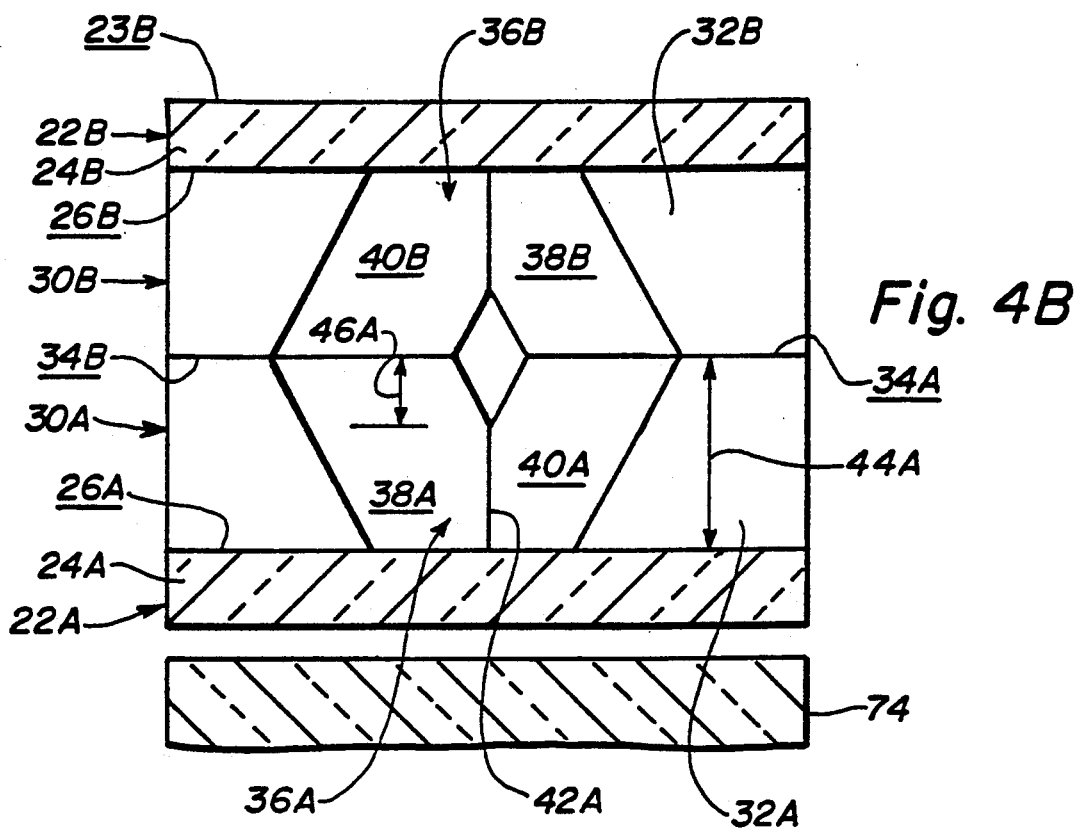
FIG. 4B is a view generally similar to FIG. 4 in which both a full V-groove and a truncated V-groove are formed.

FIG. 4B shows another alternative arrangement in which a truncated V-groove (defined by the first and second sidewalls 38A, 40A, respectively, and the portion of the major surface 26A) extends for some predetermined axial distance while a full V-groove (defined by the first and second sidewalls 38A, 40A, respectively) extends for some second predetermined distance. Thus, as seen in FIG. 4B, when measured along a dimension line erected perpendicular to the surface 34A of the abutment 32A in a direction extending toward the major surface 26A the depth that the groove 36A extends into the abutment 32A is greater at its inlet end 42 (as indicated by the dimension arrow 44A) than it is at its outlet end 43 (as indicated by the dimension arrow 46A).

The fully truncated V-groove shown in FIG. 4 is preferred for the embodiment of FIGS. 1 and 2. For purposes of ease of manufacturability, as will be made clear herein, it is also preferred for the embodiment of FIGS. 1 and 2 that the groove 36A does not converge throughout the full axial distance through the abutment 32A. Owing to the provision of tabs 48A, 48B (FIGS. 1 and 5) formed near the ends of the abutments 32A, 32B, the sidewalls 38A, 40A defining the groove 36A do not converge throughout the full length of the groove, but define a short uniform width portion just past the converging portion of the groove 36A. The overall axial length of the groove 36 (including both the converging and the uniform width portions) is on the order of three tenths (0.3) of a millimeter, while the uniform width portion of the groove occupies an axial length of one tenth (0.1) of a millimeter. As is believed best seen in FIG. 5 the converging and nonconverging portions of the groove 36A have a common axis 50A associated therewith.

Again with reference to FIG. 2, an extended enlargement region 54A having a planar surface 56A lies on the base portion 24A of the arm 22A spaced a predetermined axial distance 58A behind the abutment 32A. The distance 58A is on the order of one (1) millimeter. The surface 56A is coplanar with the surface 34A. The enlargement 54A is provided with a nonconverging, uniform width, truncated V-shaped trough 60A defined by inclined planar sidewalls 62A, 64A, respectively, and by a portion of the major surface 26A of the base portion 24A near the second end thereof. In the embodiment shown in FIGS. 1 and 2 the trough 60A is uniform in depth along its axial length, as measured with respect to a dimension line erected perpendicular to the surface 56A toward the major surface 26A. The trough 60A communicates with a converging lead-in 68A. If desired, the walls 62A, 64A may be inclined with respect to each other so that the trough 60A may be a full V-shape or a partial V-shape, similar to the situation illustrated in connection with FIGS. 4A and 4B for the groove 36A. Alternatively, the walls 62A, 64A defining the troughs 60A, 60B may be parallel or otherwise conveniently oriented with respect to each other. As is believed best seen in FIG. 5 the trough 60A and the lead-in 68A have a common axis 70A. The length of the trough 60A and associated lead-in 68A is on the order of 1.59 millimeter.

Figure 5:
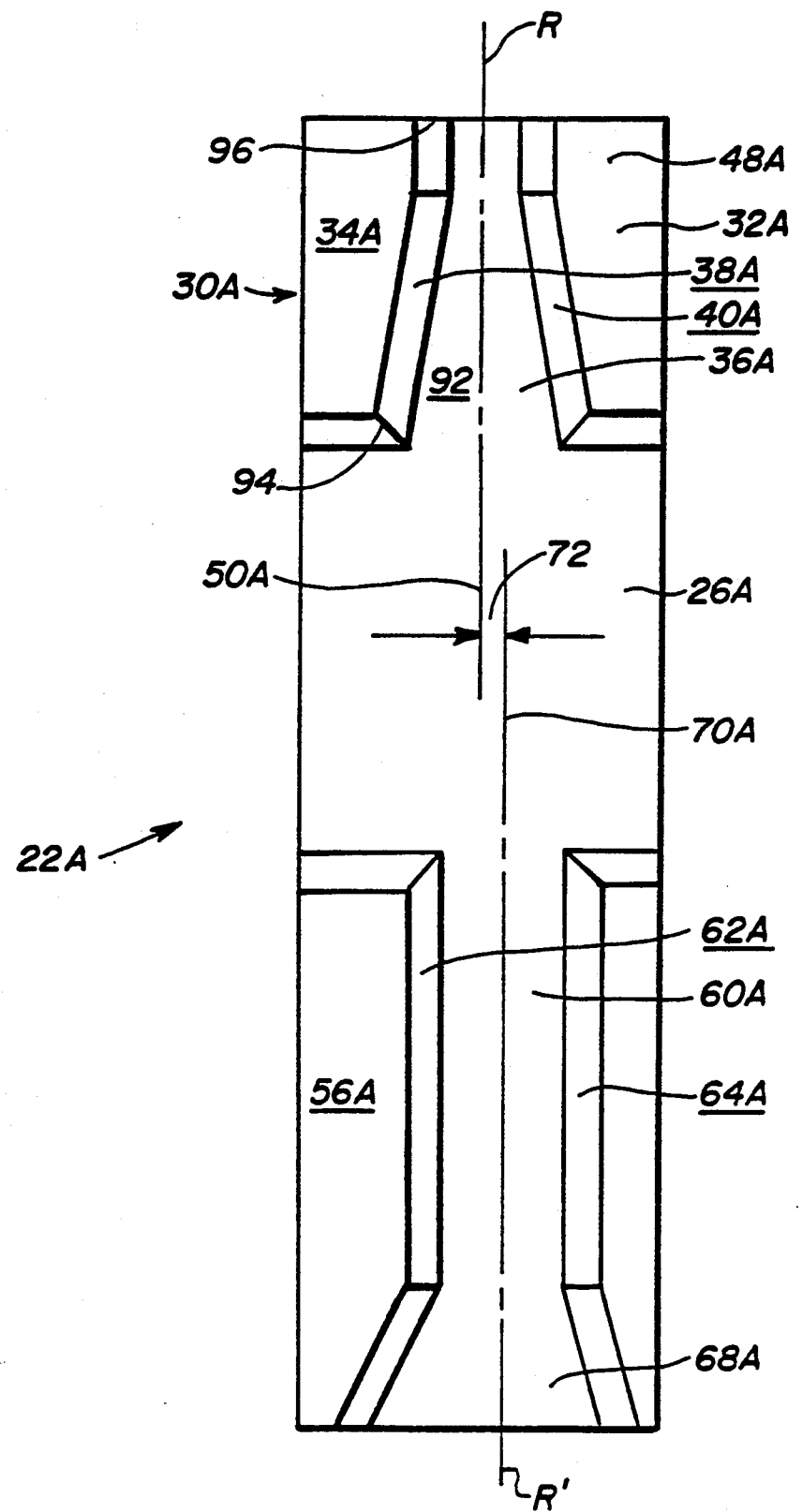
FIG. 5 is a plan view one of the arms of the positioning apparatus of FIG. 1 illustrating the relationships of the axes of the groove and the guideway therein.

FIG. 5 is a plan view of one of the arms 22A. In the preferred implementation of the embodiment of FIGS. 1 and 2 the axes 50A, 70A (respectively through the groove 36A and the trough/lead-in 60A/68A) are offset a predetermined distance 72 in the reference plane RP (the plane of FIG. 5). Preferably, the offset 72 is at least one-half the difference between the diameters of the anticipated largest and smallest fibers to be positioned. As will become clearer herein offsetting the axes 50A, 70A of the structures 36A, 60A/68A facilitates the centering action of the positioning apparatus 20 by insuring that a fiber, as it is introduced into the apparatus 20, is biased to strike one of the sidewalls 38A, 40A forming the groove 36A (and analogously, the sidewalls 38B, 40B forming the groove 36B). This insures wall contact with the fiber at least two spaced locations. However, the presence of the offset 72 necessitates additional manufacturing considerations, as will be discussed. It should be noted that the force resulting from biasing the fiber in the manner just discussed (or the force on the fiber due to gravity) is much smaller in magnitude than the biasing force of the arms which serves to center the fiber on the reference axis.

In the assembled condition the arms 22A, 22B are disposed in superimposed relationship one above the other, with the groove 36A, the trough 60A and the lead-in 68A on the one arm 22A registering with the corresponding groove 36B, trough 60B and lead-in 68B on the other arm 22B. The registered converging grooves 36A, 36B in the abutments 32A, 32B cooperate to define a generally fully funnel-shaped channel 92 having an input end 94 (FIG. 4) and an output end 96 (FIGS. 4 and 5). (Note that if the tabs 48 are provided, the channel 92 so defined has a uniform width portion just preceding the outlet end 96 thereof.) The reference axis R extends centrally and axially through the channel 92. The reference axis R lies on the intersection of the reference plane RP (which contains the conjoined surfaces 34A, 34B) with the plane containing the axes 50A, 50B of the converging grooves 36A, 36B.

The registered troughs 60 and lead-ins 68 cooperate to define a guideway 98 (FIG. 2). Similarly, the axis R' through the guideway 98 lies on the intersection of the plane containing the conjoined surfaces 56A, 56B of the enlargements 54A, 54B (which is the reference plane in the preferred case) with the plane containing the axes 70A, 70B (FIG. 5) of the trough/lead-in 60A/68A, 60B/68B. The axes R and R' both lie in the reference plane RP (the plane of the surfaces 34A, 34B, 56A, 56B) although the axes R and R' are laterally offset with respect to each other in this reference plane by a predetermined offset distance 100 (FIG. 1). For a fiber the offset distance 100 is typically on the order of five (5) micrometers.

The inlet end 94 of the fully funnel-like channel 92 (best seen in FIGS. 4 and 5) is sized to circumscribe and thereby to accommodate a fiber F whose cladding layer L (or outside surface) has the largest expected outer diameter dimension. The outlet end 96 of the channel 92 (best seen in FIG. 3) is sized to circumscribe and thereby to accommodate a fiber F whose cladding layer L (or outside surface) has a dimension somewhat smaller than the minimum expected outer diameter dimension of the fiber F. In practice, to position an optical fiber having a nominal outer diameter dimension of one hundred twenty five (125) micrometers, the largest expected outer diameter dimension is on the order of one hundred twenty nine (129) micrometers while the smallest expected outer diameter dimension is on the order of one hundred twenty one (121) micrometers.

The dimension of each of the troughs 60A, 60B is such that the guideway 98 so formed by the registered troughs 60A, 60B is sized to accommodate a fiber F whose cladding layer L has the largest expected outer diameter dimension. Despite its dimension with respect to the fiber, the guideway 98 assists in the insertion of a fiber into the positioning apparatus 20 and is advantageous in this regard.

In the embodiment shown in FIGS. 1 through 5 the surfaces 34A, 34B on the respective arms 22A, 22B, respectively, are, when in a first, closed, position, either in contact with each other or, if desired, within a predetermined close distance to each other. For optical fibers the predetermined close distance is typically on the order of five (5) to twenty-five (25) micrometers. In this embodiment the planar surfaces 34A, 34B on the abutments 32A, 32B of the clips 30A, 30B are not secured to each other and may move to a second, centering, position, as will be described. The planar surfaces 56A, 56B on the respective arms 22A, 22B are secured to each other by any convenient means of attachment, as by fusing or soldering. It should be understood that any other mechanical securing expedient may be used to attach or otherwise hold together the surfaces 56A, 56B to each other.

The positioning apparatus 20 further includes a mounting foundation 74 (FIGS. 1 and 2). The mounting foundation 74 is provided with a planar attachment surface 76 thereon. A step 78 in the mounting foundation 74 serves to space the attachment surface 76 a predetermined clearance distance 80 from a second surface 82. The opposite major surface, e.g., the surface 28A, of the arm 22A is secured, as by fusing or soldering, to the planar attachment surface 76 on the foundation 74. Of course, it should be again understood that any alternative mechanical attachment expedient may be used to attach or otherwise hold together the second major surface of the arm to the foundation 74.

Although the second surface 82 of the foundation is shown in the Figures as being generally planar in the preferred case, it should be understood that this surface 82 may take any desired configuration. As will be more fully appreciated herein, so long as the opposite surface 28A of the arm 22A affixed to the foundation 74 is, at least in the region of the clips 30A, spaced at least a predetermined clearance distance 80 from the second surface 82 (assuming the surface 82 is parallel to the surface 76), the movement of the clip on the arm 22A attached to the foundation (in the drawings, the clip 30A) to be described will not be impeded.

When assembled, the clips 30A, 30B disposed at the ends of the arms 22A, 22B, respectively, are supported in a cantilevered fashion from the conjoined enlargements 54A, 54B at the opposite ends of the arms. The arms 22A, 22B are rigid in x-z plane, as defined by the coordinate axes shown in FIG. 1. Moreover, the relatively thin dimension of the central region 25A, 25B of the base portion 24A, 24B of the arms 22A, 22B axially intermediate the respective abutments 32A, 32B and the enlargements 54A, 54B acts as a flexure and permits each arm 22 to flex, springboard fashion, in the directions of the arrows 88 in the y-z plane. As used herein it should thus be appreciated that a flexure is a spring member that is rigid in one plane and is constrained to flex in the orthogonal plane.

It should further be appreciated that when a clip 30A, 30B is deflected in its corresponding respective direction 88A, 88B, the resiliency of the thinner central region 25A, 25B of the base 24A, 24B, acting as a flexure, defines means for biasing the clips 30A, 30B toward the first, closed, position. The biasing force acts on the clip 30A, 30B in a direction shown by the arrows 90A, 90B, counter to the direction of motion 88A, 88B of the arms. The biasing forces must be substantially equal and in opposite directions. In general, whatever the number of arms used in the positioning apparatus, the force on each arm passes through the reference axis and the sum of forces when in the centering position substantially equals zero. Biasing means employing the thinner central region of the base 24 as a flexure (as shown in the FIGS. 1 to 4) is preferred for all disclosed embodiments, because when implemented in a single crystal material using a microfabrication technique precise control of the biasing forces is able to be attained. Typically the bias force on each arm is on the order of five (5) grams.

It should be understood that any other convenient mechanism may be used to define the means for biasing the arms and the clips 30 thereon toward the closed position so long as the force on each arm passes through the reference axis and the sum of forces on the arms when they are in the centering position is substantially equal to zero. Whatever form of biasing means is selected the bias force must increase with deflection of the arm.

Having defined the structure of the positioning apparatus 20 of the embodiment of FIGS. 1 and 2, the operation thereof in positioning a point P on the center axis and on the end face E of an optical fiber F along a predetermined reference axis R may be readily understood in connection with FIGS. 5 through 7.

Figure 6A:
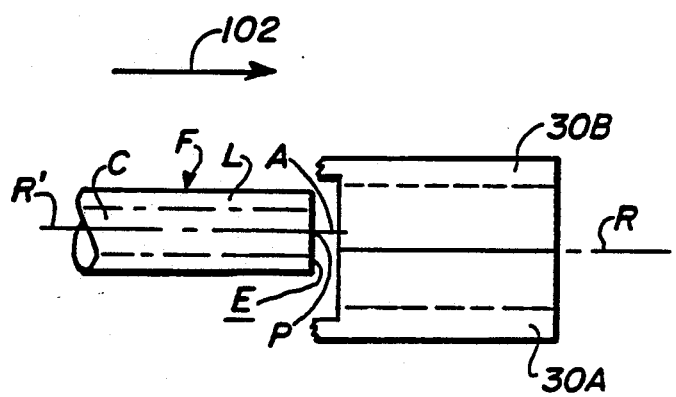
FIGS. 6A and 6B, 7A and 7B, and 8A and 8B are diagrammatic elevational and end views of the action of the clips disposed on the arms of the positioning apparatus shown in FIGS. 1 and 2 in response to the introduction of a fiber thereinto.
Figure 6B:
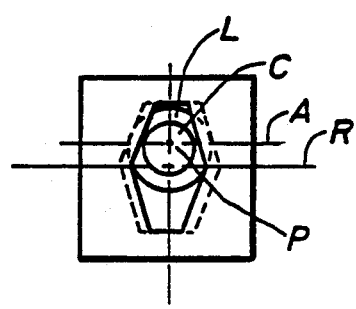
Figure 7A:
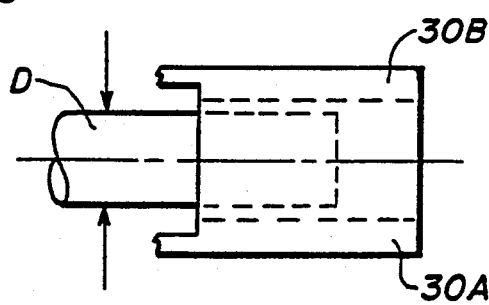
Figure 7B:
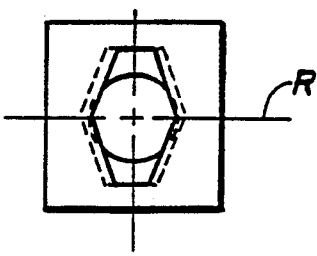

In operation the fiber F is inserted into the positioning apparatus 20 in the direction of the arrow 102 (FIG. 6A). The lead-in portions 68A, 68B (FIG. 1) cooperate to guide the fiber F into the guideway 98 (FIG. 2) defined by the registered troughs 60A, 60B in the enlargements 54A, 54B (FIG. 1). Because the axis R' of the guideway 98 is offset from the axis R of the fully funnel shaped channel 92 the guideway 98 serves to guide the face E of the fiber F toward the inlet end 94 of the channel 92 at a predetermined azimuth with respect to the axis R.

As a result the end face E of the fiber F enters the channel 92 and is initially displaced, or moved, through contact with at least one of the sidewalls 38A or 38B, 40A or 40B (or portions of the major surface 26A, 26B, if these are used to define the grooves 36A, 36B, as in FIG. 4) on one of the clips 30A, 30B, respectively, to the extent necessary to move a predetermined point P on an end face E of the fiber F toward alignment with the reference axis R.

Figure 8A:
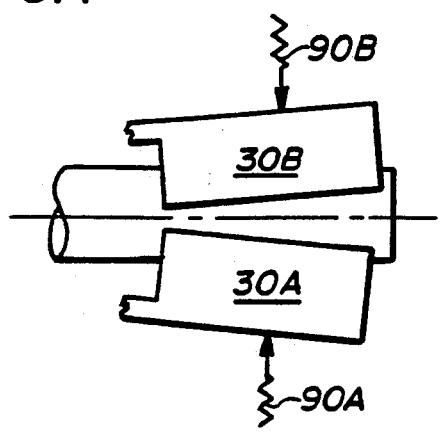
Figure 8B:
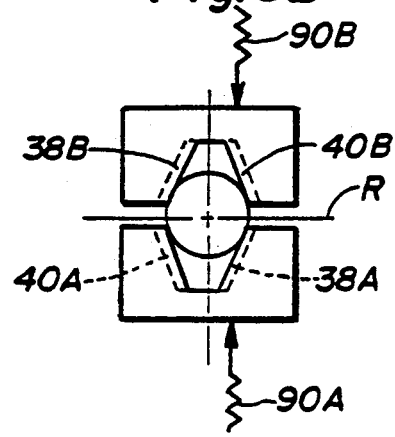
Figure 9:
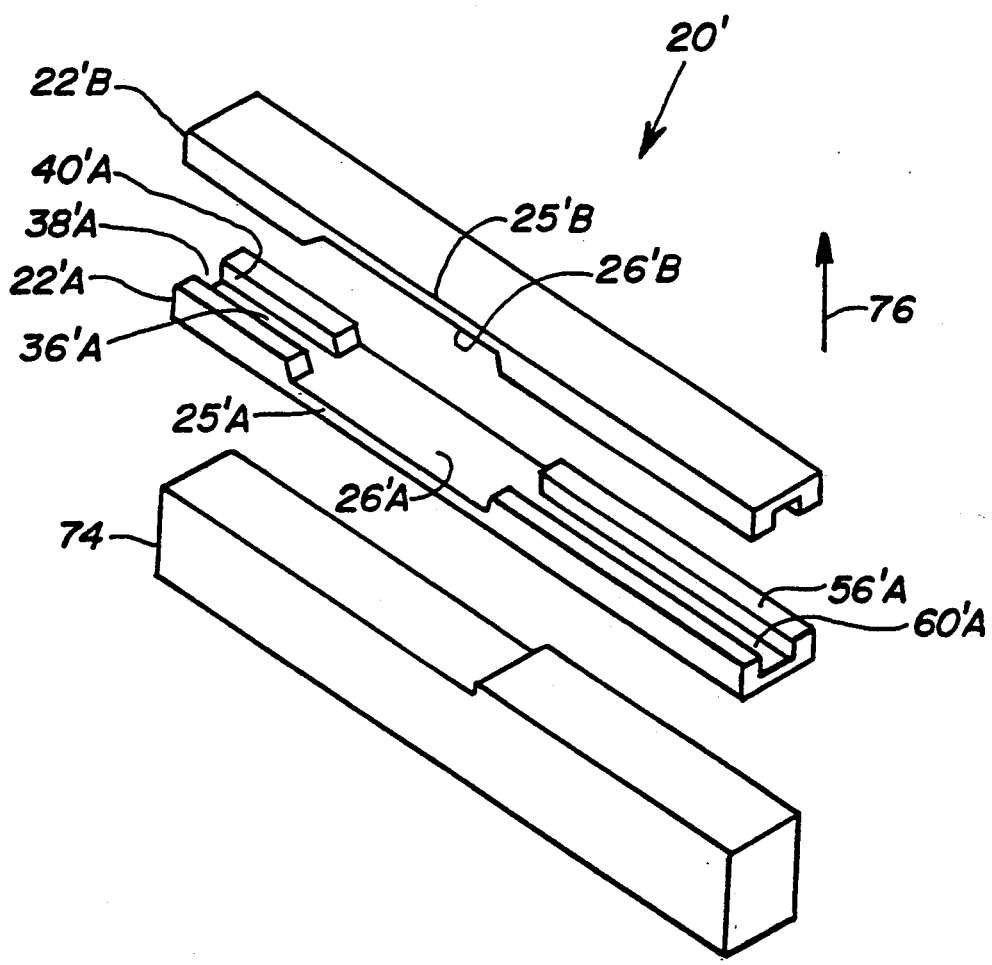
Figure 13:
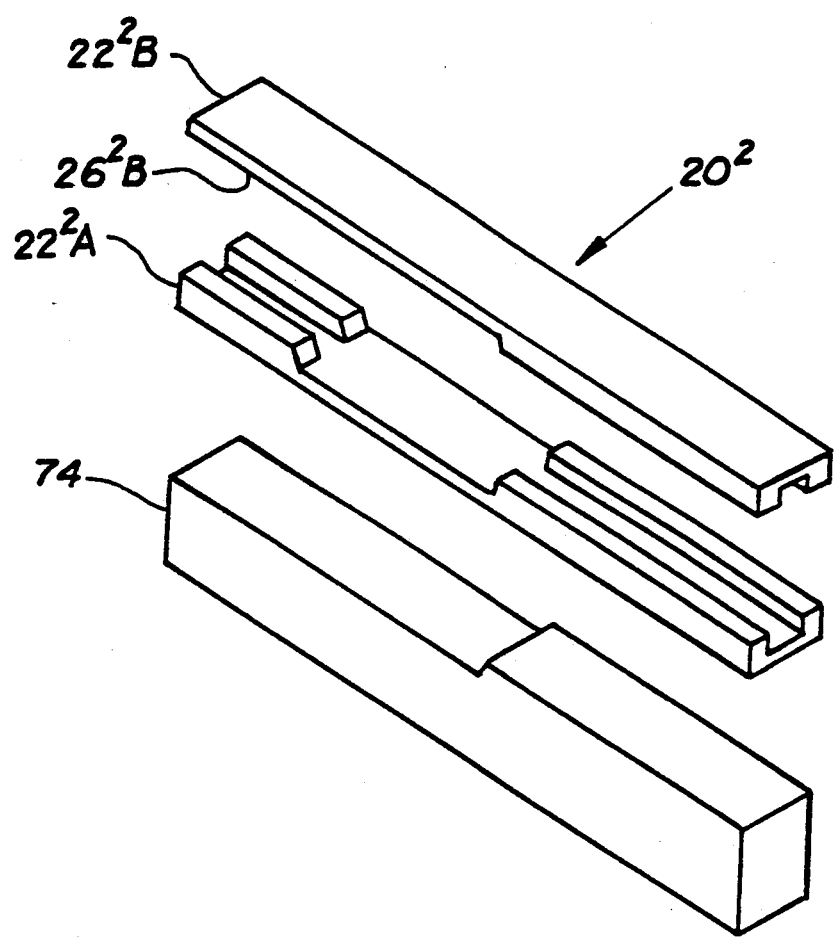

At some point on the path of axial insertion of the fiber F into the channel 92, as the end E of the fiber F moves toward the outlet end 96, the outer diameter of the cladding layer L of the fiber F exceeds the dimension of the channel 92. The arms 22A, 22B respond to a force in the directions 88A, 88B imposed thereon by the fiber F by moving against the biasing force from the first, closed, position, shown in FIGS. 7A, 7B, toward a second, centering, position showing in FIGS. 8A, 8B. In the centering position the clips 30A, 30B open against the bias force acting in the directions 90A, 90B generated by the flexing of the arms 22A, 22B, to separate the surfaces 34A, 34B thereon. However, this movement of the arms 22A, 22B from the first toward the second position positions the point P on the end face E of the fiber F on the reference axis R. The end face E of the fiber F thus exits through the outlet end 96 of the fully funnel shaped channel 92 with the point P precisely aligned with (i.e., within one micrometer of) the reference axis R, as is shown in FIGS. 8A, 8B. The fiber F is held in this position by contact with the sidewalls 38A, 38B, 40A, and 40B.

If the tabs 48A, 48B are formed on the abutments 32A, 32B these tabs cooperate to define a passage of uniform width along its axial length that communicates with the outlet of the funnel-like channel. The fiber F passes through and emerges from such a conduit with the point P on the end face of the fiber still along the reference axis R.

It should be noted that the movement of the arms could be other than the flexing thereof as described heretofore. It therefore lies within the contemplation of this invention to have the arms move in any other manner, as, for example, by any form of pinned or jointed (articulated) motion.

With reference now to FIGS. 9 through 12 an alternate embodiment of the positioning apparatus $20^1$ in accordance with the present invention is shown. In this embodiment the arms $22^1$ are, similar to the embodiment earlier discussed, articulably movable in cantilevered fashion with respect to each other against the bias of the flexure defined by the central portion $25^1$ thereof. However, the grooves $36^1$ formed in the arms $22^1$ are not converging grooves, but are uniform width grooves. Accordingly, the channel $92^1$ formed by the cooperative association of the arms $22^1$ when superimposed one on the other is a uniform width channel. The maximum dimension of such a channel $92^1$ in the plane perpendicular to the reference R is less than the outside diameter of the smallest anticipated fiber F.

A further modification to the positioning apparatus $20^1$ may be seen from FIG. 12. It is first noted that the planar walls $62^1$, $64^1$ of the troughs $60^1$ are parallel, rather than inclined with respect to each other. Moreover, the offset $100^1$ between the axes R and R' lies in the vertical plane, that is, in the plane containing the axes $70^1$ of the troughs $60^1$, as opposed to being offset laterally (i.e., in the plane containing the surfaces $56^1$). The lead-in portions $68^1A$, $68^1B$ are omitted here but may be provided.

In operation, a fiber F is inserted into the positioning apparatus $20^1$ and guided by the passage $98^1$ defined by the registered troughs $60^1A$, $60^1B$. Because the axis R' of the passage $98^1$ is vertically offset from the axis R of the channel $92^1$ the surface $26^1B$ of the arm $22^1B$ bounding the passage $98^1$ serves to guide the fiber F toward the inlet end $94^1$ of the channel $92^1$. The fiber F enters the channel $92^1$ and contacts with the edges of the sidewalls $38^1A$, $38^1B$, $40^1A$ and $40^1B$. Due to the sizing of the grooves $36^1A$, $36^1B$ the fiber F does not touch the major surface $26^1A$, $26^1B$ of the arms $22^1A$, $22^1B$, respectively. The fiber may be chamfered or tapered or a mechanical device may be used to facilitate insertion of the fiber into the channel $92^1$.

Since the fiber F exceeds the dimension of the channel $92^1$ the clips $30^1A$, $30^1B$ are displaced from the first, closed, position toward a second, centering, position. This movement of the clips $30^1A$, $30^1B$ maintains the point P on the end face E of the fiber F on the reference axis R. The end face E of the fiber F thus exits through the outlet end $96^1$ of the channel $92^1$ with the point P precisely aligned on the reference axis R. The fiber F is held in this position by contact with the edges of the sidewalls $38^1$A, $38^1$B, $40^1$A, and $40^1$B, as indicated by the character LC.

The embodiment of the positioning apparatus $20^1$ shown in FIGS. 9 to 12 can be further modified, as seen by the positioning apparatus $20^2$ shown in FIGS. 13 to 16. In this modification, the arm $22^2$B differs from those shown earlier in that no groove is provided therein (FIG. 15). In this embodiment, if the groove is a converging groove, a partially funnel-like channel is defined. The fiber F is guided by contact against the major surface $26^2$B and held in position on the reference axis R by contact with the major surface $26^2$B and the edges of the sidewalls $38^2$A, $38^2$B, again as indicated by the character LC.

FIGS. 17 and 18 are exploded and assembled perspective views, generally similar to FIGS. 1 and 2, of another alternate embodiment of a positioning apparatus $20^3$ in accordance with the present invention while FIG. 19 shows the end view thereof. In this embodiment, instead of the arms being articulably movable as described earlier, the arms are fixed relative to each other. Each of the arms $22^3$A and $22^3$B has a converging groove therein and the channel $92^3$ formed by the cooperative association of the arms $22^3$ when superimposed one on the other is fully funnel-like in form. The channel $92^3$ defines a minimum dimension in the plane perpendicular to the reference R that is, near its outlet end, less than the outside diameter of the smallest anticipated fiber F.

In operation, a fiber F is inserted into the positioning apparatus $20^3$ and guided through the passage $98^3$ toward the inlet end $94^3$ of the channel $92^3$. The fiber F enters the funnel-like channel $92^3$ and is guided by contact with one or more of the sidewalls $38^3$A, $38^3$B, $40^3$A and $40^3$B and/or major surfaces $26^3$A, $26^3$B to place the point P of the fiber F on the axis R. However, since the arms $22^3$ are fixed with respect to each other, the fiber F can only advance within the channel $92^3$ to the axial location where the outer diameter of the fiber F equals the local dimension of the channel $92^3$. At this axial location within the channel the fiber is held in position by a minimum of four point contacts (indicated by the characters PC) between the fiber F and each of the sidewalls $38^3$A, $38^3$B, $40^3$A, and $40^3$B. The dimension of the channel is such that the fiber is not able to contact the major surfaces of the arms $22^3$ when it is held along the reference axis R. FIG. 20 illustrates the fiber as the same is held within the channel $92^3$. The axial spacing 104 between the end face E of the fiber F and the outlet end $96^3$ of the channel $92^3$ varies, dependent upon the outer diameter dimension of the fiber F.

The positioning apparatus 20, $20^1$, $20^2$ and $20^3$ in accordance with any of the above-described embodiments of the invention may be used in a variety of applications which require the precise positioning of a point P on the end face E of a fiber F along a reference axis R.

Figure 21:
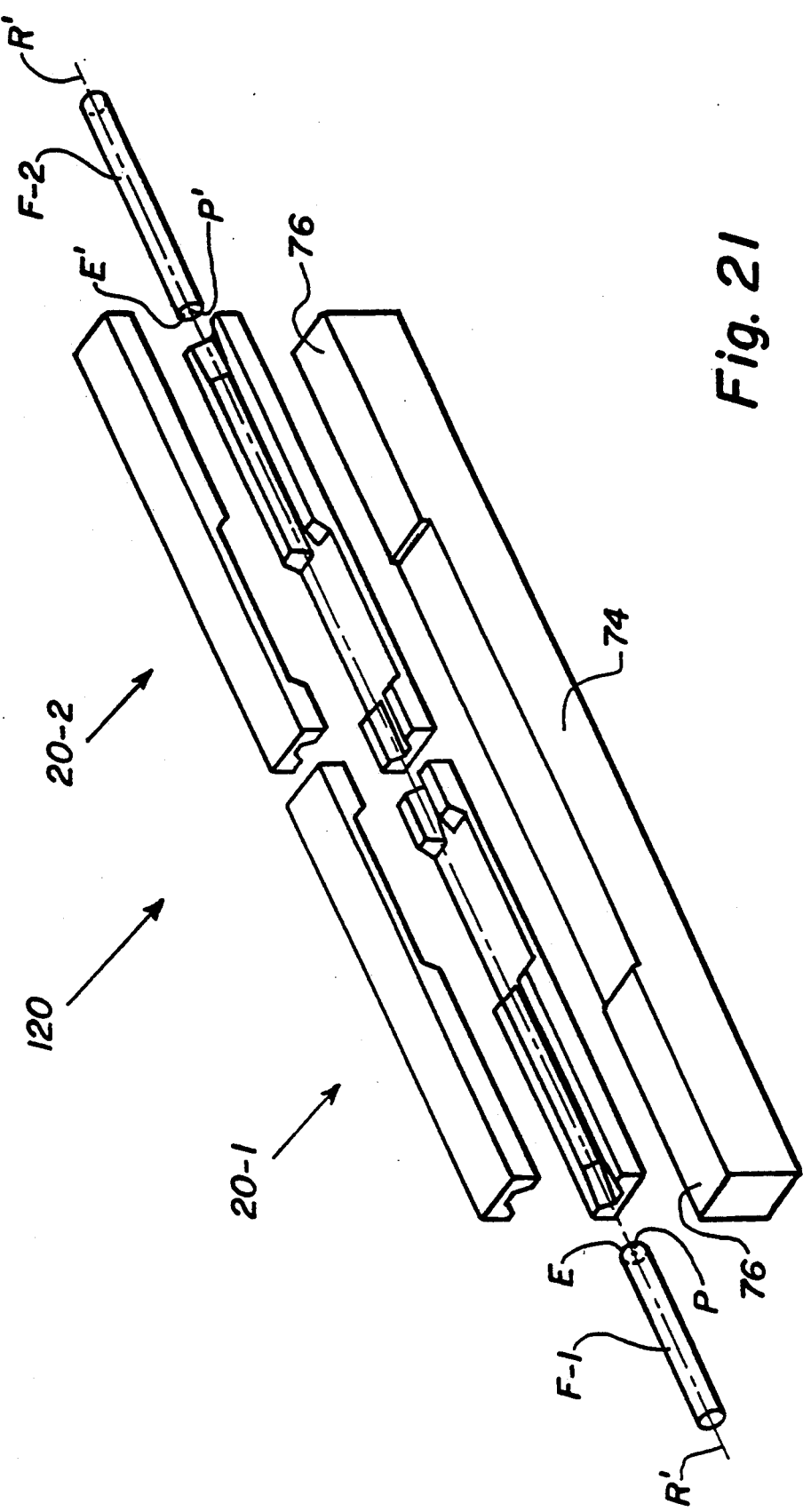
Figure 27:
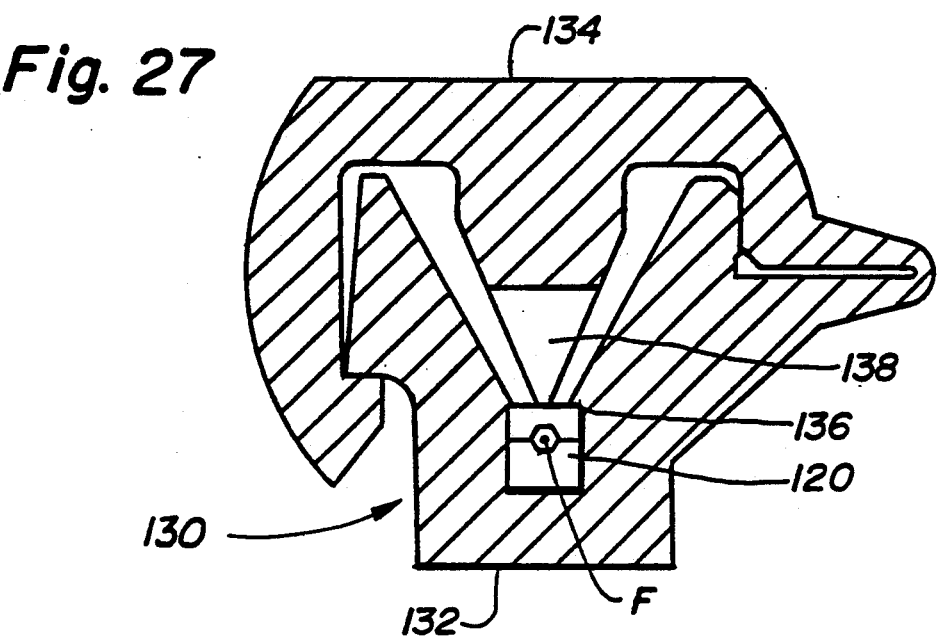
FIG. 27 is a section view of the housing of FIG. 25 in the fully closed position taken along section lines 27—27 of FIG. 26.

In FIGS. 21 and 22, a pair of positioning apparatus 20-1, 20-2 (corresponding to the embodiment shown in FIGS. 1 and 2) are arranged to define a fiber-to-fiber connector generally indicated by the reference character 120. In this arrangement the apparatus 20-1, 20-2 are confrontationally disposed with respect to the other so that the outlet ends 96 of the respective channels 92 therein are spaced a predetermined distance 122 with the respective reference axes R therethrough being collinear. To effect such an arrangement the foundation 74 is extended in an axial direction and each axial end thereof is provided with a planar attachment surface 76. Each positioning apparatus 20-1, 20-2 is mounted to its respective attachment surface 76.

The fibers F-1 and F-2 to be connected are inserted into the lead-ins 68 of the respective positioning apparatus 20-1, 20-2. Each positioning apparatus 20-1, 20-2, acting in the manner described above, serves to place the point P on the end face E, of the respective fiber F-1 or F-2 along the collinearly disposed axes R. The fibers F-1, F-2 are inserted in to the respective apparatus 20-1, 20-2 until the end faces E on each fiber abut. The ends E of the fibers F-1, F-2 are secured due to the above-described holding action of the positioning apparatus. If desired an suitable index matching adhesive, such as an ultraviolet curing adhesive such that manufactured and sold by Electro-Lite Corporation, Danbury, Conn. as number 82001ELC4480, may be used.

It should be understood that the fiber-to-fiber connector may be implemented using any of the other of the above-discussed alternative embodiments $20^1$, $20^2$, and $20^3$ of the positioning apparatus. In the event a pair positioning apparatus $20^3$ as shown in FIG. 17 is used (see FIGS. 23 and 24), the confronting ends of the positioning apparatus $20^3$-1, $20^3$-2 are preferably abutted and secured, or the pair of positioning apparatus formed integrally with each other. The spacing 122 between the end faces E of the fibers F-1, F-2 is, in this embodiment, defined by the sum of the distances 104-1, 104-2. The spacing 122 is filled with an index matching material, such as the adhesive defined above. To this end, an access port 124 is provided to permit the introduction of the index matching material into the region between the confronting end face of the fibers F-1, F-2.

Prior to insertion into the positioning apparatus (of whatever form) it should be understood that the jacket J (FIG. 29) of the fiber F is stripped in its entirety a predetermined distance from the free end thereof. The exposed portion of the fiber is cleaned with alcohol. The fiber is cleaved to form the end face E. If desired the end face E may be ground into a convex shape to yield a point or be lensed.

Figure 28:
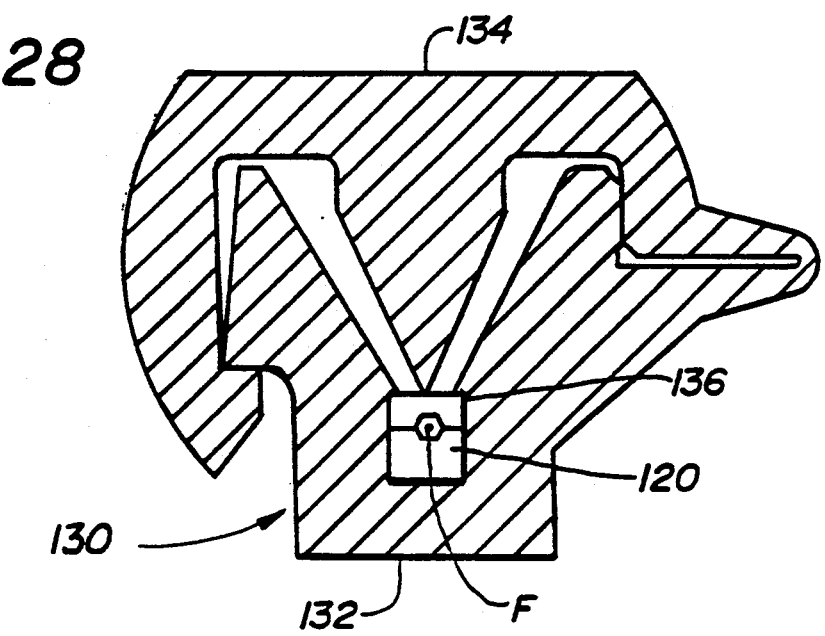
FIG. 28 is a section view generally similar to FIG. 27 of a housing used for the fiber-to-fiber connector shown in FIG. 24.

If desired the fiber-to-fiber connector 120 may be disposed in a suitable housing 130 (FIG. 25). The preferred form of the housing 130 is generally similar to that disclosed in U.S. Pat. No. 4,784,456 (Smith), assigned to the assignee of the present invention. This patent is hereby incorporated by reference herein. The housing 130 includes a base 132 and a cover 134. The base 132 is, in all cases, provided with a recess 136 that is sized to closely receive the connector 120. If the connector 120 is realized using any form of the positioning apparatus that articulates, the cover 134 must be provided with a corresponding recess 138 located so as to permit the articulating motion of the arms of positioning apparatus used to form the connector. If the connector 120 is realized using the form of the positioning apparatus shown in FIGS. 23 and 24, the recess 138 need not be provided. Such a housing 130 is shown in FIG. 28.

The cover 134 is segmented into three sections, 140A, 140B, 140C, each which is hinged to the base 132. The base 132 has, adjacent to each end of the recess 136, V-shaped grooved regions 142A, 142B. The top end sections 140A, 140B each contain respective generally tapered lands 143A, 143B. Each of the lands has serrations 145A, 145B respectively thereon.

In use a connector is inserted in the recess 136 of the housing 130. It is there held in place by friction but may be otherwise secured if desired. The central section 140C of the cover may then be closed, if desired. An optical fiber having a predetermined length of its jacket J stripped and cleaned, is inserted through one of the V-shaped grooved regions 142A, 142B to dispose the stripped end of the fiber into the connector 120. The grooved region serves to properly orient and position the fiber with respect to the connector 120 in the recess 136. The associated top end section 140A, 140B, as the case may be, is then closed and latched to the corresponding portion of the base 132 (FIG. 25, with the fiber omitted for clarity). When the top is secured to the base the serrations 145 act against the jacket on the fiber to urge, or to bias, the fiber toward the connector. A second fiber is correspondingly introduced into the housing and connector in an analogous manner. If not already done so, the central section 140C of the cover is then closed. The housing 130 is preferably formed by injection molding.

Figure 29:
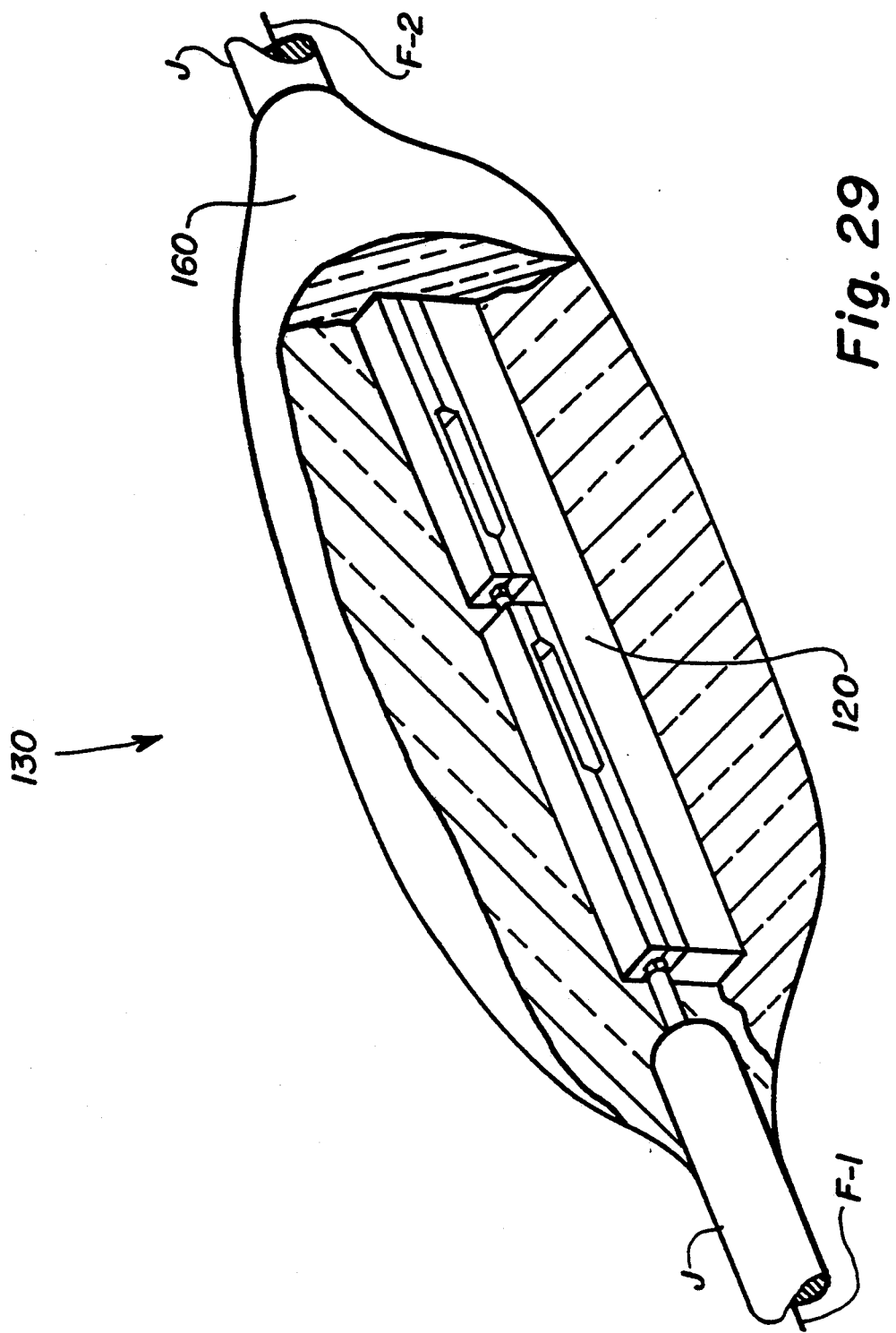
FIG. 29 is a isometric view of an alternate housing for a fiber-to-fiber connector formed of a pair of positioning apparatus.

As seen in FIG. 29, in another form the housing 130 may be implemented using a mass 160 of index matching material, such as that identified above. The mass 160 extends over both the connector 120 (to embed the same therein) and some predetermined portion of the jackets J of the fibers F-1, F-2.

The reference axis R on which the point P of the fiber F is positioned may itself extend collinearly with the axis X of any of a variety of devices. Accordingly, a positioning apparatus 20 may be used to accurately position the point P on the end face E of the fiber F with respect to the axis X of a particular device 170. FIGS. 30, 31 and FIGS. 32, 33 illustrate several examples of the use of a positioning apparatus 20 to locate a fiber F along an axis X of a device 170. The device 170 may, for example, be realized by any active optical component, such as a solid state laser, a photodiode, a light emitting diode, whether these devices are edge active devices or surface active devices. Although in the discussion that follows the reference character 20 is used to indicate the positioning apparatus, it should be understood that any one of the embodiments of the positioning apparatus $20^1$, $20^2$ or $20^3$ heretofore described may also used.

Figure 30:
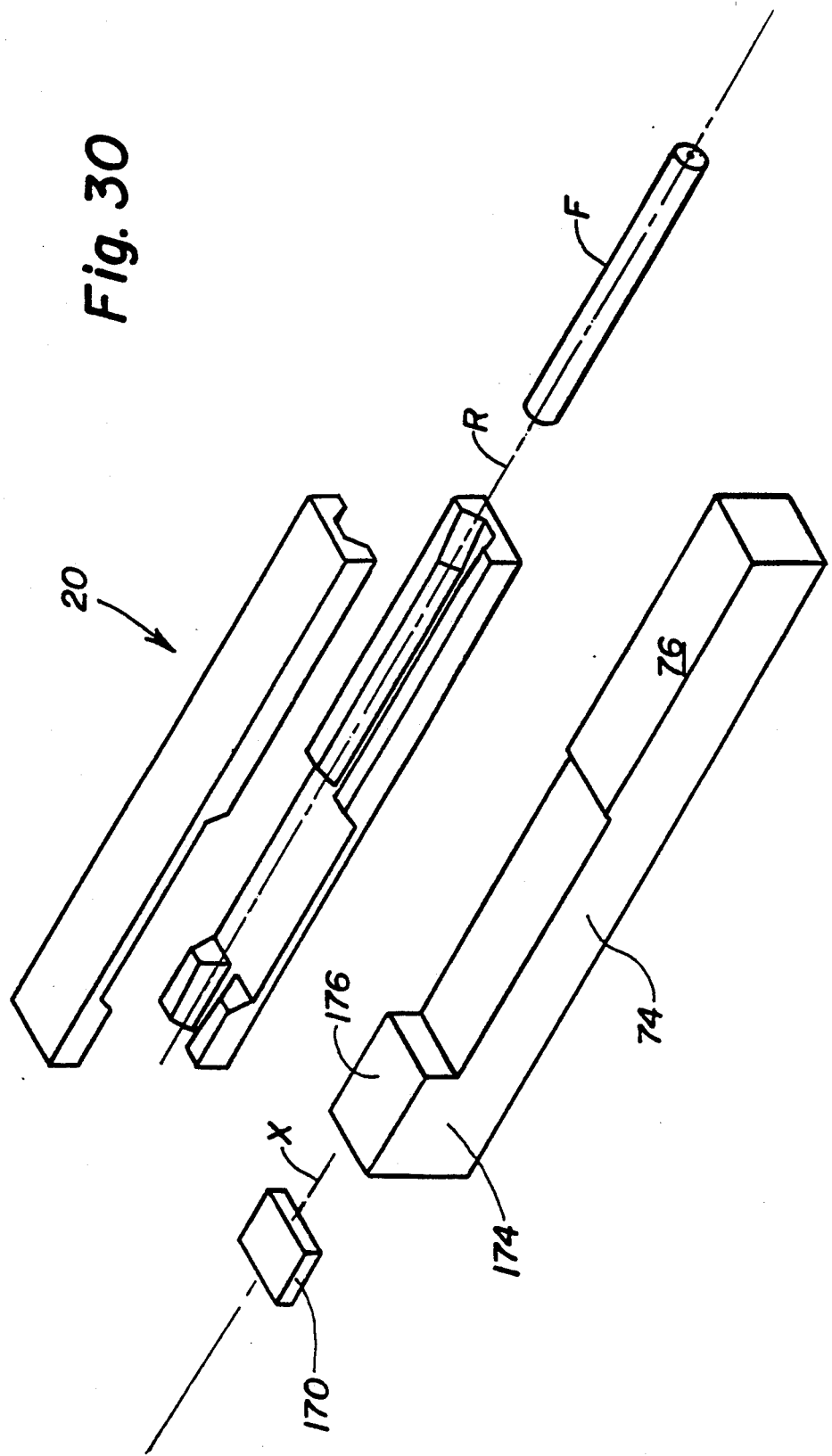
FIGS. 30 and 31 are isometric exploded and assembled views, respectively, illustrating the use of a positioning apparatus in accordance with the present invention to position an optical fiber with respect to the axis of an edge emitting active device, in which the device is surface mounted.
Figure 31:
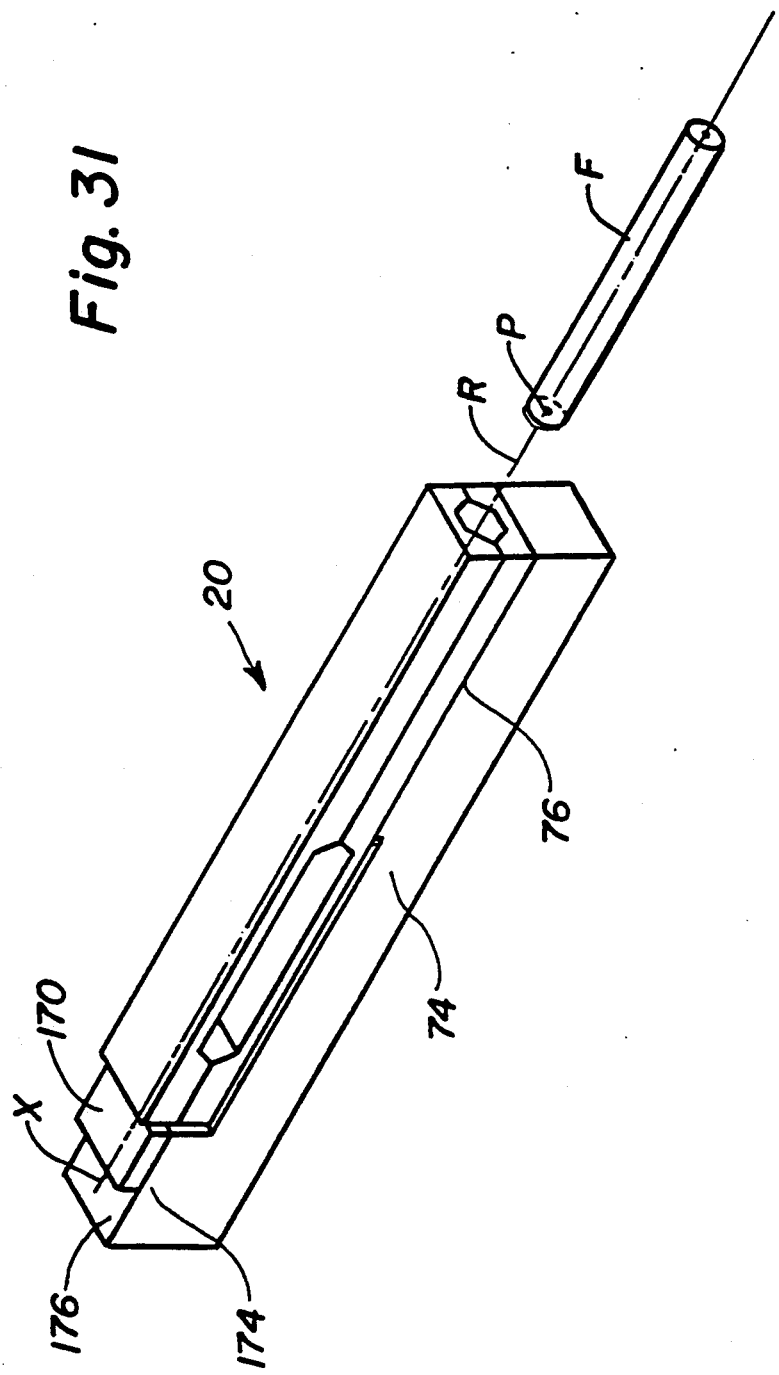

When used in connection with an edge active device 170 the arrangement in FIGS. 30 and 31 is preferred. In this arrangement the foundation 74 is axially extended to define a pedestal 174 at the axial end thereof. The upper surface 176 of the pedestal 174 defines a planar attachment surface. The surface 176 is spaced a predetermined distance above the attachment surface 76 or otherwise located such that when the active optical component 170 is mounted the surface 176 the axis X of the device 170 and the reference axis R are collinear. With the axes R and X collinear, the positioning of the point P on the fiber F along the axis R will automatically position that point P in the same relationship with the axis X. The device 170 must be accurately mounted on the surface 176 so that its axis X is collinearly aligned with the axis R.

To mount the device 170 the surface 176 may be provided with a layer of solder layer, such as a gold/tin solder. The device 170 may have a corresponding layer of the same material. The device 170 is positioned on the surface 176 using a suitable micropositioning apparatus, such as a vacuum probe. The device is aligned to the edge, heated above the melting point of the solder and cooled, so that the solder forms a bond.

When used with a surface active device, as seen in FIGS. 32 and 33, the active surface of the device 170 is secured to the front surface 178 of the pedestal 174. Attaching the device to the front surface 178 is believed to provide sufficient bonding area to secure the device 170 to the positioning apparatus 20. The surface 176 of the pedestal 174 is relieved to avoid obstruction between the active region of the device 170 and the end face E of the fiber F.

It should also be appreciated, as is illustrated in FIG. 31A, that the positioning apparatus in accordance with any one of the embodiments heretofore described may be configured to accurately position a lens, such as a ball or a rod lens L, with respect to the axis X of the device 170 (whether the same is an edge active or a surface active device). The positioning apparatus would be modified to provide a seat 31S in the clips 30 thereof sized to accept the lens L.

In addition to the various embodiments of the two-armed configurations for the positioning apparatus 20, $20^1$, $20^2$ and $20^3$ of the present invention previously disclosed, it lies within the contemplation of this invention for a positioning apparatus in accordance with this invention to exhibit more than two arms 22.

In this regard FIGS. 34A to 34C generally illustrate a positioning apparatus $20^4$ having three arms 22A, 22B and 22C.

FIGS. 34D through 34F generally illustrate a positioning apparatus $20^5$ having four arms 22A, 22B, 22C and 22D. A detailed description of an embodiment of a four armed positioning apparatus $20^5$ is set forth hereinafter.

The extension to even greater number of arms would be readily apparent to those skilled in the art.

Generally speaking, in FIG. 34A each the arms are configured similar to the form of the arms discussed above. The arms may, if desired carry a groove, although it should be understood that such is not required. In FIGS. 34B and 34E the arms are configured from rods. Although the rods shown as round in cross section it should be understood that they can have any desired alternate cross section. In FIGS. 34C and 34F the arms are configured in a generally planar bar form. As will be fully set forth herein, in FIG. 34D the four arms may be formed by sawing the upper and lower arms (indicated by the characters 22A, 22B in FIGS. 1 to 4) along a cut line extending perpendicular to the major surfaces 26 and 28 of each of the arms, thereby to define upper and lower pairs of arm segments, or "fingers". As used in this application, the term "fingers" is to be understood to be the structures defined when an "arm", as that term has been used herein, is subdivided into two axially elongated segments.

However configured the arms are shown in FIGS. 34A through 34F as angularly juxtaposed in a surrounding relationship to the channel 92 defined their cooperative association. Similar to the situation described heretofore the resiliency of the arms defines the biasing means which urge the arms toward the closed position. However, it should be understood that the biasing means may be otherwise defined, so long as the force on each arm passes through the reference axis and the sum of forces on the arms when they are in the centering position is substantially equal to zero. Whatever form of biasing means is selected the bias force must increase with deflection of the arm. The arms act against the fiber F inserted into the channel along the various lines of contact LC illustrated in FIG. 34 to maintain the predetermined point on the fiber on the reference axis R.

In practice, during fabrication of the positioning device misalignment may sometimes occur between the first and second arm in the arm pair (FIG. 1). As a result, in use, the fiber may be supported by only two diametrically opposed sidewalls on the first and second arms (see FIG. 43). Thus, the fiber may not be positioned to lie along the reference axis.

A positioning apparatus $20^5$ in accordance with the embodiment of the invention shown in FIGS. 35 through 40 is believed able to avoid this result. With reference to these Figures it is seen that each arm ($22^5$A, $22^5$B, FIG. 35) is itself longitudinally slit along slit lines $21^5$ thereby to define a set of four fingers, $22^5$-1, $22^5$-2, $22^5$-3, $22^5$-4, arranged into a first, upper, pair of fingers ($22^5$-1, $22^5$-2) and second, lower, pair of finger pairs ($22^5$-3, $22^5$-4).

Figure 36A:
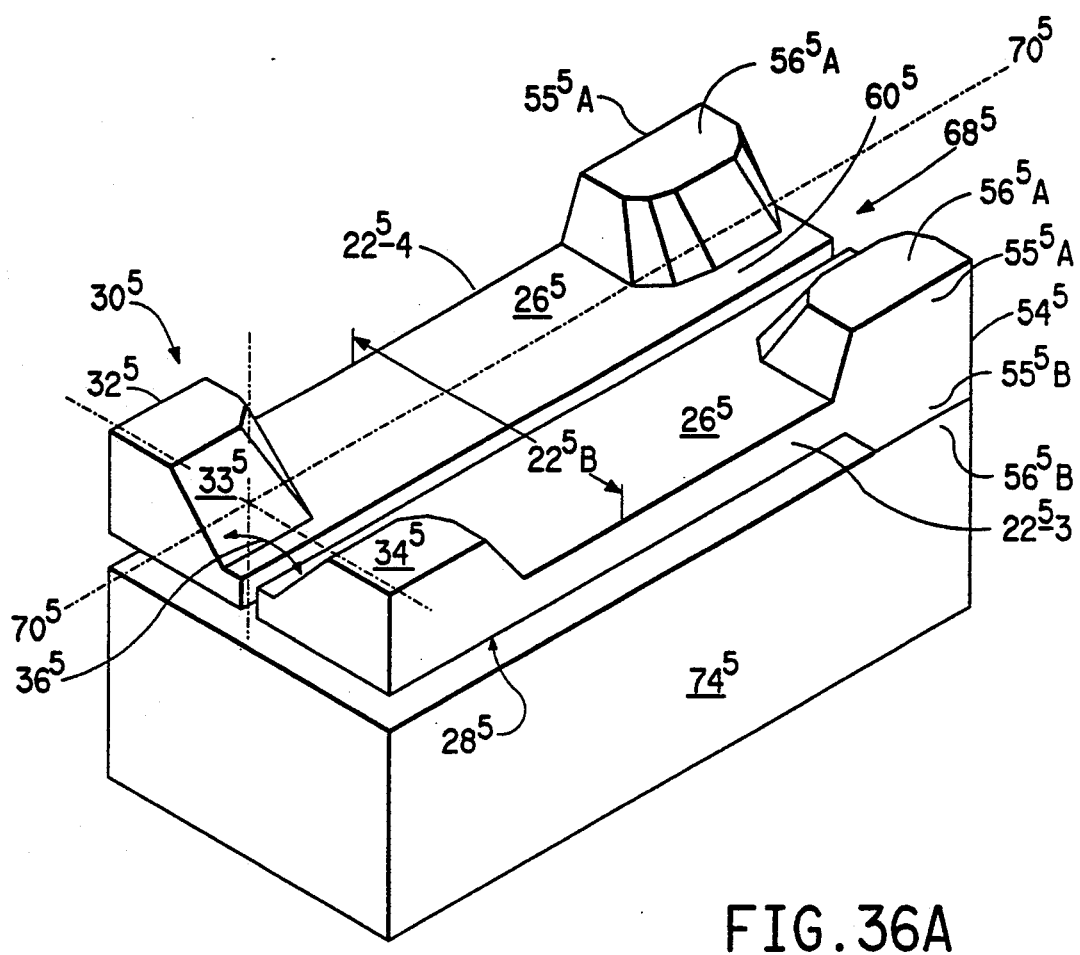
FIGS. 36A and 36B are an isolated perspective views of two of the fingers of the positioning apparatus of FIG. 35.

As shown in FIG. 36A, in a manner generally similar to the earlier discussed embodiments, each finger in the set includes a base portion $24^5$ having a first major surface $26^5$ and a second, opposed, major surface $28^5$. The base portion $24^5$ extends along the full length of each finger and the dimension of the central region $25^5$ of the base portion $24^5$ defines the basic dimension of each finger.

A clip generally indicated by the reference character $30^5$ is defined at a first end of each finger $22^5$. The clip $30^5$ is formed in a relatively thicker abutment portion $32^5$ that lies on the first surface $26^5$ of each finger $22^5$. The abutment $32^5$ has a planar surface $34^5$ thereon that preferably lies parallel to the first major surface $26^5$. Again, to provide some feeling for the physical dimensions involved, the finger $22^5$ has an overall length dimension on the order of twenty four hundred (2400) micrometers and a width on the order of eight hundred (800) micrometers. In the central region $25^5$ each finger $22^5$ has a thickness dimension on the order of one hundred (100) micrometers.

Each abutment $32^5$ includes a planar sidewall $33^5$ that extends in an inclined manner (at an angle of 54.74°) from the perpendicular to the major surface $26^5$ of each finger. The sidewalls $33^5$ in the fingers of the first pair $22^5$-1 and $22^5$-2 cooperate to define a uniform width groove $36^5$ while the sidewalls $33^5$ in the fingers in the other, mating, finger pair $22^5$-3 and $22^5$-4 also cooperate to define a similar uniform width groove $36^5$.

Each finger has, at the end opposite the abutment $32^5$, an enlargement generally indicated by the reference character $54^5$. The enlargement has abutments $55^5$A and $55^5$B thereon. Each abutment $55^5$A is provided with a wall $62^5$ that cooperates with the corresponding wall $62^5$ on the other finger in the pair and with a portion of the major surface $26^5$ of the base portion $24^5$ near the second end thereof to form a nonconverging, uniform width, truncated V-shaped trough $60^5$. In the embodiment shown in FIGS. 35 and 36 the trough $60^5$ is uniform in depth along its axial length, as measured with respect to dimension line erected perpendicular to the surface $56^5$A extending toward the major surface $26^5$. The trough has an axis $70^5$ extending centrally and axially therethrough. The trough $60^5$ is wider than the width dimension of the groove $36^5$. In a more preferred arrangement the trough $60^5$ communicates with a converging lead-in $68^5$ defined by the cooperative association of surfaces $69^5$ provided on each abutment $55^5$A on the fingers in the pair.

Figure 36B:
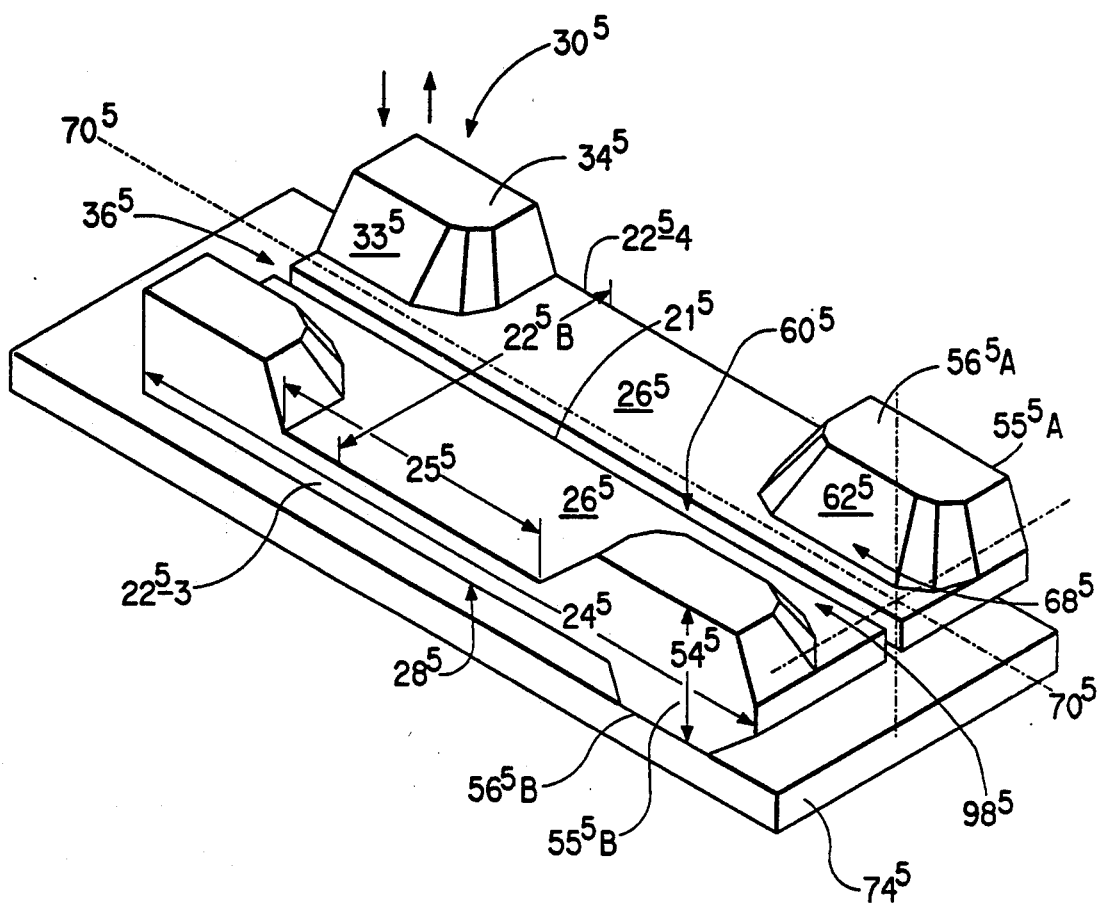

A most preferred arrangement has two angled surfaces at each lead-in corner of each abutment, as shown in FIG. 36B. Abutments $32^5$ looked similar to the abutments $55^5$A before a cut is made to form the linear front edges of the abutments $32^5$, as shown in FIG. 36B. As will become clearer herein, the surfaces $56^5$A on the abutments $55^5$A of opposed finger pairs are joined, by any convenient means of attachment, as by fusing or soldering. In FIG. 36B the lateral surfaces of the abutments $32^5$ and the abutments $55^5$A are ramped or inclined with respect to the major surfaces $26^5$.

The surface $56^5$B on the abutment $55^5$B depending from the surface $28^5$ is spaced a predetermined distance $80^5$ from the surface $28^5$ of the finger $22^5$. As will also become clearer herein, the abutment $55^5$B thereby functions as a standoff to space the finger away from a foundation or slab on which it is mounted.

In the assembled condition, best shown in FIGS. 35 and FIGS. 37 through 40, corresponding fingers in each pair are disposed in superimposed relationship one above the other, with the groove $36^5$ and the trough $60^5$ cooperatively defined by the fingers in one pair registering with the corresponding groove and trough formed by the cooperative action of the fingers in the other pair.

Figure 35:
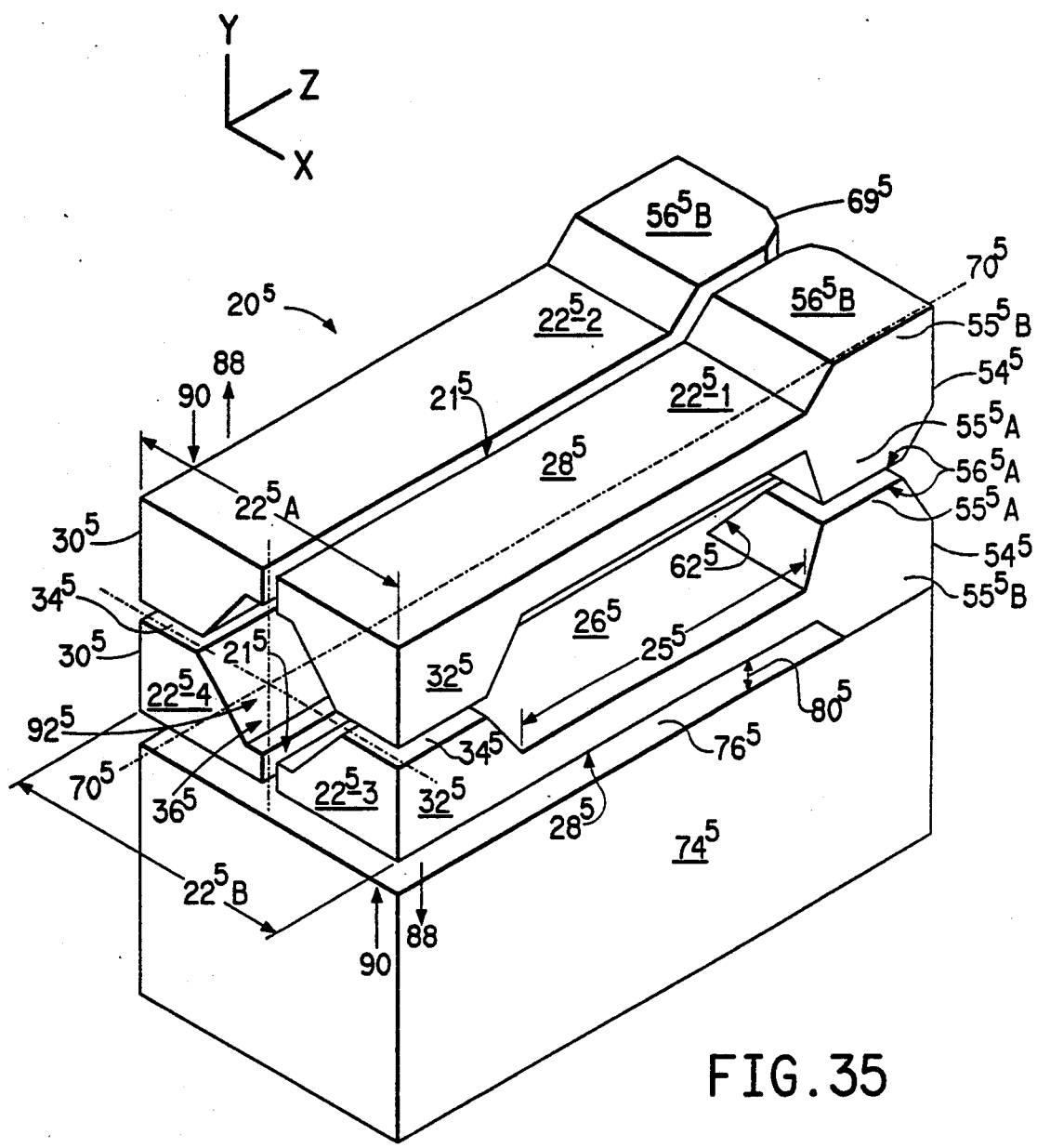
FIG. 35 is a perspective view of a positioning apparatus having a set of four articulably movable arms in accordance with an alternate embodiment of the present invention for positioning the center point on the end face of an optical fiber with respect to a predetermined reference axis, the mounting foundation being omitted.
Figure 38:
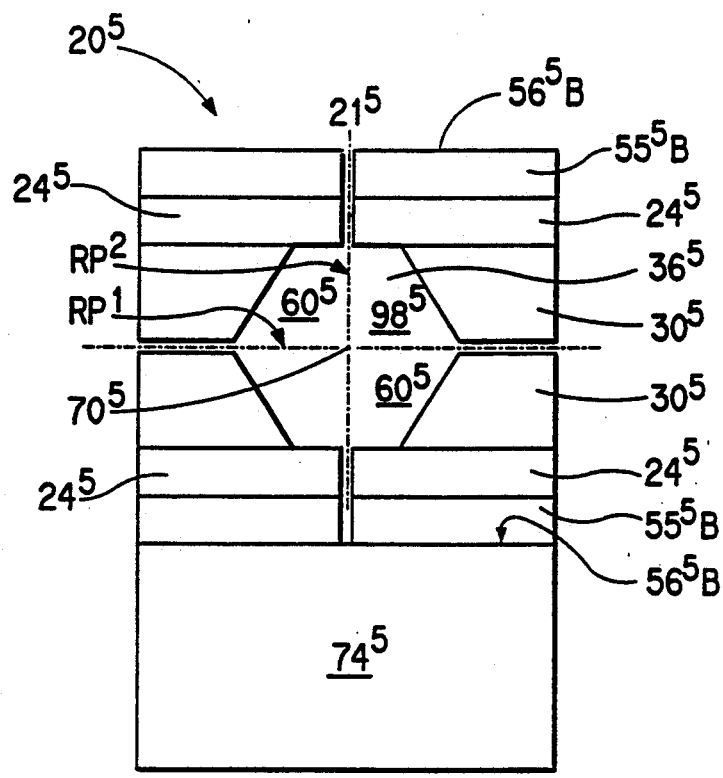
FIGS. 38 and 39 are sectional views of the assembled positioning apparatus of FIG. 37, respectively taken along section lines 38—38 and 39—39 in FIG. 37.
Figure 39:
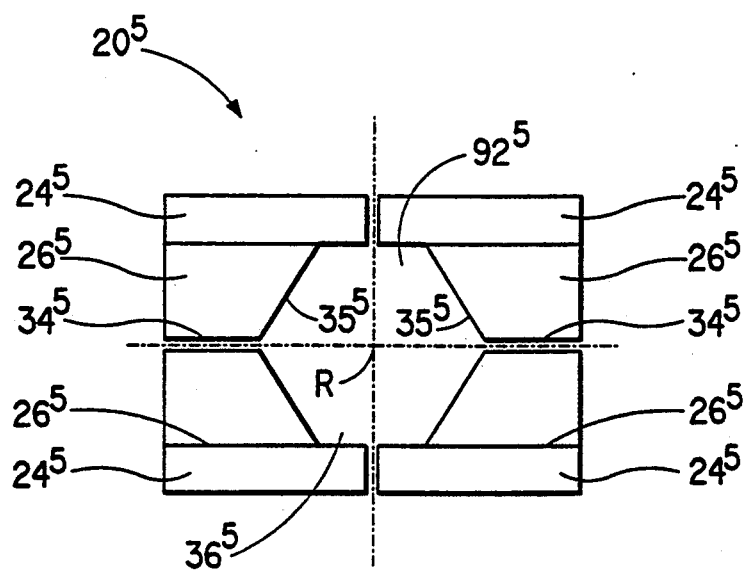

The grooves $36^5$ formed by the cooperative action of the fingers in each pair are themselves registered and thus cooperate to define a channel $92^5$ (FIGS. 35 and 39). The channel $92^5$ has an input end $94^5$ and an output end $96^5$. The reference axis R extends centrally and axially through the channel $92^5$. Preferably, the reference axis R lies in a reference plane $RP_1$ containing the surfaces $56^5$A on each finger $22^5$ (see FIG. 38). Most preferably, the reference axis R also lies in a second reference plane $RP_2$ (FIG. 39) containing the slit lines $21^5$ defining each pair of fingers in the finger set. It should be understood that manufacturing tolerances can result in slight misalignment of axis R with respect to the reference plane $RP_2$. The consequences of such a misalignment will be discussed more fully hereafter.

The registered troughs $60^5$ (and lead-ins $68^5$, if present) cooperate to define a guideway $98^5$ (FIGS. 36B and 38). The axis R' through the guideway $98^5$ lies in the plane containing the conjoined surfaces $56^5$A of the abutments $55^5$A (see FIG. 38). The plane $RP_2$ (FIG. 38) contains the axes of the troughs. The axes R and R' both lie in the reference plane $RP_1$ (the plane of the surfaces $56^5$A) and should preferably both lie in the reference plane $RP_2$.

In the embodiment shown in FIGS. 35 through 40 the surfaces $34^5$ on opposed corresponding fingers in each pair are, when in a first, closed, position, either in contact with each other or may, as preferred, be within a predetermined close distance to each other to insure they will not be affected in joining operations. For optical fibers the predetermined close distance is typically on the order of one (1) to two (2) micrometers. The planar surfaces 34 are not secured to each other and thus may move to a second, centering, position, as will be described.

As seen in FIG. 35 the positioning apparatus $20^5$ further includes, in the preferred instance, a mounting slab $74^5$ having a planar attachment surface $76^5$ thereon. The surface $56^5$B of the abutment $55^5$B on each finger $22^5$-3, $22^5$-4 is secured, as by fusing or soldering, to the planar attachment surface $76^5$ on the slab $74^5$. Owing to the presence of the abutment $55^5B$, the surfaces $28^5$ on the fingers $22^5$-3, $22^5$-4 of the lower pair are spaced the distance $80^5$ from the attachment surface $76^5$. It should be understood that the abutment $55^5B$ may be omitted, and the lower fingers $22^5$-3, $22^5$-4 may be mounted to a foundation 74 having a step 82 thereon similar to that shown in FIG. 1, in order to provide the clearance distance $80^5$ necessary to permit the movement of the lower fingers in each pair. The fingers $22^5$-1, $22^5$-2 in the upper pair of fingers may also be secured, as by fusing or soldering, to the planar attachment surface $76^5$ on a second slab $74^5$. The second slab $74^5$ is shown in outline in FIG. 35.

When assembled, as shown in FIG. 35, the clips $30^5$ disposed at the ends of the fingers $22^5$ are supported in a cantilevered fashion from the conjoined enlargements $54^5$ at the opposite ends of the fingers. Each of the fingers $22^5$ is relatively rigid in x-z plane, as defined by the coordinate axes shown in FIG. 35. Moreover, the relatively thin dimension of the central region $25^5$ of the base portion $24^5$ of each finger $22^5$ axially intermediate the respective abutments $32^5$ and the enlargements $54^5$ acts as a flexure and permits the clips $30^5$ at the end of each finger $22^5$ to flex, springboard fashion, in the directions of the arrows $88^5$ in the y-z plane. Again, as the term is used herein, a flexure is a spring member that is relatively rigid in one plane and is constrained to flex in the orthogonal plane.

It should further be appreciated that when a clip $30^5$ is deflected in its corresponding respective direction $88^5$ the resiliency of the thinner central region $25^5$ of the base $24^5$, acting as a flexure, defines means for biasing the fingers $22^5$ and the clips $30^5$ thereon toward the first, closed, position. The biasing force acts on each clip $30^5$ in a direction shown by the arrows $90^5$ counter to the biasing directions $88^5$. It should be understood that any other convenient mechanism may be used to provide the means for biasing the clips $30^5$ toward the closed position. The biasing forces must be substantially equal and in opposite directions. Biasing means employing the thinner central region $25^5$ of the base $24^5$ as a flexure is, however, again preferred because when implemented in a single crystal material using a microfabrication technique precise control of the biasing forces is able to be attained. Typically the bias force on each finger is on the order of twenty (20) grams.

Having defined the structure of the positioning apparatus $20^5$ in accordance with this embodiment of the invention, the operation thereof in positioning a point P on the center axis and on the end face E of an optical fiber F along a predetermined reference axis R may be readily understood in connection with FIGS. 38 through 43. As mentioned earlier, and as is clearly visible in FIG. 41, when positioning the point P into alignment with the reference axis R the positioning apparatus actually contacts the fiber at contact points lying a close distance from the end face E.

Figure 37:
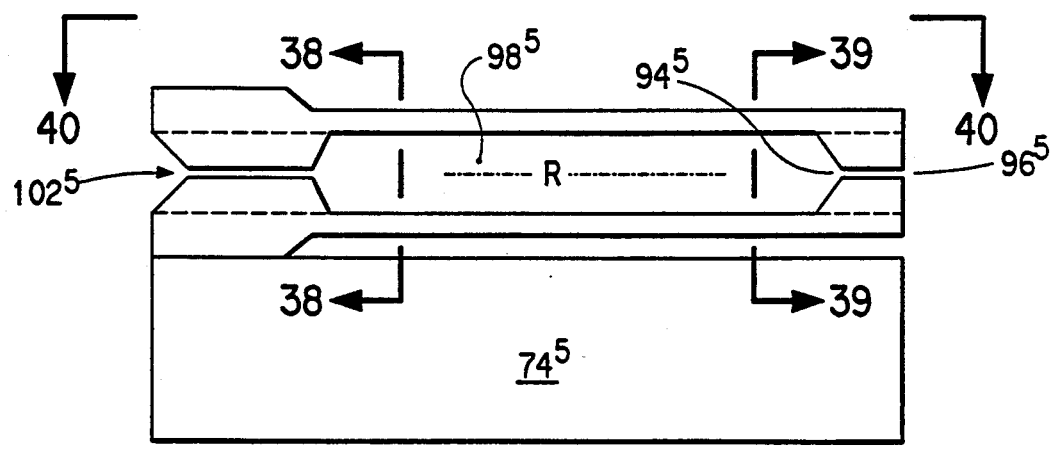
FIG. 37 is a side elevation view of the assembled positioning apparatus of FIG. 35.
Figure 41:
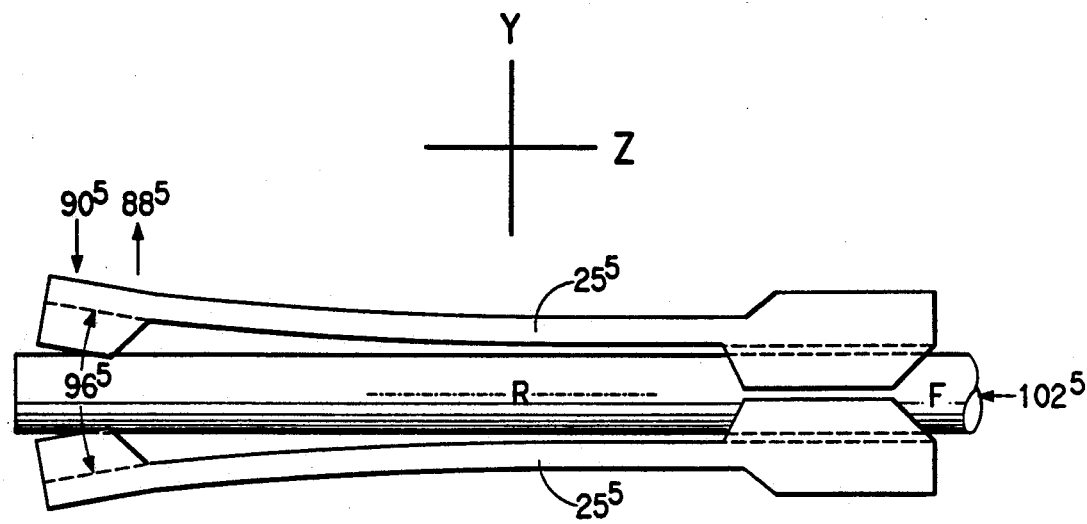
FIG. 41 is a side elevational view and FIG. 42 is a front elevational view of the assembled positioning apparatus with the fingers holding a fiber in the centering position, the mounting foundation of the positioning apparatus being omitted.

Assuming that the reference axis R (FIG. 39) of the channel 92 aligns with both the first and second reference planes $RP_1$, $RP_2$ (FIG. 38), the operation of the positioning device $20^5$ is substantially identical with the operation of the positioning device shown and discussed earlier in connection with FIG. 6 through 8. Thus, the fiber F is inserted into the positioning apparatus $20^5$ in the direction of the arrow $102^5$ (FIGS. 37, 41). The fiber F is inserted into the guideway $98^5$ defined by the registered troughs $60^5$. The fiber F enters the channel $92^5$ and is initially displaced, or moved, through contact with at least one of the sidewalls $33^5$ or portions of the major surface $26^5$ used to define the grooves $36^5$ on one of the clips $30^5$ to the extent necessary to accurately place a predetermined point P on an end face E of the fiber F toward alignment with the reference axis R.

Figure 42:
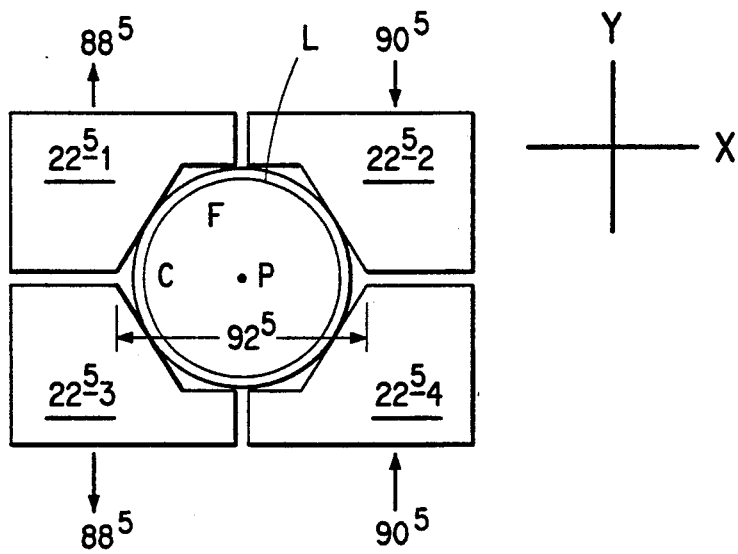
Figure 43:
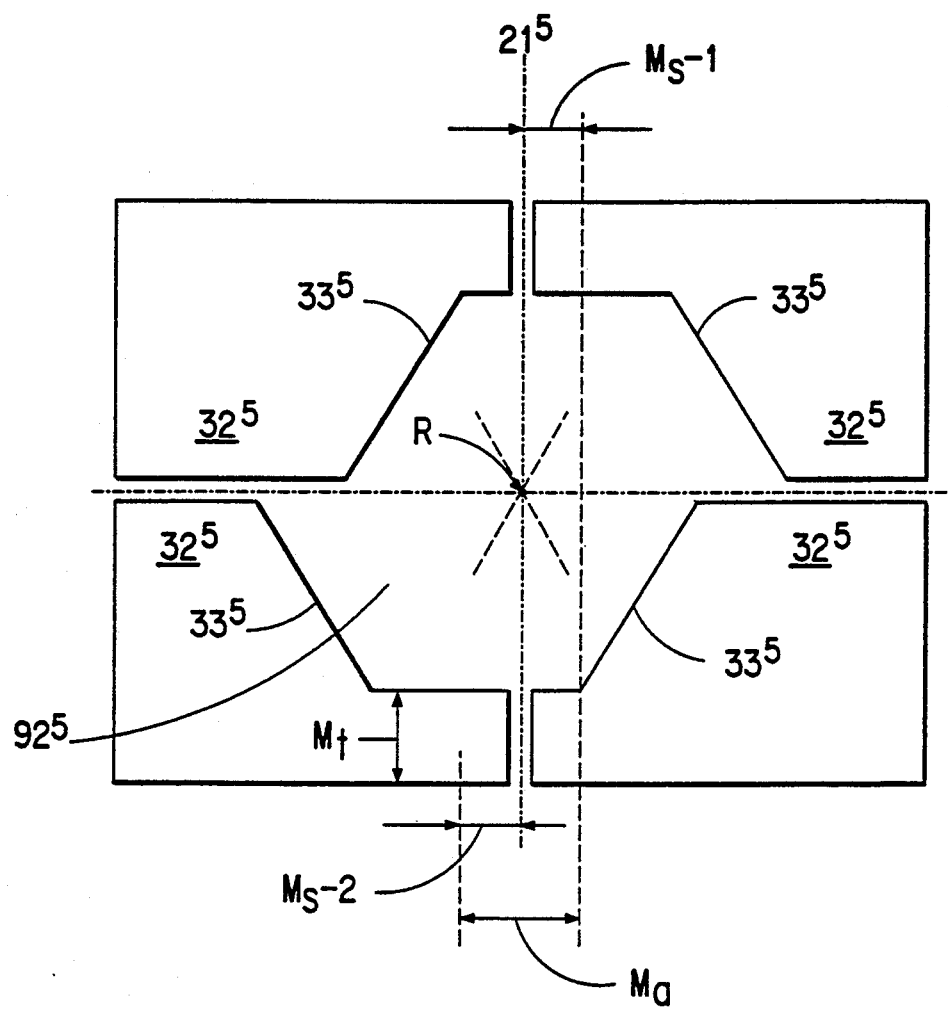

Since the outer diameter of the cladding layer L, shown on FIGS. 41 and 42, of the fiber F exceeds the dimension of the channel $76^5$ formed by the sidewalls the fingers $22^5$ respond to a deflecting force in the directions $88^5$ imposed thereon by the fiber F by displacing from the first, closed, position (shown in FIG. 39) toward a second, centering, position shown in FIGS. 42 and 43. In the centering position the clips $30^5$ open against the bias force acting in the directions $90^5$ generated by the flexing of the fingers $22^5$ to separate the surfaces $34^5$ thereon. This movement of the finger $22^5$ from the first toward the second position accurately positions the point P on the end face E of the fiber F in alignment with the reference axis R. The end face E of the fiber F thus exits through the outlet end $96^5$ of the channel $92^5$ with the point P accurately positioned in alignment with the reference axis R, as is shown in FIGS. 34 and 42. The fiber F is held in this position by contact with the sidewalls $33^5$.

As alluded to earlier, in some instances, owing either to misalignment between arms (before they are slit to form finger pairs), misalignment between the slit lines $21^5$ in each finger pair and the desired location of the slit lines on each arm, mismatches of finger thickness, and/or mismatches of finger widths, the assembled position of the superimposed finger pairs will appear as shown in FIG. 43. Diametrically opposite sidewalls $33^5$ on diametrically opposite abutments $32^5$ are not equally spaced from the reference axis R. The misalignment of the arms (prior to slitting to form finger pairs) is indicated by the reference character $M_a$. The misalignment of resulting slit lines $21^5$ is indicated by the reference character $M_{S-1}$ and $M_{S-2}$. The mismatches of finger thickness is indicated by the reference character $M_1$. The mismatches of finger width is indicated by the reference character $M_w$.

Figure 44:
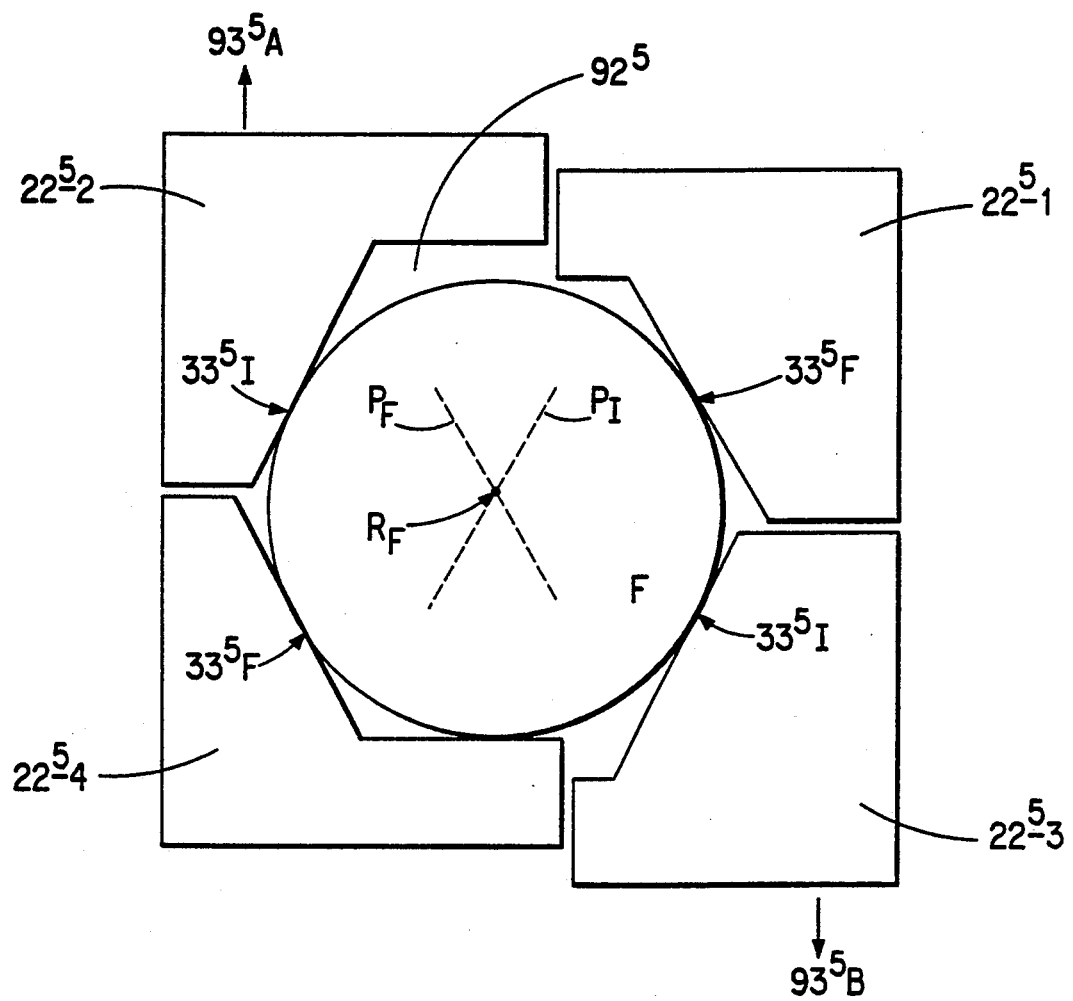
FIG. 44 is a view illustrating the misaligned finger pairs holding a finger in the centering position.

As seen in FIG. 43 when a fiber F is inserted into the channel $92^5$ formed from arms or fingers with such misalignment(s), the fiber F will first strike a first, and then the second, of two diametrically opposed ramping lateral surfaces of the lead-ins of the abutments $32^5$ (FIG. 36B) before contacting the sidewalls $33^5$. These initial contact points on the fingers $22^5$-2, $22^5$-3 are illustrated in FIG. 44 at reference characters $33^5$I. Those sidewalls $33^5$ first contacted by the fiber F are forced apart in the directions $93^5$A, $93^5$B. However, since the bias forces generated by the movement of the first contacted sidewalls are opposite, the fiber F becomes centered in an interim centered position in a plane parallel to and centrally between such two surfaces. This interim centered position lies at some point in the plane indicated in FIG. 44 by the line denoted at reference character $P_1$.

Continued advancement of the fiber F through the channel $92^5$ causes the outer diameter of the fiber F to touch one or both of the remaining sidewall pair. The first touch of the fiber to the sidewalls $33^5$ is not the final position of the fiber. The final position of the fiber is achieved when the two fingers on the sidewall pair $22^5$-1, $22^5$-4 (FIG. 44) have moved sufficiently to center the fiber. These final contact points are illustrated in FIG. 44 at reference characters $33^5$F. Since the bias forces created by movement of these last two sidewalls are also equal and oppositely directed the fiber is finally centered on the intersection of the plan $P_I$ and another plane $P_F$. The plane $P_F$ plane is parallel to and centrally located between the two surfaces touched at the contact points $33^5F$.

The final position of the fiber F may be displaced from the desired reference axis due to the misalignments defined earlier and to other variations within manufacturing tolerances as described below. To make a positioning apparatus, or a connector or an opto-electronic component utilizing the same, for typical single mode optical fibers, the positioning apparatus must be able to handle fibers ranging in diameter from 125 to 128 micrometers. This range is found to be the typical diameter variation in quality single mode fibers.

To insure that a fiber is held properly by all four fingers in the most preferred embodiment (FIGS. 35 to 45) the alignment of wafers for bonding during the fabrication process to be discussed must limit variation of the misalignment in the direction across the grooves (the dimension $M_a$ of FIG. 43) to + or −9.5 micrometers. This direction of misalignment reduces the range of fiber diameter variation that are handled in the most preferred embodiment. The misalignment of wafers in the other direction, along the length of the reference axis should be no more than twenty (20) micrometers. This direction of misalignment results in the clamping points of one pair of side-by-side fingers being axially displaced from those points of the other pair of side-by-side fingers, which would tend to bend the fiber slightly upwardly or downwardly.

The misalignment of the slit or saw cut, ($M_s$ in FIG. 43) must be no more than ten (10) micrometers to avoid cutting into a sidewall of a groove when the slit width is sixty-six (66) micrometers wide, as obtained by using a typical sixty (60) micrometer saw.

The thickness of the flexure portion of the fingers should not vary by more than + or − three (3) micrometers so spring forces will be balanced with the fiber centered.

Commonly held tolerances in the microfabrication arts, such as in the microfabrication of devices as pressure rupture discs, are well within the above ranges. In fact, assuming the use of an enhanced positioning apparatus having an alignment clamp, as shown in FIG. 45, estimates show, in practice, the above maximum variations would result in +/−5 micrometers for sidewise misalignment, $M_a$,
+/−1.5 micrometers for flexure thickness $M_t$,
+/−10 micrometers for axial misalignments of wafers. Other variations such as flexure width and friction encountered when a fiber is centered by actions of the four fingers are small. The net result using commonly achievable manufacturing tolerances for microfabricated parts is well under one (1) micrometer in displacement of the center point on the end face of the fiber from alignment with the reference axis. Even for the maximum variations discussed above, the displacement of the center of the fiber end face from alignment with the desired reference axis is well under one (1) micrometer.

With reference to FIGS. 42 and 44 (whether the fingers are mismatched or not) since the fiber is supported only at points of contact between each of the fingers in each finger pair, the length of the fiber behind the contacts is free to pivot. To avoid this eventuality it is desirable to enhance the ability of the positioning apparatus to precise position a fiber into alignment with a reference axis. To this end, it lies within the contemplation of the present invention to provide a clamp, generally indicated by the reference character 220, for engaging the fiber a predetermined distance 224 along the reference axis from the vicinity of the points of contact between the fiber F and the fingers $22^5$. Such an enhanced positioning apparatus $20^5E$ is shown in FIG. 45.

As is best seen in FIG. 45, the enhanced positioning apparatus $20^5E$ comprises a first, forward, positioning apparatus $20^5$ and a clamp 220 disposed a predetermined distance 224 behind the positioning device $20^5$. The clamp 220 is preferably implemented using a second positioning apparatus $20^5$. However, any other of the positioning apparatus 20, $20^1$, $20^2$, $20^3$ or $20^4$ disclosed herein may be used as the clamp 220. Moreover, the clamping function may be performed by any arrangement of suitable form.

It is, of course, understood that an enhanced positioning apparatus similar to that shown by reference character $20^5E$ in FIG. 45 may be obtained using a forward and rearward arrangement of positioning apparatuses. Any combination of positioning apparatus 20, 20', 20'', $20^3$, $20^4$, or $20^5$ as disclosed herein may be used to implement the forward positioning apparatus and the clamp, thereby to form an enhanced positioning apparatus $20^5E$.

The clamp 220 serves to position accurately a point on the center axis of the fiber into alignment with the reference axis. This second point on the center axis of the fiber is spaced a predetermined distance from the end face of the fiber. By providing the clamp 220, any angular misalignment between the fiber axis and the reference axis is held to a minimum.

It should also be apparent, similar to the situation disclosed in FIGS. 30 through 33, that a positioning device $20^5$ or an enhanced positioning apparatus $20^5E$ in accordance with this invention can be used with an edge active or a surface active opto-electronic device to define an opto-electronic component.

In such a usage, the slab $74^5$ would be extended, in the manner shown in FIGS. 30 and 31, to provide a pedestal similar to the pedestal 174, on which an edge active device 170 may be mounted. The device 170 may be mounted to the pedestal in the manner earlier discussed. Alternatively, the slab may be modified to provide a pedestal similar to that shown in FIGS. 32 and 33, to accept a surface active device 170. As is the case in the earlier, the device 170 may take the form of a solid state laser, a photodiode, or a light emitting diode, whether these devices are edge or surface active. The axis X of the device is collinear with the reference axis of the positioning apparatus $20^5$ so that a fiber aligned by the apparatus $20^5$ with the reference axis will be in alignment with the device 170. The positioning apparatus $20^5$ may be modified as suggested in FIG. 31A, if desired, to accept a lens.

If it is desired further, it should be appreciated that the positioning apparatus $20^5$ or an enhanced positioning apparatus $20^5E$ in accordance with this invention can be used to fashion a connector apparatus for holding the facial ends of two confronting fibers each in alignment along a predetermined common reference axis.

To this end it is advantageous to mount onto the slab $74^5$ a two confrontationally disposed positioning apparatuses $20^5$ or two confrontationally disposed enhanced positioning apparatuses 20⁵E, (or a combination of the same).

The connector arrangement of positioning apparatuses 20⁵ or apparatuses 20⁵E may be disposed in a suitably adapted housing generally similar to that shown in FIGS. 25 to 28, it being understood that the reference character 120 in FIGS. 25 to 29 indicates a connector formed of confronting apparatus 20⁵ or apparatuses 20⁵E. Most preferably, the housing should be fabricated material with a low thermal coefficient of expansion over a temperature range from (−45° F. to +85° F.). A suitable preferred material is a liquid crystal polymer such as that sold by Hoechst Celanese Corporation under the mark "Vectra". Conventional molding processes for that polymer can be used to form the housing.

The photolithographic microfabrication technique used to manufacture a positioning apparatus in accordance with this invention may be understood from the following discussion taken in connection with FIGS. 46 to 52. Although the discussion is cast in terms of the manufacture of a fiber-to-fiber connector using the preferred embodiment of the enhanced positioning apparatus 20⁵E as shown in FIG. 45, the teachings are readily extendable to the manufacture of any of the embodiments of the positioning apparatus heretofore described, including their use in the various other applications previously set forth. (For clarity of descriptive text, the basic reference characters (i.e., without superscripts) of the elements of the positioning apparatus are used.)

A silicon wafer 200 having an appropriate predetermined crystallographic orientation is the starting point for fabrication of the arms 22 of a positioning apparatus 20 in accordance with the present invention. It should be understood that other single crystalline substrate materials, such as germanium, may be used provided appropriate alternative etchants and materials compatible with the selected alternative substrate are used. The wafer 200 is polished on at least one surface. Suitable silicon wafers are available from SEH America, Inc., a subsidiary of Shin-Etsu Handotai Co. Ltd., Tokyo, Japan, located at Sparta, N.J. It should be understood that the wafer 200 can be of the "p-type", "n-type" or intrinsic silicon.

The substrate material is preferably (100) surface silicon because this material can be etched by anisotropic etchants which readily act upon the (100) crystallographic plane but substantially do not etch the (111) plane. As a result the preferred truncated V-shaped grooves 36A, 36B, the troughs 60A, 60B, the lead-ins 68A, 68B and the central region 25A, 25B of the arms 22A, 22B between the abutments 32A, 32B and the enlargements 54A, 54B are easily formed. The width and depth of such features are dependent upon the preselected width of the opening in the photolithographic mask being used and the time during which the etchants are permitted to act. Etchants operate on 100 surface silicon in an essentially self-limiting manner which property is useful in forming a full V-groove. One of skill in the art will recognize that if other cross-section configurations are required, other predetermined crystallographic orientations of the silicon may be used. For example, if square cross-section features are desired, (110) surfaces silicon wafers can be used. Other cross sectional configurations for the features are, however, significantly more expensive and, as will be seen later, would require a more complicated configuration to obtain the fiber centering action equivalent to that inherent in a V-groove.

Figure 46:
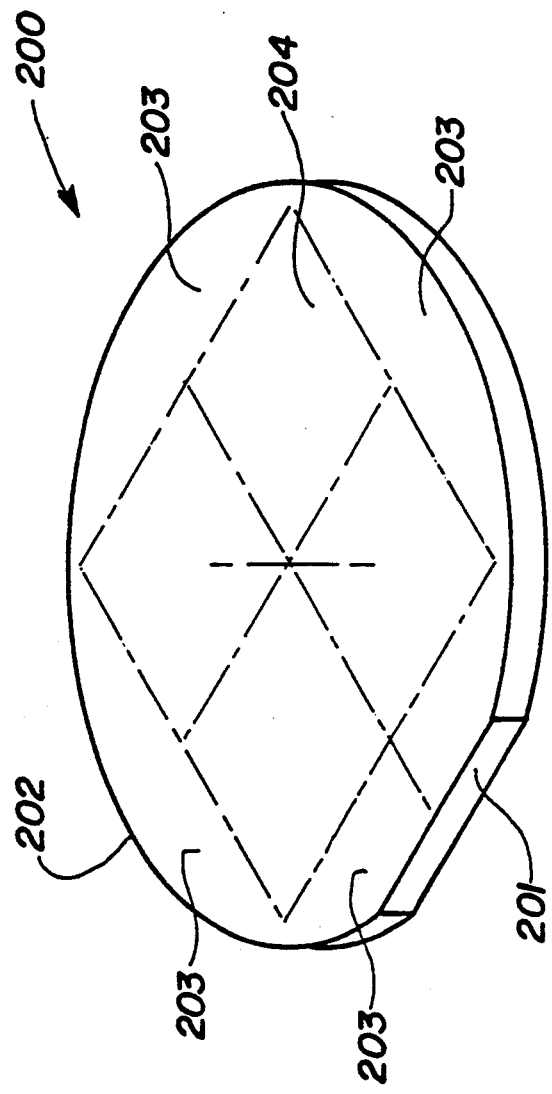
FIG. 46 is a perspective view of a wafer used used to fabricate a plurality of arms or foundations used in a positioning apparatus in accordance with the present invention.

FIG. 46 is a plan view of the wafer 200. The wafer 200 has peripheral flats 201 and 202, as specified by the SEMI Standard. The flats 201, 202 primarily indicate orientation of the crystallographic structure of the silicon and are also used for wafer identification and mask alignment. The longer flat 201 indicates the direction of crystallographic plane (110). The shorter flat 202 is placed a predetermined angular amount on the periphery of the wafer with respect to the flat 201, the magnitude of the angle depending upon the doping of the crystal.

As will be developed, the peripheral regions 203 of the wafer 200, when prepared, carry alignment features, while the central region 204 of the wafer 200 has the structural features of the arm or foundation, as the case may be, of the positioning apparatus formed thereon.

Figure 47:
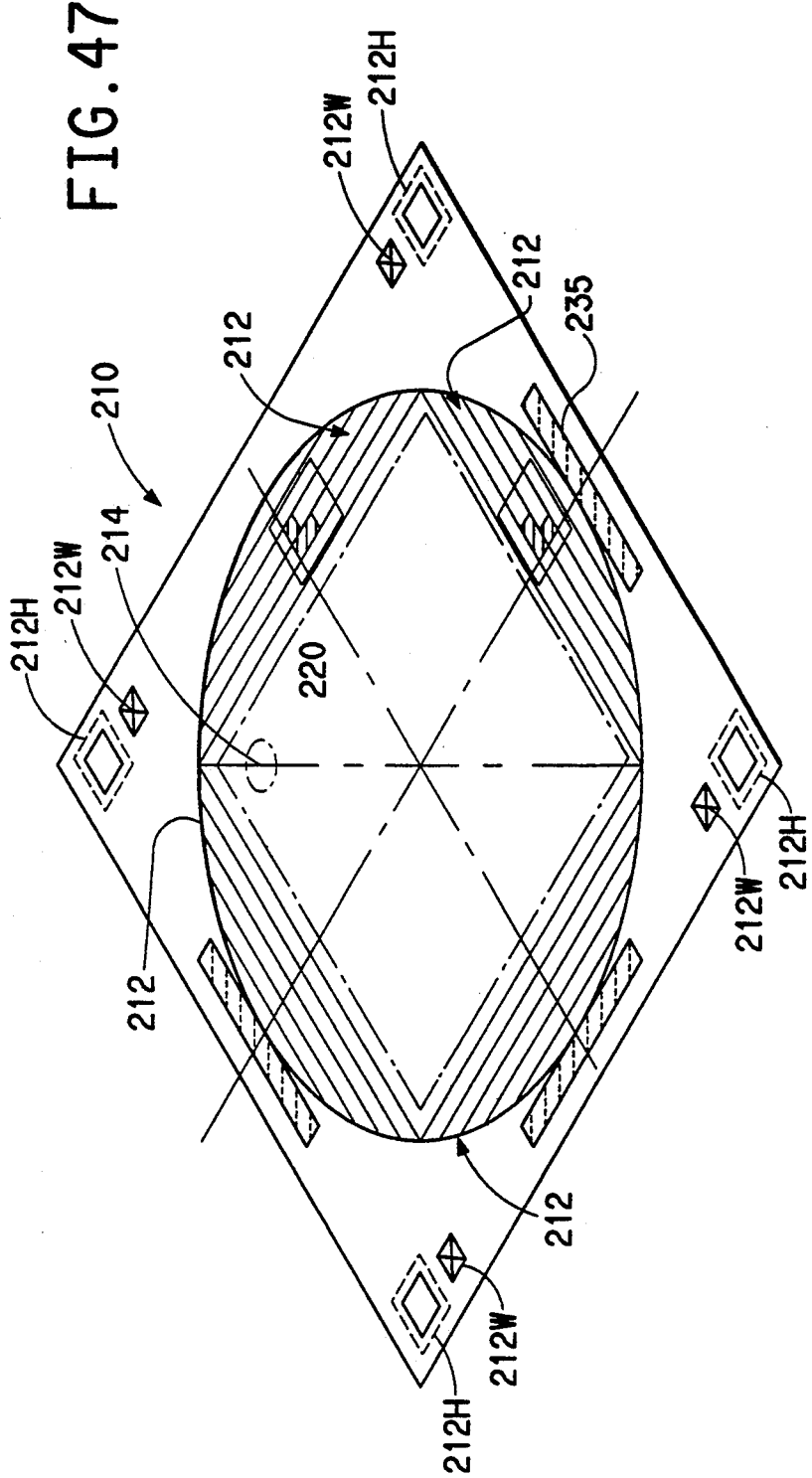
FIG. 47 is a perspective view of a mask used in the photolithographic process forming a plurality of arms or foundations for a positioning apparatus in accordance with the present invention.

FIG. 47 shows a mask 210 with a patterns 212 of alignment features, such as orthogonal alignment grooves or alignment through holes 212H and corresponding wells 212W, thereon. The holes 212H are etched from the opposite surface of the wafer as are the wells.

If grooves are used, the grooves in each pattern 212 are graduated in size to accommodate various sized (diameter) quartz alignment fibers. The grooves 212 have a V-shaped cross section to accept fibers ranging in width from about 0.004825 inches (0.123 mm) to 0.005000 inches (0.127 mm) in 0.039370 inch (0.1 mm) steps, five grooves 212 having been illustrated. The groove width (at the open top of the groove) is larger than the diameter of the fiber so that the center of the fiber is substantially coplanar with the surface of the wafer when the fiber is disposed in its associated groove. Accordingly, for a 0.123 mm fiber, a groove 0.1506 mm is provided. Similarly, for a 0.124 mm fiber, the open top dimension of the groove is 0.1518 mm. For a 0.125 mm fiber, the open top dimension of the groove is 0.1531 mm; for a 0.126 mm fiber the open top dimension of the groove is 0.1543 mm:; and for a 0.127 mm fiber, the open top dimension of the groove is 0.1555 mm.

Figure 48:
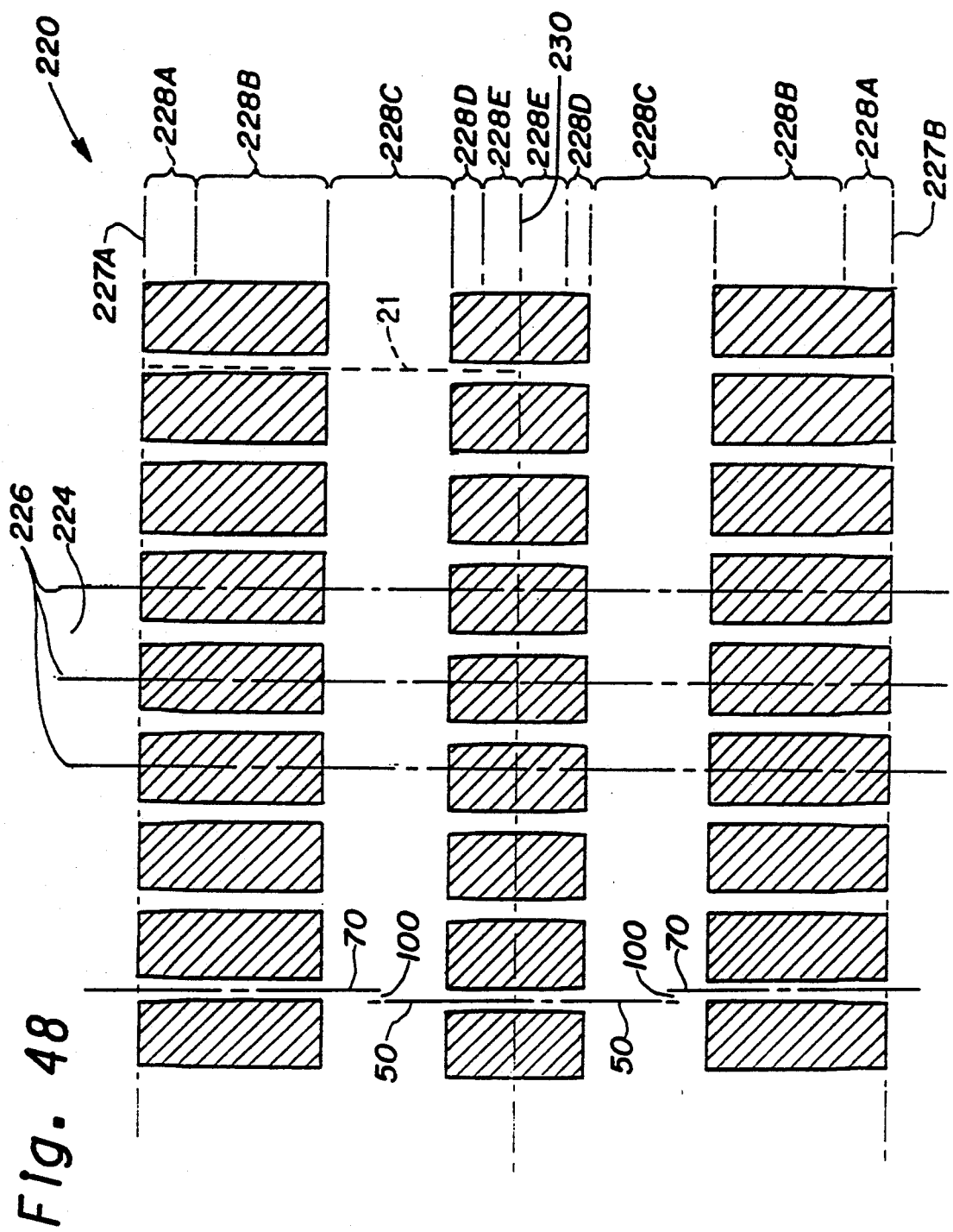
FIG. 48 is an enlarged view of a portion of the mask used for creating a plurality of arms on the wafer 34.

A central area 214 of the mask 210 has provided thereon a repetitive pattern 220 (one of which is shown in FIG. 48) containing to a predetermined number of structural features (i.e., arms or foundations mor slabs) of the positioning apparatus 20 being formed. Since the typical wafer 200 is about 3.9381 inches (101.028 mm) in diameter and a typical connector 120 measures about three hundred fifty (350) micrometers at the widest location and is about two thousand eight hundred (2800) micrometers in length, the structural features for approximately one thousand (1000) connectors 120 may be formed from the central region 204 of the wafer 200.

FIG. 48 is an enlarged view of a portion 220 of the pattern provided on the central region 214 of the mask 210. In FIG. 48, the pattern illustrated is that used to form a plurality of conjoined arms 22 used in a connector 120. The pattern 220 is formed on the surface of the central region 214 of the mask 210 using a well-known step and repeat process to cover the entire area.

The repetitive pattern 220 shown in FIG. 48 is comprised of a plurality of columns 224 which are defined between an array of adjacent parallel scribe lines 226 and a first and a second separation line 227A and 227B. Each column 224 contains ten (10) discrete zones 228A through 228E that are symmetrical within the column 224 about a cutting line 230.

Seen between two next adjacent scribe lines 226 is the configuration of two arms 22 joined front end to front end. Seen between three next adjacent scribe lines 226 is the configuration of two arms 22 joined lengthwise side to side. The zone 228A corresponds to features defining the region of the lead-in 68A of an arm 22A. The zone 228B corresponds to features defining the region of the trough 60A of the arm 22A. Similarly, zone 228C corresponds to the central portion of 25A of the arm 22A, while the zone 228D corresponds to features defining the region of the converging groove 36A on the arm 22A. The axis 50A of the converging groove 36A is offset from the axis 70A of the trough 60A by the offset distance 100. Finally, if provided, the zone 228E corresponds to features defining the region of the tabs 48A of an arm 22A. Note that in the mask illustrated in FIG. 36 the position of the offset 100 on one side of the cutting line 230 is reversed from the position of the offset 100 on the opposite side of the cutting line, although this arrangement is not necessarily required.

The repetitive pattern for a mask of the arm 22B will be similar to that shown in FIG. 48 except that the direction of the offset distances 100 for the arm 22B will be the mirror image of the pattern for the arm 22A. As will become clearer herein, this mirror image relationship between the offsets is necessary so that features on the resulting arms 22A, 22B will register with each other when one is inverted and superimposed on the other. Of course if the offset 100 is eliminated, masks for the arms 22A and 22B will be identical.

The cross-hatched areas shown in FIG. 48 preferably correspond to those areas of the central region of the wafer 200 that will be protected by a layer of resist material (as will be described) while the areas shown without hatching will be left unprotected during subsequent etching steps. A negative resist is employed but it should be apparent that the location of the hatched and clear areas of FIG. 48 may be reversed if desired. This would alter somewhat subsequent steps, but in a manner known to those in the art.

Figure 49A:
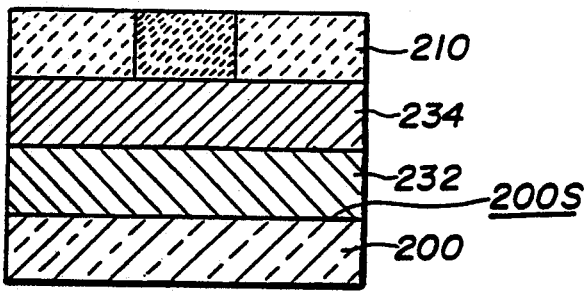
FIGS. 49A through 49E are schematic representations of the process steps effected during fabrication of the wafer.

FIGS. 49A through 49E illustrate the process steps whereby a wafer 200 of crystalline silicon may be formed into an array of arms 22A corresponding to the array shown in the mask of FIGS. 47 and 48. As seen in FIG. 49A the wafer 200 is preliminarily covered with a layer 232 of a material that acts in a manner similar to a mask. Silicon dioxide (SiO$_2$) is preferred, and is surfaced onto the polished operative surface 200S of the silicon wafer 200 by thermally growing the silicon oxide layer in an oxygen atmosphere at elevated temperature (circa eleven hundred fifty (1150) degrees Celsius), as is known. As indicated, silicon oxide is used because available etchants that attack silicon will also attack known photoresists but will attack the oxide only slightly. This slight attack is accounted for when dimensioning the photomask.

The layer of silicon oxide 232 is then covered with a photoresist 234. Preferred is a positive resist, such as the mixture of 2-ethoxyethyl acetate, N-butyl acetate and xylene sold by Shipley Company, Incorporated of Newton, Mass. as "Microposit Photoresist" 1400-37. The resist is spun onto the surface of the silica dioxide in accordance with instructions set forth in the Shipley Microelectronic Products Brochure (1984) using standard apparatus such as that available from Headway Research Incorporated of Garland, Tex. under model number ECR485.

The mask 210 is mounted atop the wafer 200 and is aligned with respect to the flats 201, 202 of the wafer 200 using alignment bars 235. Thus, in a finished wafer the alignment grooves 212 are precisely positioned with respect to the flats on the wafer through the use of alignment bars 213 on the mask. The wafer 200 is exposed to ultraviolet light through the mask 210 and subsequently developed.

Figure 49B:
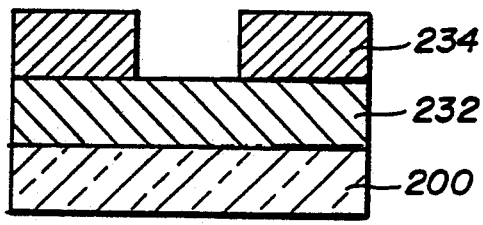
Figure 49C:
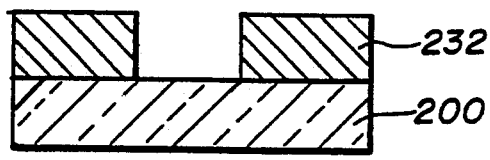
Figure 49D:
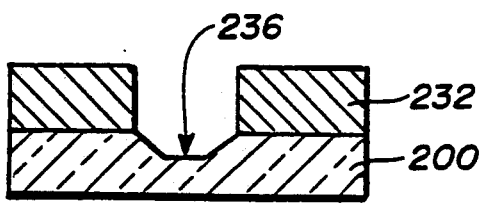
Figure 49E:
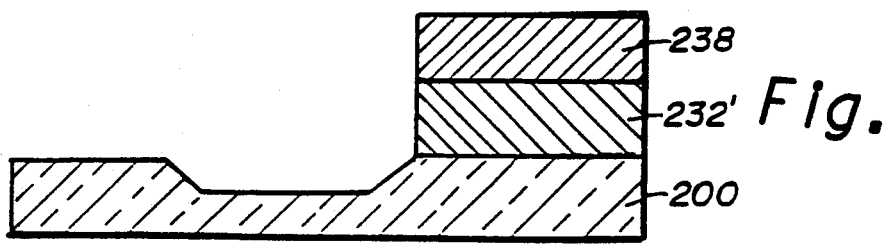
Figure 50:
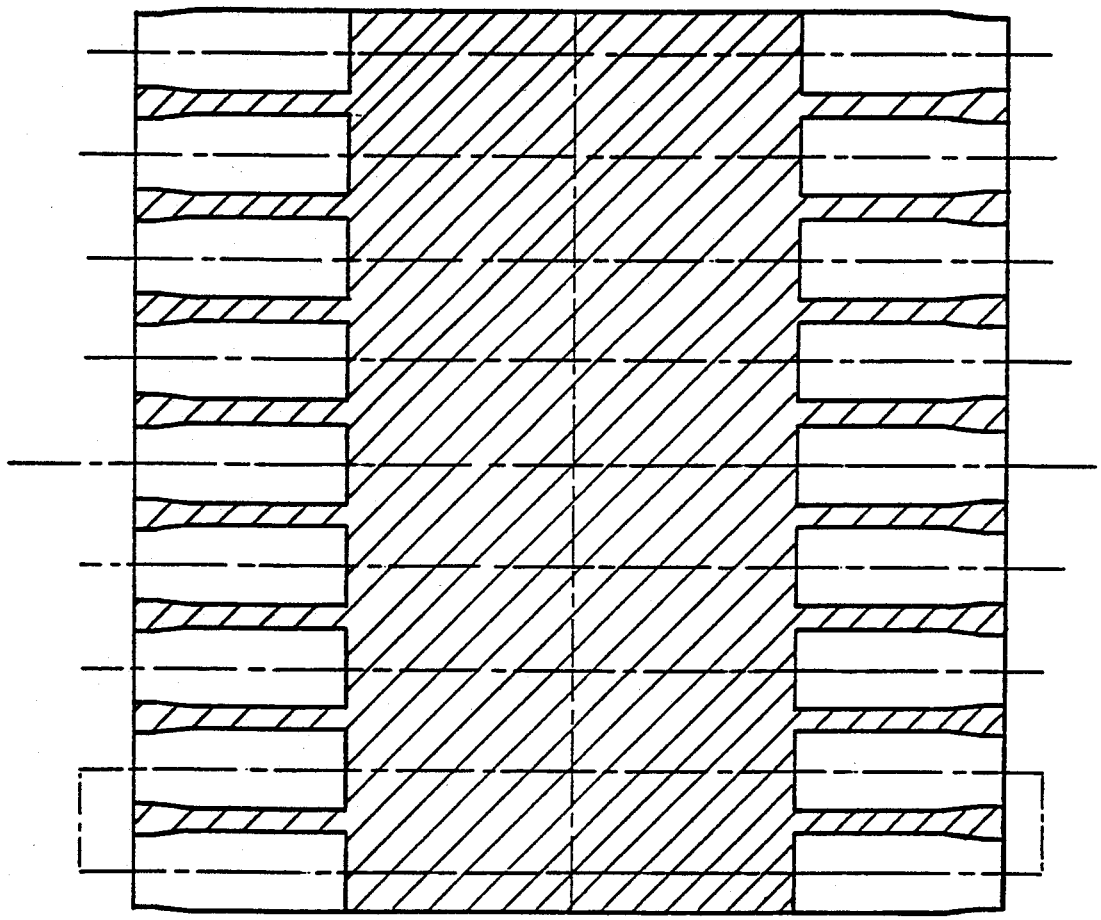
FIG. 50 is an enlarged view of a portion of the mask used for creating solder masks on the wafer.

Since a positive resist is used the unexposed areas of the resist are washed away using de-ionized water, leaving the layered arrangement of exposed, hardened resist 234, silicon dioxide 232 and wafer 200, as shown in FIG. 49B.

Next the pattern of the mask 210 is etched into the silica layer 232. Buffer hydrofluoric acid (HF) is preferred. This step results in the arrangement shown in FIG. 37C. Those skilled in the art will recognize that process variables such as, for example, concentration, time and temperature are all adjusted appropriately to optimize results in all of the wet processing steps described.

Thereafter, a second, differential, etching step is performed to etch the silicon to form the features of the arms 22A. The preferred anisotropic etchant is ten percent (10%) potassium hydroxide (KOH). Ethylene diamine ("ED") pyrocatechol ("P") and water, in a mix of 750 ml ED, 120 gm P and 240 ml water, may be used. This etching produces the structural feature in the surface of the silicon illustrated schematically in FIG. 49D by reference character 236. The depth of the feature 236 is controlled by controlling the etching time, as is well known. Of course, differential etching is selflimiting for the inside angles of the structure, if left to proceed.

The silicon dioxide layer 232 is then removed by etching with buffer hydrofluoric acid (HF) and another layer of silica, i.e., silicon dioxide, is grown on the surface. Next, resist is deposited on the surface of the wafer and is imaged through a mask, as shown FIG. 38. This results in a layer 238 of hardened resist being formed on those predetermined portions of the wafer that are to be bonded (corresponding to zones 228C through 228E and to troughs 60 (see FIG. 36)).

The silica layer is then etched from areas that are to be bonded (See, FIG. 49E) using hydrofluoric acid (HF). The resist layer 238 is stripped using acetone, leaving a finished wafer ready for bonding.

This completes the fabrication of the first wafer 200 having the array of arms 22A thereon.

As noted earlier, since the axis of the guideway 98A may be offset from the axis of the groove 92A, the mask for the arms 22B may not be identical with the mask used to form the arms 22A. Accordingly, a second wafer having an array of arms 22B thereon may be prepared in accordance with the method steps illustrated in FIG. 49. The finished second wafer (not specifically illustrated but hereinafter referred to by character 200') is similar in all respects except in location of the offset 100. If the wafers are the same, the second wafer is prepared exactly as the first.

Figure 51:
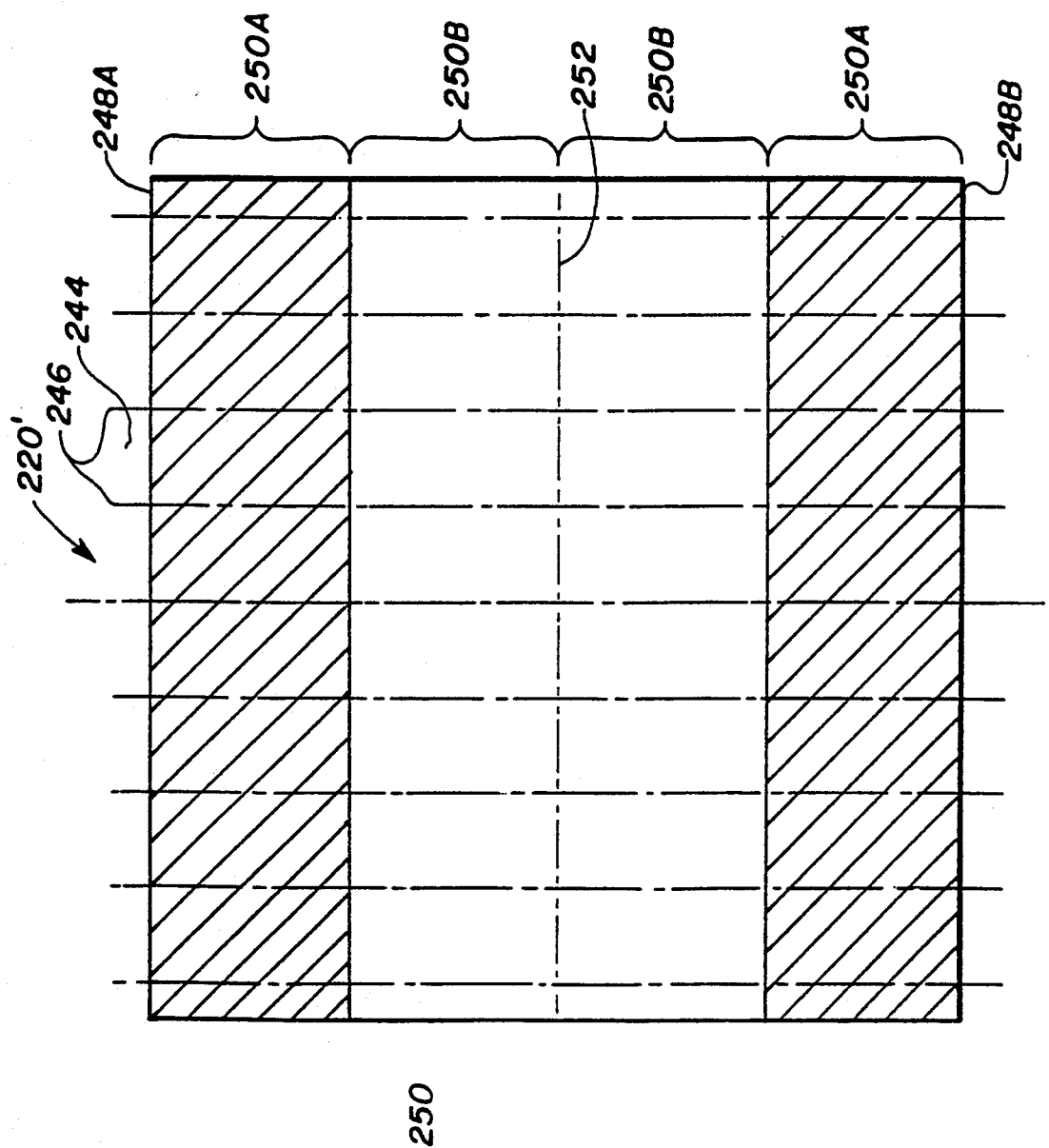
FIG. 51 is an enlarged view of a portion of the mask used for creating foundations on the wafer.

A third wafer 200" is prepared using a foundation mask, a portion of which is shown in FIG. 51. FIG. 51 is an enlarged view of a portion of the pattern 220' provided on the central region of the foundation mask (analogous to the pattern of the arm mask shown in FIG. 36). The repetitive pattern 220' is comprised of a plurality of columns 244 which are defined between an array of adjacent parallel scribe lines 246 and a first and a second separation line 248A and 248B. Each column 244 contains four (4) discrete zones 250 that are symmetrical within the column 244 about a center line 252. The zones 250A define mounting surface 76 on a foundation 74. The zones 250B correspond to the surfaces 82 provided on the foundation. The wafer 200" containing the foundations 74 is exposed in a manner analogous to that shown in FIG. 37, with the exception that the exception that the solder mask exposure is not carried out. However, the layer of silica is removed from the surface of the wafer 200".

Figure 40:
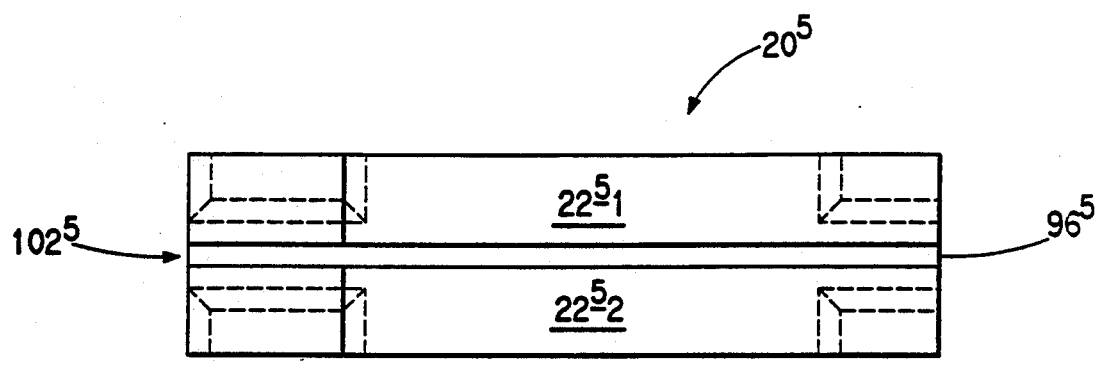
FIG. 40 is a top view of the positioning apparatus of FIG. 37 taken along view lines 40—40 therein.

Having prepared wafers for the arms 22A (the wafer 200), the arms 22B (the wafer 200') and the foundations 74 (the wafer 200"), the final assembly of the connector 120 may be made as is shown in FIG. 40.

The wafer 200' is placed on top of the wafer 20. Preferred methods of aligning wafers to be joined involve etching holes that go through one wafer and wells (shallow holes) on the mating wafer accurately located by the precision photomasks used for etching so that wafers are aligned by matching through hole with well at at least two locations on each wafer. One method involves etching truncated pyramidal through-holes and wells so that when one wafer is turned over and placed against the second wafer, each hole and well can be matched by observation with a microscope as the wafers are positioned with precision adjustment mechanisms as are well known in the micromachining art. A better method is to etch V-grooves forming crosses as holes and wells and matching by infrared source and camera searching for the brightest image made by a beam passing through both wafers. Such infrared equipment is commercially available, (as, for example, from Research Devices Division of American Optical Corporation) a most preferred method is to etch a grid pattern of lines spacing from each other on the order of ten (10) micrometers separation. An infrared beam image can be inspected for the brightest and most uniform lines in the image where etched lines are aligned letting the most infrared beam through the two silicon wafers. (This latter method is believed to be accurate to 0.5 micrometer, as compared to the method with crosses which is accurate to, typically, ten (10) micrometers.

As yet another alternative, the registration of the features on the wafer 200' to those on the wafer 200 is effected using at least two and preferably four lengths of a stripped optical fiber and the corresponding appropriate one of the alignment grooves in each array 212 of grooves. The diameter of each length of the optical fiber is measured by micrometer, accurate to plus or minus 0.5 micrometers. Each of the fibers is placed in groove in the groove array 212 that most closely corresponds to the measured diameter. Each alignment fiber thus sits in the selected alignment groove such that the axis of the alignment fiber lies in the plane of the surface of the wafer 200 with the remaining portion of each fiber protrudes above that surface.

The wafer 200' is inverted and placed atop the wafer 200, with the corresponding grooves in the wafer 200' receiving the protruding portions of the alignment fibers thereby to precisely align the pattern of the two wafers. Since the alignment grooves on each wafer are formed simultaneously with the formation of the features on the wafer, and since the mask for each wafer is formed optically one from the other, precise alignment between the wafers is achieved. It is noted in FIGS. 40A and 40B only one of the fibers 254 and grooves 121 is shown, for clarity of illustration.

In a less preferred method, the assembly of superimposed wafers 200, 200' shown in FIG. 52 is bonded in a wet controlled atmosphere furnace according to methods described in the paper by Shimbo et al., "Silicon-to-silicon direct bonding method" published 10/86 in the *Journal of Applied Physics*, and in the paper by Lasky et al., "Silicon on Insulator (SOI) By Bonding and Etchback", IEDM 85. As seen in FIG. 52B the exterior surface 256' of the wafer 200' is lapped to reduce its thickness from it original thickness (typically approximately seventeen (17) mils) to a final thickness of five (5) mils.

The more preferred method of bonding uses the above but avoids expensive lapping by etching parts of the arms and fingers as described below, and avoids forming an abutment on the slab.

The resulting bonded structure is inverted and the exterior surface 256' of the wafer 200' is mounted atop the wafer 200". The alignment of these wafers is effected using a fixture employing quartz blocks 260 abutting against the flats 201, 202 of the wafer 200. The wafer 200' is then bonded to the wafer 200". It is to be understood that other bonding techniques, such as those discussed in the paper by Wallis and Pomerantz "Field Assisted Glass-Metal Sealing" published 9/69 in the *Journal of Applied Physics* may be used to bond the wafers. Still other alternate bonding techniques would include metallic or glass solder bonding.

The exterior surface 256 of the wafer 200 is then lapped until the dimension of the wafer 200 is that of the wafer 200'. Thus, the substantial equality of the biasing forces imposed by the flexure is provided.

Figure 52A:
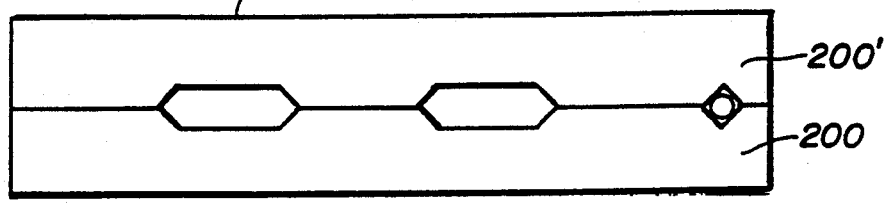
FIGS. 52A through 52D are schematic representations of the steps used to form a plurality of fiber-to-fiber connectors from superimposed wafers having the arms and foundations thereon.
Figure 52B:
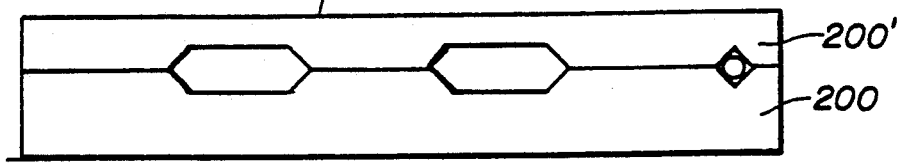
Figure 52C:
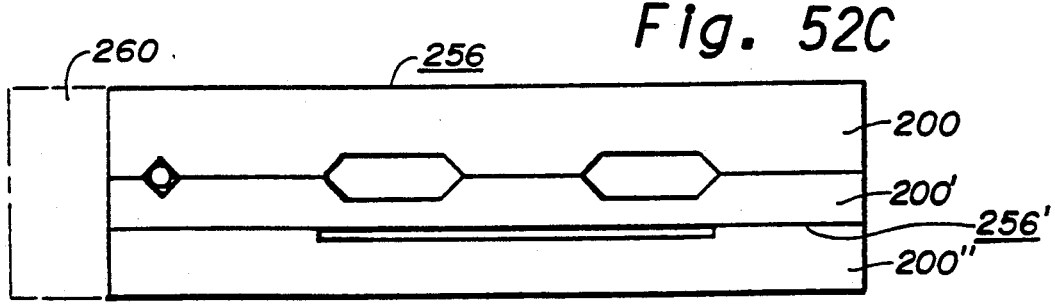
Figure 52D:
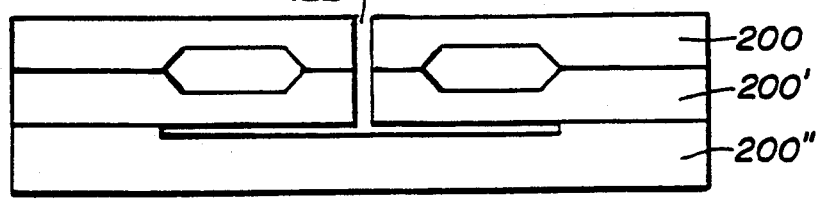

The resultant three wafer bonded stack shown in FIG. 52D may then be cut. Only the top two wafers 200, 200' of the bonded stack (containing the arms 22-1B, 22-2B and the arms 22-1A, 22-2A, respectively, FIG. 22) are first cut along the lines in the wafers corresponding to the cutting lines 230, 230' on the arm masks (FIG. 36). This cut is made using a blade that is on the order of 0.003 inches to create the distance 122 in FIG. 22. The bonded stack is thereafter cut, using a blade that is 0.015 inches thick, along the lines in the wafers corresponding to the separation lines 227A, 227B on the wafer 200, the separation lines 227A', 227B' on the wafer 200', and the separation lines 248A, 248B on the wafer 200", as well along the scribe lines 226, 226' and 246 (on the respective wafers 200, 200' and 200") all of which are registered with each other, thereby to yield from the bonded stack about one thousand of the fiber-to-fiber connectors 120.

As noted earlier, the positioning apparatus $20^5$ shown in FIGS. 35 through 44 or an enhanced positioning apparatus $20^5E$ shown in FIG. 45 (and any connector or opto-electronic made using the same) is fabricated in a manner generally similar to that previously discussed in the case of the positioning apparatus 20. Some specific points may be noted.

A portion of the top surface of a wafer defines the surface $56^5B$ of a finger pair when fabrication is completed. An adjoining portion of the wafer is etched to form the surface $28^5$ of each finger pair.

On the opposite side of the wafer, a portion of that surface becomes surface $56^5A$ of each abutment $54^5$, while another portion of that wafer surface is etched to form surface $34^5$ of the abutment $32^5$ of each clip $30^5$. An adjoining portion of that surface of the wafer between the surfaces $56^5A$ and $34^5$ is etched slightly to form the major portion of the surface $26^5$ defining the flexure. The abutments 54[5], 32[5] are also etched to form sidewall surfaces 62[5], 33[5] respectively. Each sidewall surface 62[5], 33[5] defines an angle of 54.74 degrees from the plane of the wafer due to the silicon crystal structure.

It is noted that the etching process used does not make sharp corners at the ends of a groove. What would have been a corner is etched inward on each side thereof. Due to the crystal structure of the silicon two angled faces are formed at a corner location as shown in FIG. 36B. The right angle corners shown in the Figure are formed by sawing or cutting. The beveled corners formed are advantageous since they serve as guides to bring a cylindrical object, as the fiber, into the channels 90[5] and 92[5] formed by the troughs 60[5] and the grooves 36[5], respectively.

Several finger pairs are etched in a single silicon wafer. All etching is done before the other fabrication steps.

A wafer containing a predetermined number of unseparated of fingers is positioned on top of another wafer containing a corresponding predetermined number of unseparated of fingers. The wafers are aligned so that the surfaces 56[5]A (see FIGS. 36A) of the unseparated fingers on each wafer surface are touching in contact. The slight etching of each wafer relieves the surfaces 34[5] on each unseparated finger to prevent their touching and being joined.

The two wafers containing the unseparated fingers are placed on a third wafer which contains a number of unseparated slabs 74[5].

The wafers are joined, only at surfaces 56[5]A, by heating, to fusion temperature in an oven. Known methods of joinder such as soldering can also be used.

After the joining steps are completed the silicon wafers are sliced or cut, (i) down the centers of the grooves 90[5], 92[5] (through the abutments 30[5] and optionally, but preferably through the abutments 54[5]) to separate cooperating sets of fingers, (ii) to separate sets of four fingers which will become positioning apparatus, and (iii), to cut the bottom wafer. The bottom wafer may be separated to define a mounting slab for a set of four fingers to serve as a positioning apparatus (as in FIG. 35), to contain a both a forward and a rearward set of four fingers to define as a positioning apparatus with a rearward clamp (as in FIG. 45), or to contain two confrontationaly disposed positioning apparatus, (each of which may include a single positioning apparatus, or a positioning apparatus having the forward and rearward finger set.

Those skilled in the art, having the benefits of the teachings of the present invention as hereinabove set forth, may impart numerous modifications thereto. It should be understood that such modifications as herein presented and any others are to be construed as lying within the contemplation of the present invention, as defined by the appended claims.

What is claimed is:

1. An opto-electronic component comprising, in combination:
    a foundation having a pedestal thereon;
    a positioning apparatus mounted to the foundation, the positioning apparatus comprising at least a first and a second arm, the first arm being mounted to the foundation, each arm being movable from a first, closed, position to a second, centering, position,
    each arm having a first axial end and a second axial end thereon, in the closed position the arms cooperating to define a channel having a reference axis therethrough, the channel having an inlet end and an outlet end,
    means for biasing each of the arms toward the first, closed, position such that the force on each arm passes through the reference axis and such that the sum of forces on the arms when in the centering position is substantially equal to zero,
    the first axial end of each of the arms being connectable to the foundation to remain a first predetermined radial distance from the reference axis while the arm occupies both the closed and the open positions,
    the second axial end of each arm being disposed the first predetermined radial distance from the reference axis while the arm occupies the closed position, the second axial end of each arm being displaceable radially outwardly to a second, greater, radial distance from the reference axis while the arm occupies the centering position,
    each of the arms being arranged such that an optical fiber introduced into the inlet end of the channel with the axis of the fiber spaced from the reference axis is initially displaceable by contact with at least one of the arms to place a predetermined point on the fiber into alignment with the reference axis,
    the second axial ends of each of the arms being responsive to further axial movement of the fiber through the channel by moving radially outwardly with respect to the reference axis against the bias force toward the centering position thereby to maintain the point on the fiber into alignment with the reference axis; and
    an opto-electronic device mounted to the pedestal, the opto-electronic device having a reference axis therethrough, the reference axis of the opto-electronic device aligning collinearly with the reference axis of the channel.

2. The opto-electronic component of claim 1, wherein the positioning apparatus further comprises:
    a third arm movable from a first, closed, position to a second, centering, position,
    in the closed position the third arm cooperating with the first and the second arms to define the channel,
    the biasing means also biasing the third arm toward the first, closed, position such that the sum of forces on the three arms when in the centering position is substantially equal to zero,
    the third arm being arranged such that a cylindrical member introduced into the inlet end of the channel with the axis of the member spaced from the reference axis is initially displaceable by contact with at least one of the three arms to move the point on the center axis of the member into alignment with the reference axis regardless of the diameter of the cylindrical member,
    the third arm also being responsive to further axial movement of the member through the channel by moving against the bias force toward the centering position to position the point on the member into alignment with the reference axis.

3. An opto-electronic component comprising, in combination:
    a foundation having a pedestal thereon;

a positioning apparatus itself comprising a first and a second arm, the first arm being mounted to the foundation, at least the first arm having at least a first and a second sidewall cooperating to define a groove therein, the arms being arranged in superimposed relationship, each arm being movable from a first, closed, position to a second, centering, position, means for biasing each of the arms with a substantially equal and oppositely directed biasing force toward the first, closed position, in the closed position the arms cooperating to define a channel having a reference axis therethrough, the channel having an inlet end and an outlet end, each of the arms being arranged such that a cylindrical member introduced into the inlet end of the channel with the axis of the member spaced from the reference axis is initially displaceable by contact with at least one of the arms to move a center point on an end face of the member toward alignment with the reference axis, the arms being responsive to further axial movement of the member through the channel by moving against the bias force toward the centering position to position the point on the face of the member into alignment with the reference axis by contact between the member and both the first and the second arms; and an opto-electronic device mounted to the pedestal, the opto-electronic device having a reference axis therethrough, the reference axis of the opto-electronic device aligning collinearly with the reference axis of the channel.

4. The opto-electronic component of claim 3 wherein the first and the second sidewalls in the first arm cooperate to define a converging groove therein, the channel being partially funnel-like in shape over at least a predetermined portion of its axial length.

5. The opto-electronic component of claim 4 wherein the second arm has a planar surface thereon.

6. The opto-electronic component of claim 3 wherein the second arm has at least a first and a second sidewall disposed therein, the first and second sidewalls in the second arm cooperating to define a converging groove therein, the converging groove in the first arm and the converging groove in the second arm cooperating to define the channel, the channel being fully funnel-like in shape over at least a predetermined portion of its axial length.

7. The opto-electronic component of claim 6 wherein the foundation and the first and the second arms are each fabricated from a crystalline material.

8. The opto-electronic component of claim 6 wherein biasing means comprises a reduced thickness portion in each of the first and the second arms, the reduced thickness portion defining a flexure in each arm which, when each arm is deflected by contact with the member, generates a force on each arm to bias each arm toward the closed position.

9. The opto-electronic component of claim 8 wherein the foundation and the first and the second arms are each fabricated from a crystalline material.

10. The opto-electronic component of claim 6 wherein each of the arms has a major surface thereon, a portion of the major surface connecting the first and the second sidewalls and cooperating to define the groove therein, wherein the converging groove so defined in each arm has a truncated V-shape.

11. The opto-electronic component of claim 6 wherein each arm has a trough disposed therein, each tough being disposed on an arm a predetermined distance behind the groove in that arm, in the closed position the troughs in the arms cooperating to define a guideway for guiding the member toward the channel.

12. The opto-electronic component of claim 11 wherein the guideway has an axis therein, the axis of the guideway being offset from the axis of the channel by a predetermined distance.

13. The opto-electronic component of claim 3 wherein the first and second sidewalls in the first arm cooperate to define a groove having a uniform width dimension throughout its length, the channel being rectangular in cross sectional shape over at least a predetermined portion of its axial length.

14. The opto-electronic component of claim 13 wherein the second arm has at least a first and a second sidewall disposed therein, the first and the second sidewalls in the second arm cooperating to define therein a groove having a uniform width dimension throughout its length, the uniform groove in the first arm and the uniform groove in the second arm cooperating to define the channel, the channel being rectangular in cross sectional shape over at least a predetermined portion of its axial length.

15. The opto-electronic component of claim 14 wherein each sidewall of the groove in the first arm and each sidewall of the groove in the second arm has an edge thereon, the edges of the sidewalls contacting the member.

16. The opto-electronic component of claim 13 wherein the second arm has a planar surface thereon and wherein each sidewall of the groove in the first arm has an edge thereon, the edges of the sidewalls contacting the member.

17. The opto-electronic component of claim 3 wherein each arm has a trough disposed therein, the troughs in the arms cooperating to define a guideway for guiding the member therebetween.

18. The opto-electronic component of claim 17 wherein the guideway has an axis therein, the axis of the guideway being offset from the axis of the channel by a predetermined distance.

19. The opto-electronic component of claim 3 wherein biasing means comprises a reduced thickness portion in each of the first and the second arms, the reduced thickness portion defining a flexure in each arm which, when each arm is deflected by contact with the member, generates a force on each arm to bias each arm toward the closed position.

20. The opto-electronic component of claim 3 wherein the foundation and the first and the second arms are each fabricated from a crystalline material.

21. The opto-electronic component of claim 3 wherein each of the arms has a major surface thereon, a portion of the major surface connecting the first and the second sidewalls and cooperating to define the groove therein, wherein the groove so defined in each arm has a truncated V-shape.

22. The opto-electronic component of claim 3 wherein the opto-electronic device is an edge active device.

23. The opto-electronic component of claim 3 wherein the opto-electronic device is a surface active device.

24. The opto-electronic component of claim 3 wherein the opto-electronic device is a solid state laser.

25. The opto-electronic component of claim 3 wherein the opto-electronic device is a solid state light responsive diode.

26. An opto-electronic component comprising, in combination:
   a foundation having a pedestal thereon;
   a positioning apparatus itself comprising a first and a second arm, the first arm being mounted to the foundation,
      each arm having at least a first and a second sidewall thereon, the sidewalls in each arm cooperating to define therein a converging groove, the arms being fixed in superimposed relationship with the grooves therein cooperating to define a first fully funnel-like channel having a reference axis therethrough, the first funnel-like channel having an inlet end and an outlet end,
      the arms being arranged such that a cylindrical member introduced into the inlet end of the first funnel-like channel with its axis spaced from the reference axis is displacable by at least one of the sidewalls to move a center point on an end face of the member into alignment with the reference axis where it is there held by contact with the first and second sidewalls of both arms,
      each of the first and the second arms includes a trough therein, each trough being disposed on an arm a predetermined distance behind the groove in that arm, in the closed position the troughs cooperating to define a guideway for guiding the cylindrical member toward the inlet end of the channel; and
   an opto-electronic device mounted to the pedestal, the opto-electronic device having a reference axis therethrough, the reference axis of the opto-electronic device aligning collinearly with the reference axis of the channel.

27. The opto-electronic component of claim 26 wherein each of the arms has a major surface thereon, a portion of the major surface connecting the first and the second sidewalls and cooperating to define the groove therein, wherein the converging groove so defined in each arm has a truncated V-shape.

28. The opto-electronic component of claim 26 wherein the first and second arms are each fabricated from a crystalline material.

29. An opto-electronic component comprising, in combination:
   a foundation having a pedestal thereon,
   a positioning apparatus mounted to the foundation, the positioning apparatus comprising:
   a set of four fingers, each of the fingers having a sidewall thereon, each finger being articulably movable from a first, closed, position to a second, centering, position,
   in the closed position the sidewalls of the fingers cooperating to define a channel having a reference axis therethrough, the channel having an inlet end and an outlet end,
   means for biasing each of the fingers toward the first, closed position with a predetermined biasing force such that the sum of the biasing forces on the fingers when the fingers are in the centering position is substantially equal zero,
   each of the fingers being arranged such that a cylindrical member introduced into the inlet end of the channel with the axis of the member spaced from the reference axis is initially displaceable by contact with the sidewall on at least one of the fingers to move a center point on an end face of the member toward alignment with the reference axis,
   each of the fingers being responsive to further axial movement of the member through the channel by deflecting against its biasing force to position the center point on the end face of the member into alignment with the reference axis by contact between the member and a point of contact on each of the fingers; and
   an opto-electronic device mounted to the pedestal, the opto-electronic device having a reference axis therethrough, the reference axis of the opto-electronic device aligning collinearly with the reference axis of the channel.

30. The opto-electronic component of claim 29 wherein each of the fingers is axially elongated and has a first and a second axial end thereon, and wherein the sidewall is disposed at the first axial end, each finger having a reduced thickness region disposed thereon intermediate the first and the second axial ends, the reduced thickness portion defining a flexure in each finger which, when each finger is deflected by contact with the member, generates a restoring force on each finger to bias each arm toward the closed position.

31. The opto-electronic component of claim 29 wherein each of the fingers is fabricated from a crystalline material.

32. The opto-electronic component of claim 29 wherein the fingers are arranged into a first and a second pair of fingers.

33. The opto-electronic component of claim 29 wherein the opto-electronic device is an edge active device.

34. The opto-electronic component of claim 29 wherein the opto-electronic device is a surface active device.

35. The opto-electronic component of claim 29 wherein the opto-electronic device is a solid state laser.

36. The opto-electronic component of claim 29 wherein the opto-electronic device is a solid state light responsive diode.

37. The opto-electronic component of claim 29 further comprising:
   an alignment clamp for engaging the member at a predetermined distance along the reference axis from the vicinity of all of the contact points on the sidewalls of the fingers, the clamp engaging the member so as to position accurately a predetermined second point on the center axis of the member into alignment with the reference axis.

38. The opto-electronic component of claim 37 wherein the alignment clamp comprises:
   a second positioning apparatus itself comprising:
      a second set of four fingers, each of the fingers in the second set having a sidewall thereon, each fingers in the second set being articulably movable from a first, closed, position to a second, centering, position,
      in the closed position the sidewalls of the fingers in the second set cooperating to define a second channel having a second reference axis therethrough, the second channel having an inlet end and an outlet end, the second reference axis being collinear with the first reference axis, means for biasing each of the fingers in the second set toward the first, closed position with a predetermined biasing force such that the sum of the biasing forces on the fingers in the second set when the same are in the centering position is substantially equal zero, each of the fingers in the second set being arranged such that a cylindrical member introduced into the inlet end of the second channel with the axis of the member spaced from the second reference axis is initially displaceable by contact with the sidewall on at least one of the fingers in the second set to move the center point on the end face of the member toward alignment with the second reference axis, each of the fingers in the second set being responsive to further axial movement of the member through the channel by deflecting against its biasing force to move the second point on the center axis of the member toward alignment with the second reference axis, each of the fingers in the second set also deflecting against its biasing force to position accurately the predetermined second point of the member into alignment with the reference axis by contact between the member and a point of contact on each of the fingers in the second set.

39. The opto-electronic component of claim 38 wherein each of the fingers in the second set is axially elongated and has a first and a second axial end thereon, and wherein the sidewall is disposed at the first axial end, each finger in the second set having a reduced thickness region disposed thereon intermediate the first and the second axial ends, the reduced thickness portion defining a flexure in each finger in the second set which, when each finger in the second set is deflected by contact with the member, generates a restoring force on each finger in the second set to bias each such finger toward the closed position.

40. The opto-electronic component of claim 38 wherein each of the fingers in the second set is fabricated from a crystalline material.

41. The opto-electronic component of claim 38 wherein the fingers in the second set are arranged into a first and a second pair of fingers.

42. The opto-electronic component of claim 38 wherein the opto-electronic device is an edge active device.

43. The opto-electronic component of claim 38 wherein the opto-electronic device is a surface active device.

44. The opto-electronic component of claim 38 wherein the opto-electronic device is a solid state laser.

45. The opto-electronic component of claim 38 wherein the opto-electronic device is a solid state light responsive diode.

* * * * *